US012628139B2

(12) United States Patent
Mondet et al.

(10) Patent No.: US 12,628,139 B2
(45) Date of Patent: May 12, 2026

(54) MULTIPLE TRANSMISSIONS WITH SUBBAND FULL-DUPLEX OPERATION

(71) Applicant: QUALCOMM Incorporated, San Diego, CA (US)

(72) Inventors: Mickael Mondet, Louannec (FR); Diana Maamari, San Diego, CA (US); Hyun Yong Lee, San Diego, CA (US); Prashanth Haridas Hande, San Diego, CA (US); Muhammad Sayed Khairy Abdelghaffar, San Jose, CA (US); Yeliz Tokgoz, San Diego, CA (US); Thomas Valerrian Pasca Santhappan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 18/509,175

(22) Filed: Nov. 14, 2023

(65) Prior Publication Data

US 2024/0276462 A1 Aug. 15, 2024

Related U.S. Application Data

(60) Provisional application No. 63/485,125, filed on Feb. 15, 2023.

(51) Int. Cl.
*H04L 5/14* (2006.01)
*H04W 72/0446* (2023.01)

(52) U.S. Cl.
CPC ........... *H04W 72/0446* (2013.01); *H04L 5/14* (2013.01)

(58) Field of Classification Search
CPC ......... H04L 5/14; H04L 5/16; H04W 72/0446
USPC ........................................................ 370/329
See application file for complete search history.

(56) References Cited

U.S. PATENT DOCUMENTS

| | | | | |
|---|---|---|---|---|
| 2022/0007395 A1* | 1/2022 | Lei | ........................ | H04L 1/0003 |
| 2023/0015915 A1* | 1/2023 | Zhang | .................... | H04W 72/02 |
| 2023/0403711 A1* | 12/2023 | Abotabl | ................ | H04L 1/1864 |
| 2024/0137195 A1* | 4/2024 | Abotabl | .................... | H04L 5/14 |
| 2024/0276267 A1* | 8/2024 | Ibrahim | ................ | H04W 24/10 |
| 2024/0276499 A1* | 8/2024 | Ibrahim | ................ | H04B 7/0626 |

* cited by examiner

*Primary Examiner* — Robert J Lopata
(74) *Attorney, Agent, or Firm* — Holland & Hart LLP

(57) ABSTRACT

Methods, systems, and devices for wireless communications are described. A user equipment (UE) may receive an indication that a set of occasions for a message occurs over multiple symbols. The multiple symbols may include a set of full-duplex symbols and a set of half-duplex symbols. The UE may select one or more resources for communicating the message via a first occasion of the set of occasions in accordance with a set of rules and based on the first occasion being included in a first slot type or a second slot type. The first slot type may correspond to one or more half-duplex symbols of the set of half-duplex symbols and the second slot type may correspond to one or more full-duplex symbols of the set of full-duplex symbols. The UE may communicate the message using the one or more selected resources.

30 Claims, 24 Drawing Sheets

Control Message

Multi-PDSCH Message

Multi-PUSCH Message

215

210

205

105-a 115-a

200

130

105

115

Network
Entity

Transceiver

1710

Antenna

1715

Communications
Manager

1720

Memory

Code

1730

1725

1740

Processor

1735

1705

1700

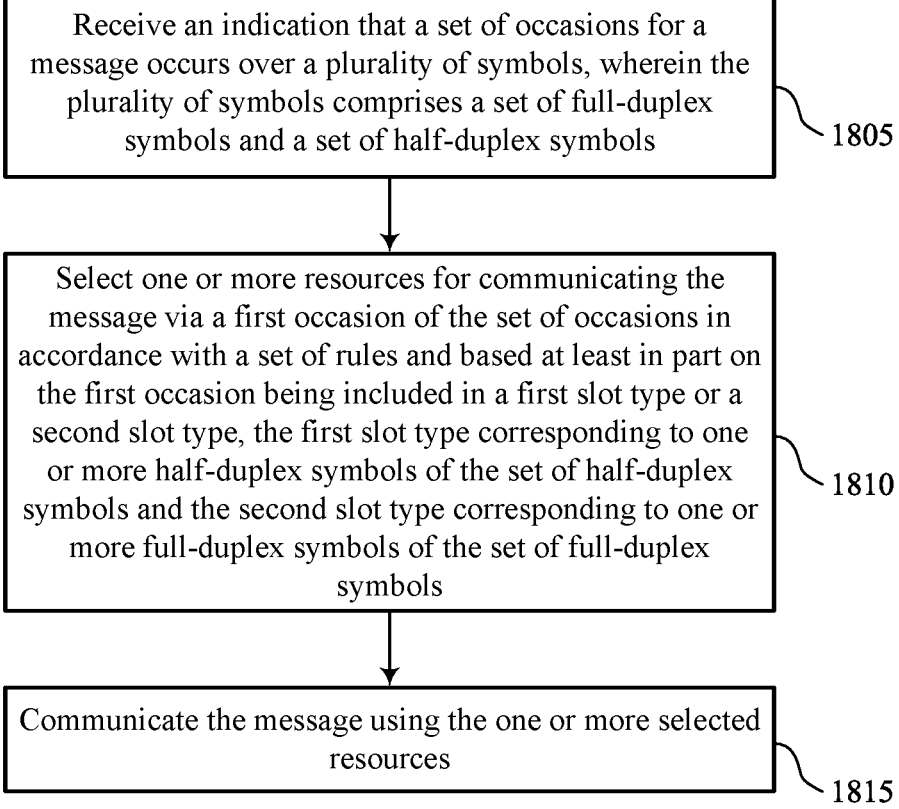

Receive an indication that a set of occasions for a message occurs over a plurality of symbols, wherein the plurality of symbols comprises a set of full-duplex symbols and a set of half-duplex symbols

1805

Select one or more resources for communicating the message via a first occasion of the set of occasions in accordance with a set of rules and based at least in part on the first occasion being included in a first slot type or a second slot type, the first slot type corresponding to one or more half-duplex symbols of the set of half-duplex symbols and the second slot type corresponding to one or more full-duplex symbols of the set of full-duplex symbols

1810

Communicate the message using the one or more selected resources

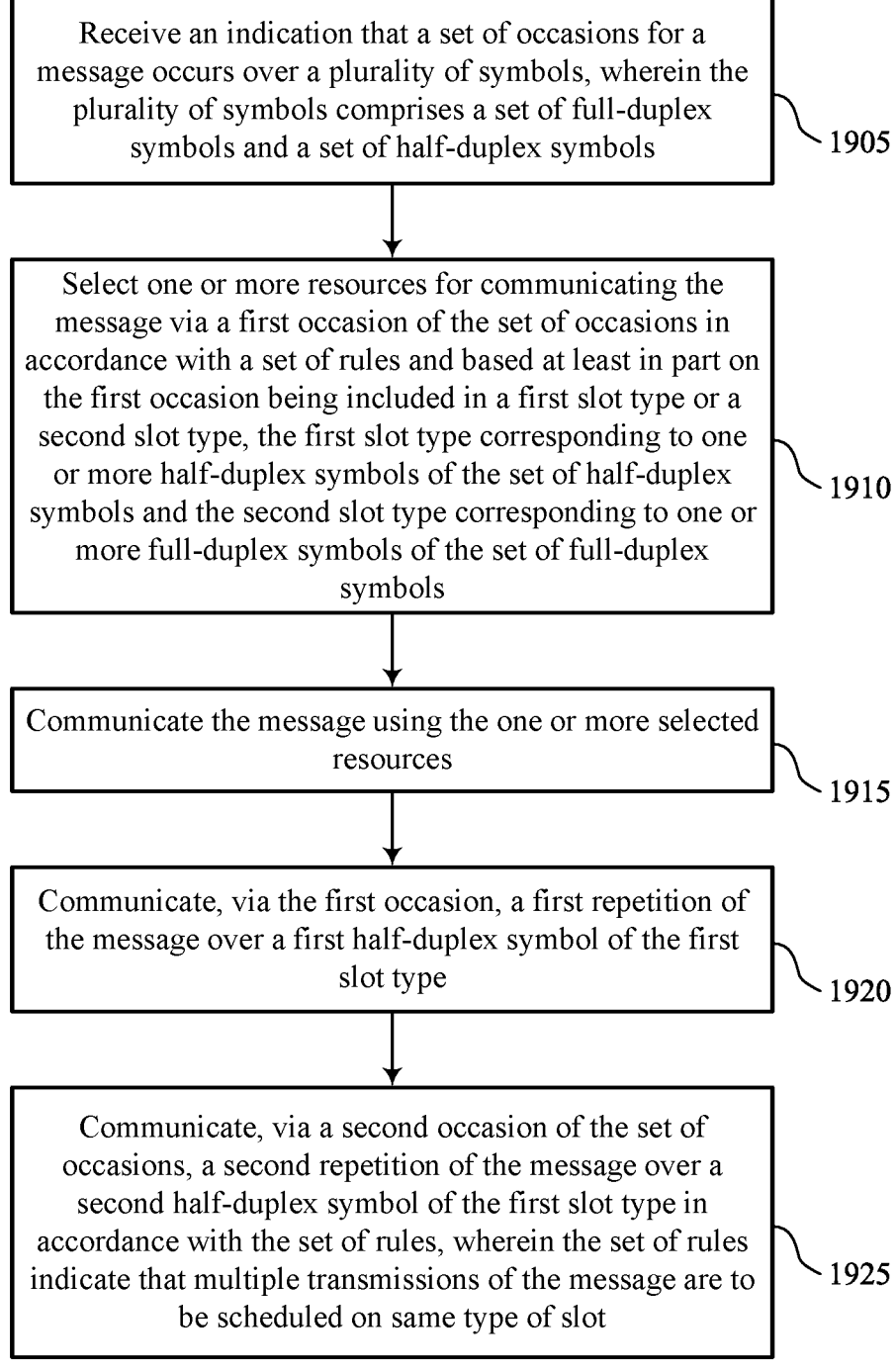

Receive an indication that a set of occasions for a message occurs over a plurality of symbols, wherein the plurality of symbols comprises a set of full-duplex symbols and a set of half-duplex symbols

1905

Select one or more resources for communicating the message via a first occasion of the set of occasions in accordance with a set of rules and based at least in part on the first occasion being included in a first slot type or a second slot type, the first slot type corresponding to one or more half-duplex symbols of the set of half-duplex symbols and the second slot type corresponding to one or more full-duplex symbols of the set of full-duplex symbols

1910

Communicate the message using the one or more selected resources

1915

Communicate, via the first occasion, a first repetition of the message over a first half-duplex symbol of the first slot type

1920

Communicate, via a second occasion of the set of occasions, a second repetition of the message over a second half-duplex symbol of the first slot type in accordance with the set of rules, wherein the set of rules indicate that multiple transmissions of the message are to be scheduled on same type of slot

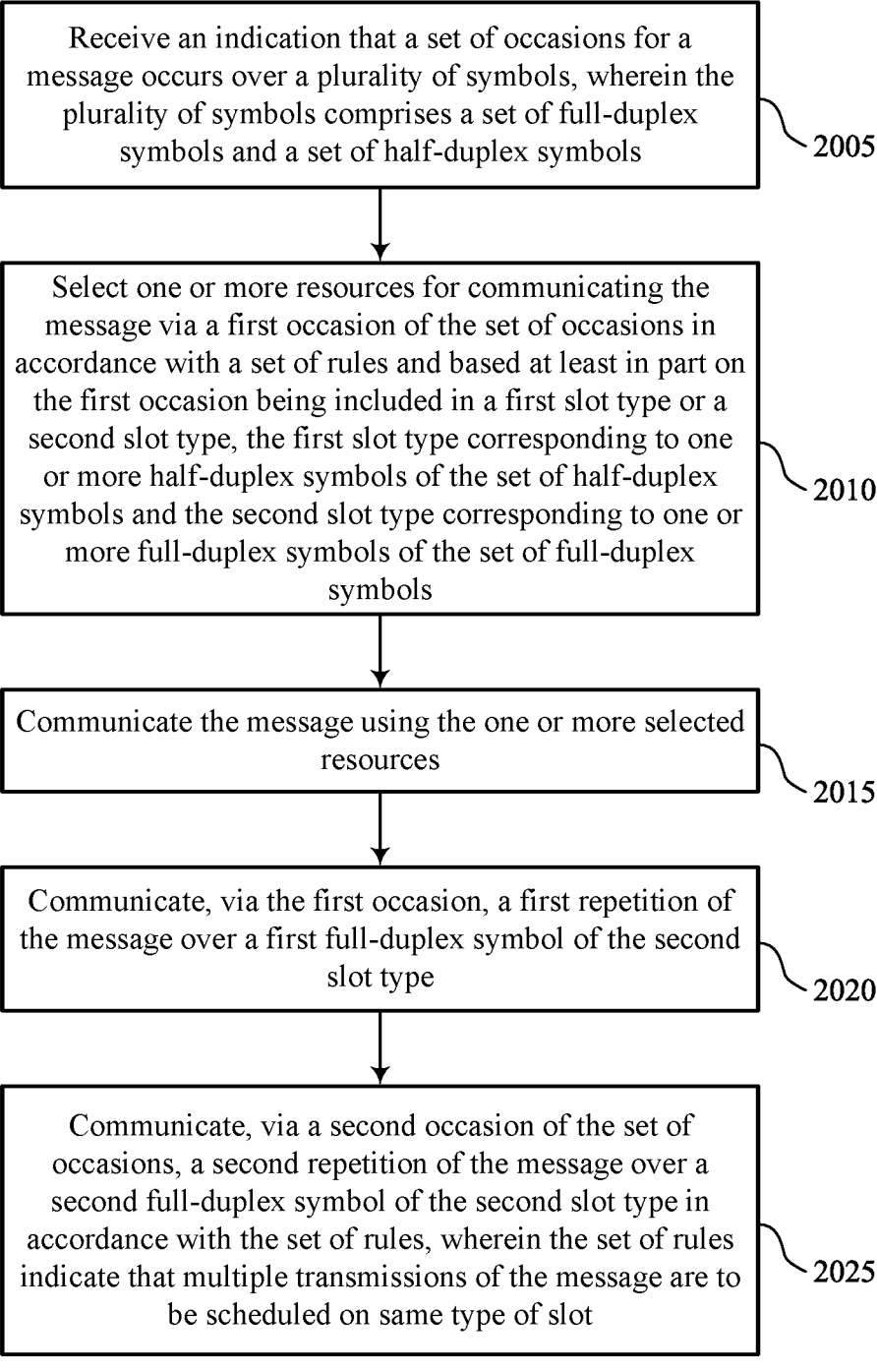

Receive an indication that a set of occasions for a message occurs over a plurality of symbols, wherein the plurality of symbols comprises a set of full-duplex symbols and a set of half-duplex symbols ⌐ 2005

Select one or more resources for communicating the message via a first occasion of the set of occasions in accordance with a set of rules and based at least in part on the first occasion being included in a first slot type or a second slot type, the first slot type corresponding to one or more half-duplex symbols of the set of half-duplex symbols and the second slot type corresponding to one or more full-duplex symbols of the set of full-duplex symbols ⌐ 2010

Communicate the message using the one or more selected resources ⌐ 2015

Communicate, via the first occasion, a first repetition of the message over a first full-duplex symbol of the second slot type ⌐ 2020

Communicate, via a second occasion of the set of occasions, a second repetition of the message over a second full-duplex symbol of the second slot type in accordance with the set of rules, wherein the set of rules indicate that multiple transmissions of the message are to be scheduled on same type of slot ⌐ 2025

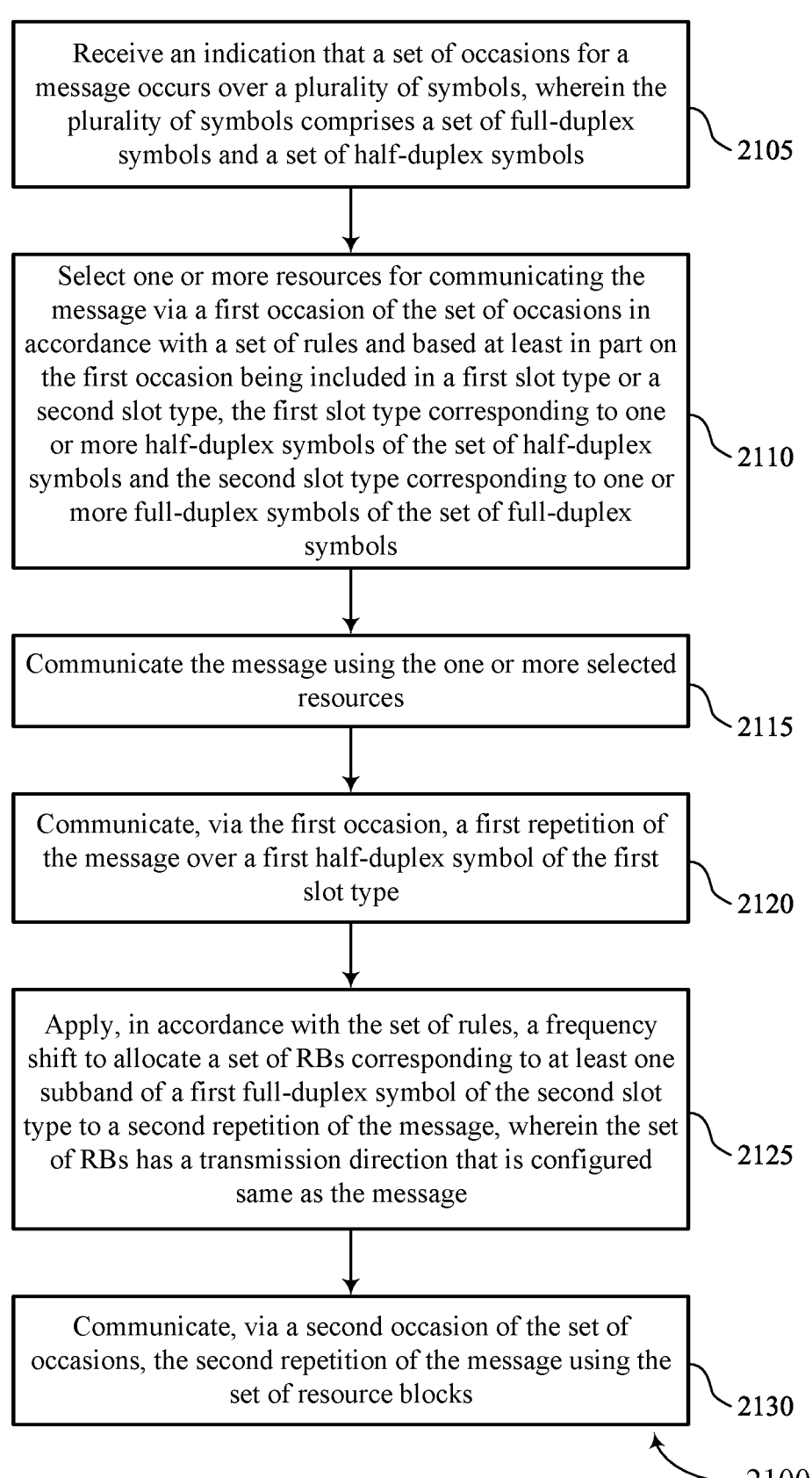

Receive an indication that a set of occasions for a message occurs over a plurality of symbols, wherein the plurality of symbols comprises a set of full-duplex symbols and a set of half-duplex symbols ⟋2105

Select one or more resources for communicating the message via a first occasion of the set of occasions in accordance with a set of rules and based at least in part on the first occasion being included in a first slot type or a second slot type, the first slot type corresponding to one or more half-duplex symbols of the set of half-duplex symbols and the second slot type corresponding to one or more full-duplex symbols of the set of full-duplex symbols ⟋2110

Communicate the message using the one or more selected resources ⟋2115

Communicate, via the first occasion, a first repetition of the message over a first half-duplex symbol of the first slot type ⟋2120

Apply, in accordance with the set of rules, a frequency shift to allocate a set of RBs corresponding to at least one subband of a first full-duplex symbol of the second slot type to a second repetition of the message, wherein the set of RBs has a transmission direction that is configured same as the message ⟋2125

Communicate, via a second occasion of the set of occasions, the second repetition of the message using the set of resource blocks ⟋2130

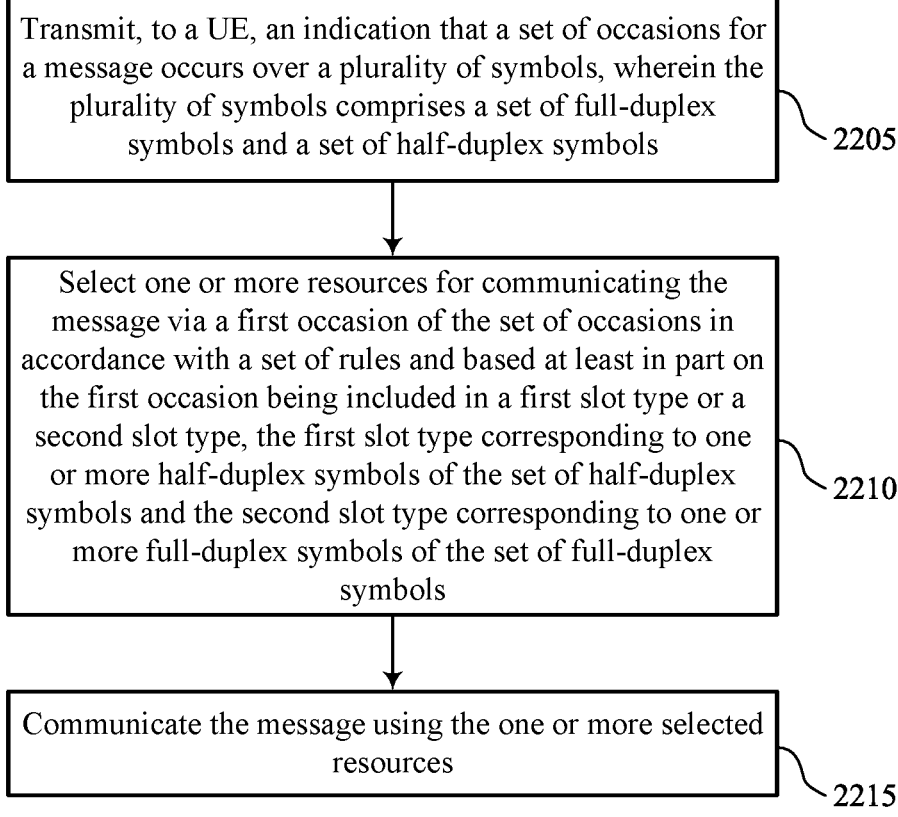

Transmit, to a UE, an indication that a set of occasions for a message occurs over a plurality of symbols, wherein the plurality of symbols comprises a set of full-duplex symbols and a set of half-duplex symbols

2205

Select one or more resources for communicating the message via a first occasion of the set of occasions in accordance with a set of rules and based at least in part on the first occasion being included in a first slot type or a second slot type, the first slot type corresponding to one or more half-duplex symbols of the set of half-duplex symbols and the second slot type corresponding to one or more full-duplex symbols of the set of full-duplex symbols

2210

Communicate the message using the one or more selected resources

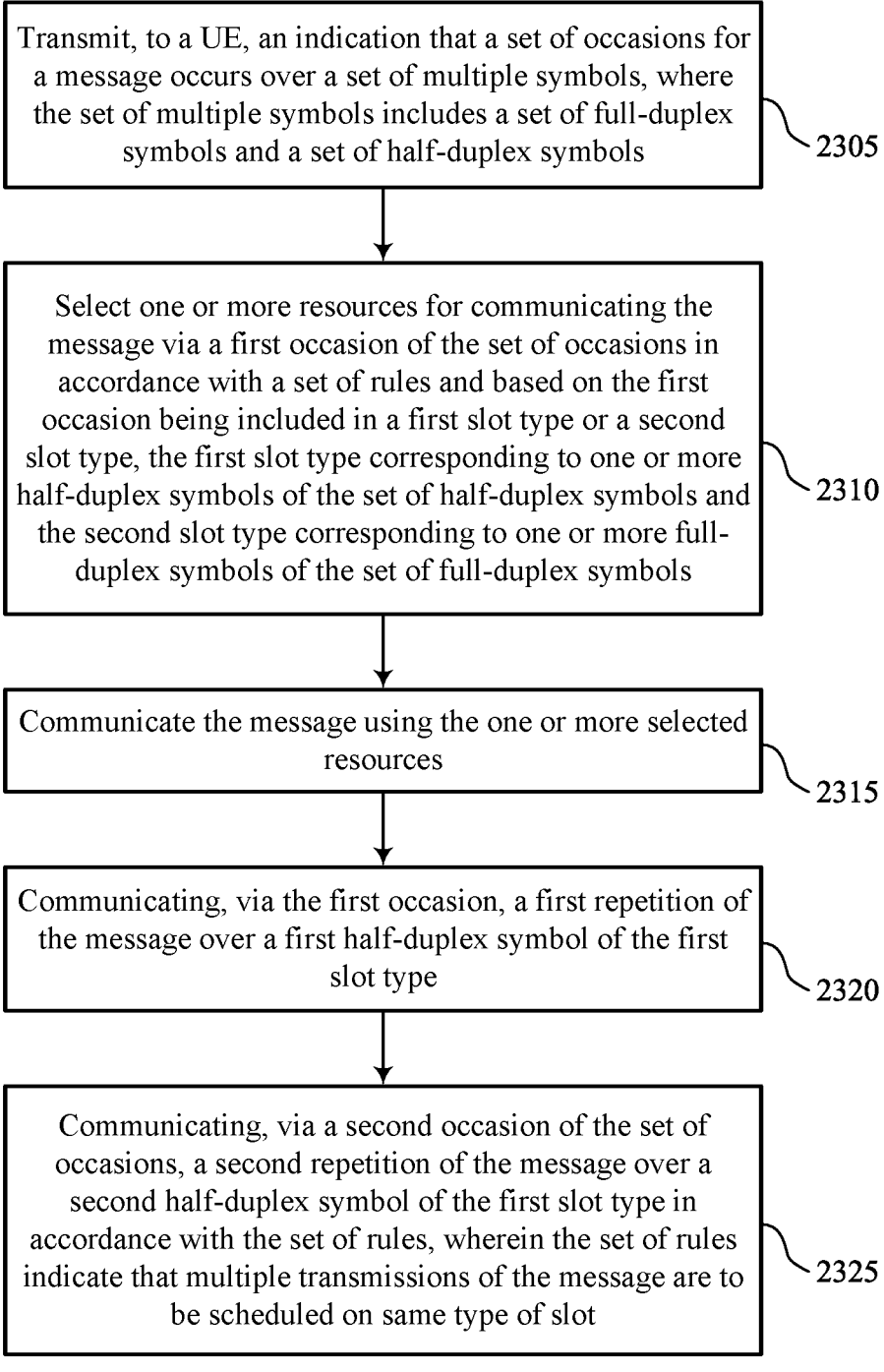

Transmit, to a UE, an indication that a set of occasions for a message occurs over a set of multiple symbols, where the set of multiple symbols includes a set of full-duplex symbols and a set of half-duplex symbols

2305

Select one or more resources for communicating the message via a first occasion of the set of occasions in accordance with a set of rules and based on the first occasion being included in a first slot type or a second slot type, the first slot type corresponding to one or more half-duplex symbols of the set of half-duplex symbols and the second slot type corresponding to one or more full-duplex symbols of the set of full-duplex symbols

2310

Communicate the message using the one or more selected resources

2315

Communicating, via the first occasion, a first repetition of the message over a first half-duplex symbol of the first slot type

2320

Communicating, via a second occasion of the set of occasions, a second repetition of the message over a second half-duplex symbol of the first slot type in accordance with the set of rules, wherein the set of rules indicate that multiple transmissions of the message are to be scheduled on same type of slot

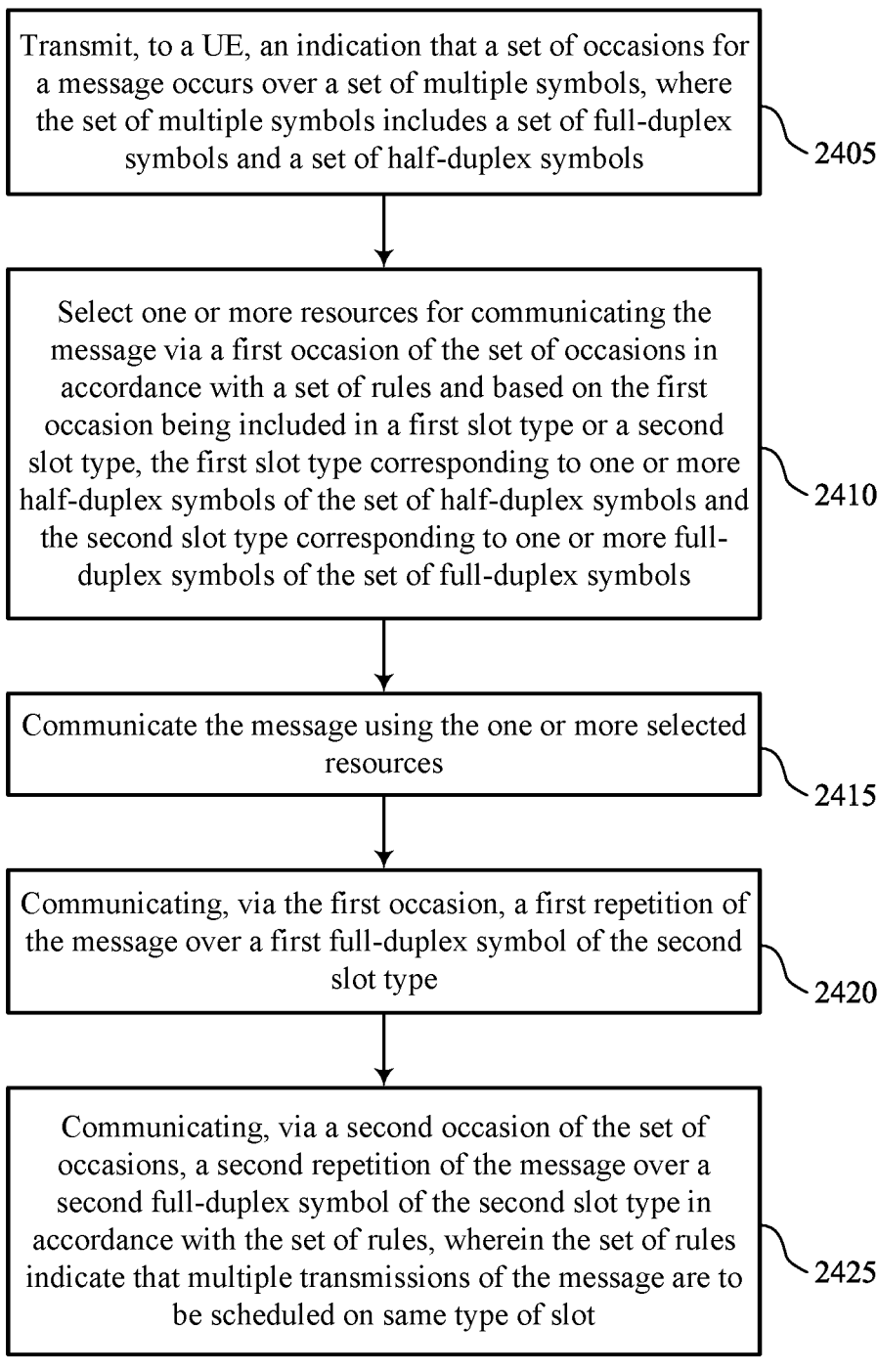

Transmit, to a UE, an indication that a set of occasions for a message occurs over a set of multiple symbols, where the set of multiple symbols includes a set of full-duplex symbols and a set of half-duplex symbols

2405

Select one or more resources for communicating the message via a first occasion of the set of occasions in accordance with a set of rules and based on the first occasion being included in a first slot type or a second slot type, the first slot type corresponding to one or more half-duplex symbols of the set of half-duplex symbols and the second slot type corresponding to one or more full-duplex symbols of the set of full-duplex symbols

2410

Communicate the message using the one or more selected resources

2415

Communicating, via the first occasion, a first repetition of the message over a first full-duplex symbol of the second slot type

2420

Communicating, via a second occasion of the set of occasions, a second repetition of the message over a second full-duplex symbol of the second slot type in accordance with the set of rules, wherein the set of rules indicate that multiple transmissions of the message are to be scheduled on same type of slot

MULTIPLE TRANSMISSIONS WITH SUBBAND FULL-DUPLEX OPERATION

CROSS REFERENCE

The present application for patent claims the benefit of U.S. Provisional Patent Application No. 63/485,125 by MONDET et al., entitled "MULTIPLE TRANSMISSIONS WITH SUBBAND FULL-DUPLEX OPERATION," filed Feb. 15, 2023, assigned to the assignee hereof, and expressly incorporated by reference herein.

FIELD OF TECHNOLOGY

The following relates to wireless communications, including multiple transmissions with subband full-duplex operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UE). In some wireless communications systems, a network entity may schedule multiple transmissions at a UE. The network entity may schedule the multiple transmissions in accordance with a subband full-duplex operation.

SUMMARY

The described techniques relate to improved methods, systems, devices, and apparatuses that support multiple transmissions with subband full-duplex (SBFD) operation. For example, the described techniques provide for a set of rules that modifies scheduling of a message that includes multiple transmissions at a user equipment (UE). In some examples, the UE or a network entity may select resources for communicating the message based on the set of rules indicating that the multiple transmissions of the message are scheduled on a same slot type. The network entity may schedule each of the multiple transmissions of the message on slots configured with SBFD or may schedule each of the multiple transmissions of the message on slots not configured with SBFD. That is, the set of rules may indicate that the network entity is to schedule the multiple transmissions of the message in non-consecutive slots. In other examples, the set of rules may indicate that the network entity is to modify scheduling of subsequent transmissions of the message based on a first transmission of the message occurring in a specified slot type (e.g., configured with SBFD, not configured with SBFD). For example, the network entity may perform a frequency shift on the subsequent transmissions of the message and may indicate the frequency shift to the UE.

A method for wireless communication at a user equipment (UE) is described. The method may include receiving an indication that a set of occasions for a message occurs over a set of multiple symbols, where the set of multiple symbols includes a set of full-duplex symbols and a set of half-duplex symbols, selecting one or more resources for communicating the message via a first occasion of the set of occasions in accordance with a set of rules and based on the first occasion being included in a first slot type or a second slot type, the first slot type corresponding to one or more half-duplex symbols of the set of half-duplex symbols and the second slot type corresponding to one or more full-duplex symbols of the set of full-duplex symbols, and communicating the message using the one or more selected resources.

An apparatus for wireless communication at a UE is described. The apparatus may include a processor and a memory coupled with the processor. The memory may include instructions executable by the processor to cause the apparatus to receive an indication that a set of occasions for a message occurs over a set of multiple symbols, where the set of multiple symbols includes a set of full-duplex symbols and a set of half-duplex symbols, select one or more resources for communicating the message via a first occasion of the set of occasions in accordance with a set of rules and based on the first occasion being included in a first slot type or a second slot type, the first slot type corresponding to one or more half-duplex symbols of the set of half-duplex symbols and the second slot type corresponding to one or more full-duplex symbols of the set of full-duplex symbols, and communicate the message using the one or more selected resources.

Another apparatus for wireless communication at a UE is described. The apparatus may include means for receiving an indication that a set of occasions for a message occurs over a set of multiple symbols, where the set of multiple symbols includes a set of full-duplex symbols and a set of half-duplex symbols, means for selecting one or more resources for communicating the message via a first occasion of the set of occasions in accordance with a set of rules and based on the first occasion being included in a first slot type or a second slot type, the first slot type corresponding to one or more half-duplex symbols of the set of half-duplex symbols and the second slot type corresponding to one or more full-duplex symbols of the set of full-duplex symbols, and means for communicating the message using the one or more selected resources.

A non-transitory computer-readable medium storing code for wireless communication at a UE is described. The code may include instructions executable by a processor to receive an indication that a set of occasions for a message occurs over a set of multiple symbols, where the set of multiple symbols includes a set of full-duplex symbols and a set of half-duplex symbols, select one or more resources for communicating the message via a first occasion of the set of occasions in accordance with a set of rules and based on the first occasion being included in a first slot type or a second slot type, the first slot type corresponding to one or more half-duplex symbols of the set of half-duplex symbols and the second slot type corresponding to one or more full-duplex symbols of the set of full-duplex symbols, and communicate the message using the one or more selected resources.

In some examples of the method, apparatuses, and non-transitory computer-readable medium described herein, communicating the message may include operations, features, means, or instructions for communicating, via the first occasion, a first repetition of the message over a first half-duplex symbol of the first slot type and communicating, via a second occasion of the set of occasions, a second repetition of the message over a second half-duplex symbol of the first slot type in accordance with the set of rules, where the set of rules indicate that multiple transmissions of the message may be scheduled on same type of slot.

In some examples of the method, apparatuses, and non-transitory computer-readable medium described herein, communicating the message may include operations, features, means, or instructions for communicating, via the first occasion, a first repetition of the message over a first full-duplex symbol of the second slot type and communicating, via a second occasion of the set of occasions, a second repetition of the message over a second full-duplex symbol of the second slot type in accordance with the set of rules, where the set of rules indicate that multiple transmissions of the message may be scheduled on same type of slot.

In some examples of the method, apparatuses, and non-transitory computer-readable medium described herein, communicating the message may include operations, features, means, or instructions for communicating, via the first occasion, the message using a set of resource blocks (RBs) corresponding to at least one subband of a first full-duplex symbol of the second slot type, where the set of RBs may have a transmission direction that may be configured same as the message.

In some examples of the method, apparatuses, and non-transitory computer-readable medium described herein, communicating the message may include operations, features, means, or instructions for communicating, via the first occasion, a first repetition of the message over a first half-duplex symbol of the first slot type, applying, in accordance with the set of rules, a frequency shift to allocate a set of RBs corresponding to at least one subband of a first full-duplex symbol of the second slot type to a second repetition of the message, where the set of RBs may have a transmission direction that may be configured same as the message, and communicating, via a second occasion of the set of occasions, the second repetition of the message using the set of RBs.

Some examples of the method, apparatuses, and non-transitory computer-readable medium described herein may further include operations, features, means, or instructions for receiving, from a network entity, a control signal indicating the frequency shift to be applied to the second repetition of the message.

In some examples of the method, apparatuses, and non-transitory computer-readable medium described herein, the frequency shift includes an indication of a number of RBs, a number of subbands, or both.

Some examples of the method, apparatuses, and non-transitory computer-readable medium described herein may further include operations, features, means, or instructions for receiving, from a network entity, a first control signal indicating a set of values for the frequency shift to be applied to the second repetition of the message and receiving, from the network entity, a second control signal selecting a value for the frequency shift from the set of values.

Some examples of the method, apparatuses, and non-transitory computer-readable medium described herein may further include operations, features, means, or instructions for receiving, from a network entity, a control signal including a frequency domain resource assignment (FDRA) parameter indicating a RB allocation for the message.

In some examples of the method, apparatuses, and non-transitory computer-readable medium described herein, the FDRA parameter may be set to a number of RBs or RB groups included in a bandwidth part for the first slot type or a number of RBs or RB groups having a transmission direction that may be configured same as the message for the second slot type.

Some examples of the method, apparatuses, and non-transitory computer-readable medium described herein may further include operations, features, means, or instructions for selecting, in accordance with the set of rules, a subset of RBs from the RB allocation indicated in the FDRA parameter for communicating the message using the second slot type. where the FDRA parameter may be set to a number of RBs or RB groups included in a bandwidth part for the first slot type.

Some examples of the method, apparatuses, and non-transitory computer-readable medium described herein may further include operations, features, means, or instructions for selecting, in accordance with the set of rules, a first subset of RBs from the RB allocation indicated in the FDRA parameter for communicating the message using the first slot type and identifying a second subset of RBs appended to the RB allocation indicated in the FDRA parameter for communicating the message using the first slot type, where the FDRA parameter may be set to a number of RBs or RB groups having a transmission direction that may be configured same as the message for the second slot type.

Some examples of the method, apparatuses, and non-transitory computer-readable medium described herein may further include operations, features, means, or instructions for receiving, from the network entity, an indication of a shift to be applied to the FDRA parameter, where selecting the one or more resources for communicating the message may be based on the shift.

In some examples of the method, apparatuses, and non-transitory computer-readable medium described herein, the shift includes a value, or an index to a table, or both.

Some examples of the method, apparatuses, and non-transitory computer-readable medium described herein may further include operations, features, means, or instructions for receiving, from a network entity, a control signal including a resource indication value (RIV) indicating at least one of a starting RB of a RB allocation for the message, a number of RBs in the RB allocation, a size of RBs in a bandwidth part, or a combination thereof, where selecting the one or more resources for communicating the message may be based on receiving the control signal.

Some examples of the method, apparatuses, and non-transitory computer-readable medium described herein may further include operations, features, means, or instructions for selecting, in accordance with the set of rules, an updated starting RB based on a frequency shift value added to the starting RB and selecting, in accordance with the set of rules, an updated number of RBs based on a minimum of the number of RBs and a second number of RBs reserved for communicating message, where the RIV may be set for the first slot type.

Some examples of the method, apparatuses, and non-transitory computer-readable medium described herein may further include operations, features, means, or instructions for selecting, in accordance with the set of rules, an updated starting RB based on a frequency shift value added to a starting RB of the bandwidth part, where the RIV may be set for the second slot type.

Some examples of the method, apparatuses, and non-transitory computer-readable medium described herein may further include operations, features, means, or instructions for receiving, from a network entity, a control signal including a first FDRA parameter indicating a first RB allocation for communicating the message via the first slot type and a second FDRA parameter indicating a second RB allocation for communicating the message via the second slot type.

Some examples of the method, apparatuses, and non-transitory computer-readable medium described herein may further include operations, features, means, or instructions for receiving, from a network entity, a control signal indicating the set of rules.

Some examples of the method, apparatuses, and non-transitory computer-readable medium described herein may further include operations, features, means, or instructions for receiving, from a network entity, a control signal indicating a first modulation and coding scheme to be applied to the first slot type and a second modulation and coding scheme to be applied to the second slot type.

In some examples of the method, apparatuses, and non-transitory computer-readable medium described herein, the second modulation and coding scheme may be indicated as an absolute value or as a value relative to the first modulation and coding scheme.

In some examples of the method, apparatuses, and non-transitory computer-readable medium described herein, the control signal includes at least one of a radio resource control signal, a medium access control layer control element (MAC-CE), a downlink control indicator indicating the second modulation and coding scheme as at least one of an absolute value, a value relative to the first modulation and coding scheme, or an index to a table of values, or a combination thereof.

In some examples of the method, apparatuses, and non-transitory computer-readable medium described herein, an occasion of the set of occasions correspond to at least one of a physical downlink shared channel (PDSCH), a repetition of multiple PDSCHs, a physical uplink shared channel (PUSCH), a repetition of multiple PUSCHs, or a combination thereof.

A method for wireless communication at a network entity is described. The method may include transmitting, to a UE, an indication that a set of occasions for a message occurs over a set of multiple symbols, where the set of multiple symbols includes a set of full-duplex symbols and a set of half-duplex symbols, selecting one or more resources for communicating the message via a first occasion of the set of occasions in accordance with a set of rules and based on the first occasion being included in a first slot type or a second slot type, the first slot type corresponding to one or more half-duplex symbols of the set of half-duplex symbols and the second slot type corresponding to one or more full-duplex symbols of the set of full-duplex symbols, and communicating the message using the one or more selected resources.

An apparatus for wireless communication at a network entity is described. The apparatus may include a processor and a memory coupled with the processor. The memory may include instructions executable by the processor to cause the apparatus to transmit, to a UE, an indication that a set of occasions for a message occurs over a set of multiple symbols, where the set of multiple symbols includes a set of full-duplex symbols and a set of half-duplex symbols, select one or more resources for communicating the message via a first occasion of the set of occasions in accordance with a set of rules and based on the first occasion being included in a first slot type or a second slot type, the first slot type corresponding to one or more half-duplex symbols of the set of half-duplex symbols and the second slot type corresponding to one or more full-duplex symbols of the set of full-duplex symbols, and communicate the message using the one or more selected resources.

Another apparatus for wireless communication at a network entity is described. The apparatus may include means for transmitting, to a UE, an indication that a set of occasions for a message occurs over a set of multiple symbols, where the set of multiple symbols includes a set of full-duplex symbols and a set of half-duplex symbols, means for selecting one or more resources for communicating the message via a first occasion of the set of occasions in accordance with a set of rules and based on the first occasion being included in a first slot type or a second slot type, the first slot type corresponding to one or more half-duplex symbols of the set of half-duplex symbols and the second slot type corresponding to one or more full-duplex symbols of the set of full-duplex symbols, and means for communicating the message using the one or more selected resources.

A non-transitory computer-readable medium storing code for wireless communication at a network entity is described. The code may include instructions executable by a processor to transmit, to a UE, an indication that a set of occasions for a message occurs over a set of multiple symbols, where the set of multiple symbols includes a set of full-duplex symbols and a set of half-duplex symbols, select one or more resources for communicating the message via a first occasion of the set of occasions in accordance with a set of rules and based on the first occasion being included in a first slot type or a second slot type, the first slot type corresponding to one or more half-duplex symbols of the set of half-duplex symbols and the second slot type corresponding to one or more full-duplex symbols of the set of full-duplex symbols, and communicate the message using the one or more selected resources.

In some examples of the method, apparatuses, and non-transitory computer-readable medium described herein, communicating the message may include operations, features, means, or instructions for communicating, via the first occasion, a first repetition of the message over a first half-duplex symbol of the first slot type and communicating, via a second occasion of the set of occasions, a second repetition of the message over a second half-duplex symbol of the first slot type in accordance with the set of rules, where the set of rules indicate that multiple transmissions of the message may be scheduled on same type of slot.

In some examples of the method, apparatuses, and non-transitory computer-readable medium described herein, communicating the message may include operations, features, means, or instructions for communicating, via the first occasion, a first repetition of the message over a first full-duplex symbol of the second slot type and communicating, via a second occasion of the set of occasions, a second repetition of the message over a second full-duplex symbol of the second slot type in accordance with the set of rules, where the set of rules indicate that multiple transmissions of the message may be scheduled on same type of slot.

In some examples of the method, apparatuses, and non-transitory computer-readable medium described herein, communicating the message may include operations, features, means, or instructions for communicating, via the first occasion, the message using a set of RBs corresponding to at least one subband of a first full-duplex symbol of the second slot type, where the set of RBs may have a transmission direction that may be configured same as the message.

In some examples of the method, apparatuses, and non-transitory computer-readable medium described herein, communicating the message may include operations, features, means, or instructions for communicating, via the first occasion, a first repetition of the message over a first half-duplex symbol of the first slot type, applying, in accordance with the set of rules, a frequency shift to allocate a set of RBs corresponding to at least one subband of a first full-duplex symbol of the second slot type to a second repetition of the message, where the set of RBs may have a transmission direction that may be configured same as the message, and communicating, via a second occasion of the set of occasions, the second repetition of the message using the set of RBs.

Some examples of the method, apparatuses, and non-transitory computer-readable medium described herein may further include operations, features, means, or instructions for transmitting, to the UE, a control signal indicating the frequency shift to be applied to the second repetition of the message.

In some examples of the method, apparatuses, and non-transitory computer-readable medium described herein, the frequency shift includes an indication of a number of RBs, a number of subbands, or both.

Some examples of the method, apparatuses, and non-transitory computer-readable medium described herein may further include operations, features, means, or instructions for transmitting, to the UE, a first control signal indicating a set of values for the frequency shift to be applied to the second repetition of the message and transmitting, to the UE, a second control signal selecting a value for the frequency shift from the set of values.

Some examples of the method, apparatuses, and non-transitory computer-readable medium described herein may further include operations, features, means, or instructions for transmitting, to the UE, a control signal including an FDRA parameter indicating a RB allocation for the message.

In some examples of the method, apparatuses, and non-transitory computer-readable medium described herein, the FDRA parameter may be set to a number of RBs or RB groups included in a bandwidth part for the first slot type or a number of RBs or RB groups having a transmission direction that may be configured same as the message for the second slot type.

Some examples of the method, apparatuses, and non-transitory computer-readable medium described herein may further include operations, features, means, or instructions for selecting, in accordance with the set of rules, a subset of RBs from the RB allocation indicated in the FDRA parameter for communicating the message using the second slot type. where the FDRA parameter may be set to a number of RBs or RB groups included in a bandwidth part for the first slot type.

Some examples of the method, apparatuses, and non-transitory computer-readable medium described herein may further include operations, features, means, or instructions for selecting, in accordance with the set of rules, a first subset of RBs from the RB allocation indicated in the FDRA parameter for communicating the message using the first slot type and identifying a second subset of RBs appended to the RB allocation indicated in the FDRA parameter for communicating the message using the first slot type, where the FDRA parameter may be set to a number of RBs or RB groups having a transmission direction that may be configured same as the message for the second slot type.

Some examples of the method, apparatuses, and non-transitory computer-readable medium described herein may further include operations, features, means, or instructions for transmitting, to the UE, an indication of a shift to be applied to the FDRA parameter, where selecting the one or more resources for communicating the message may be based on the shift.

In some examples of the method, apparatuses, and non-transitory computer-readable medium described herein, the shift includes a value, or an index to a table, or both.

Some examples of the method, apparatuses, and non-transitory computer-readable medium described herein may further include operations, features, means, or instructions for transmitting, to the UE, a control signal including a RIV indicating at least one of a starting RB of a RB allocation for the message, a number of RBs in the RB allocation, a size of RBs in a bandwidth part, or a combination thereof, where selecting the one or more resources for communicating the message may be based on transmitting the control signal.

Some examples of the method, apparatuses, and non-transitory computer-readable medium described herein may further include operations, features, means, or instructions for selecting, in accordance with the set of rules, an updated starting RB based on a frequency shift value added to the starting RB and selecting, in accordance with the set of rules, an updated number of RBs based on a minimum of the number of RBs and a second number of RBs reserved for communicating message, where the RIV may be set for the first slot type.

Some examples of the method, apparatuses, and non-transitory computer-readable medium described herein may further include operations, features, means, or instructions for selecting, in accordance with the set of rules, an updated starting RB based on a frequency shift value added to a starting RB of the bandwidth part, where the RIV may be set for the second slot type.

Some examples of the method, apparatuses, and non-transitory computer-readable medium described herein may further include operations, features, means, or instructions for transmitting, to the UE, a control signal including a first FDRA parameter indicating a first RB allocation for communicating the message via the first slot type and a second FDRA parameter indicating a second RB allocation for communicating the message via the second slot type.

Some examples of the method, apparatuses, and non-transitory computer-readable medium described herein may further include operations, features, means, or instructions for transmitting, to the UE, a control signal indicating the set of rules.

Some examples of the method, apparatuses, and non-transitory computer-readable medium described herein may further include operations, features, means, or instructions for transmitting, to the UE, a control signal indicating a first modulation and coding scheme to be applied to the first slot type and a second modulation and coding scheme to be applied to the second slot type.

In some examples of the method, apparatuses, and non-transitory computer-readable medium described herein, the second modulation and coding scheme may be indicated as an absolute value or as a value relative to the first modulation and coding scheme.

In some examples of the method, apparatuses, and non-transitory computer-readable medium described herein, the control signal includes at least one of a radio resource control signal, a MAC-CE, a downlink control indicator indicating the second modulation and coding scheme as at least one of an absolute value, a value relative to the first modulation and coding scheme, or an index to a table of values, or a combination thereof.

In some examples of the method, apparatuses, and non-transitory computer-readable medium described herein, an occasion of the set of occasions correspond to at least one of a PDSCH, a repetition of multiple PDSCHs, a PUSCH, a repetition of multiple PUSCHs, or a combination thereof.

BRIEF DESCRIPTION OF THE DRAWINGS

FIGS. 18 through 24 illustrate flowcharts showing methods that support multiple transmissions with subband full-duplex operation in accordance with one or more aspects of the present disclosure.

DETAILED DESCRIPTION

Figure 1:
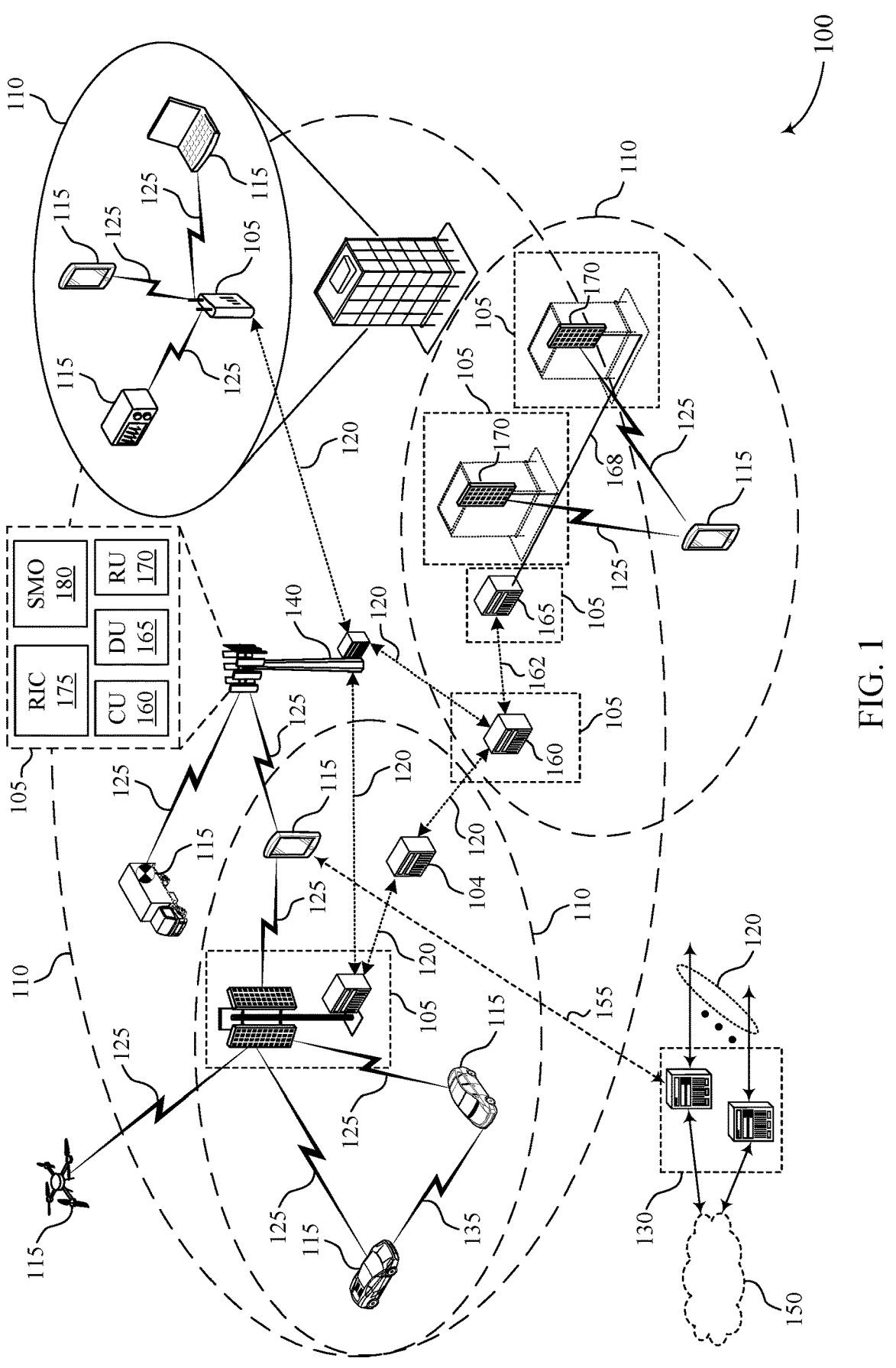
FIG. 1 illustrates an example of a wireless communications system that supports multiple transmissions with subband full-duplex operation in accordance with one or more aspects of the present disclosure.

In some wireless communications systems supporting extended reality (XR) or cloud gaming (CG) applications, a network entity may schedule multiple physical uplink shared channel (multi-PUSCH) messages or multiple physical downlink shared channel (multi-PDSCH) messages for a user equipment (UE). For example, the network entity may schedule, via a single control message, multiple transmissions (e.g., transport blocks (TBs)), and each transmission (e.g., TB) of the multiple transmissions may include multiple repetitions. The network entity may schedule the multiple transmissions (e.g., TBs, repetitions of a TB) of the multi-PUSCH message or multi-PDSCH message in consecutive slots with a same frequency domain resource allocation. In some cases, a network entity may schedule transmissions in accordance with a subband full-duplex (SBFD) operation, where the network entity reserves some subbands for uplink transmissions and some subbands for downlink transmissions within a same slot, referred to herein as an SBFD slot.

In such examples, a network entity may be limited by which resource blocks (RBs) the network entity may allocate to transmissions of a multi-PUSCH or multi-PDSCH message, while maintaining that the multiple transmissions of a multi-PUSCH or multi-PDSCH message are scheduled in consecutive slots with a same frequency domain resource allocation. That is, a network entity may be unable to allocate RBs to transmissions of the multi-PUSCH message or multi-PDSCH message, where the RBs are within subbands reserved for uplink in an SBFD slot.

In accordance with the examples described herein, and to support increased scheduling flexibility of multi-PUSCH or multi-PDSCH messages, a network entity may modify scheduling of the multiple transmissions of a multi-PUSCH message or multi-PDSCH message in accordance with a set of rules. In some examples, a network entity may perform slot restriction by scheduling additional transmissions (e.g., TBs, repetitions of a TB) of a multi-PDSCH or multi-PUSCH message in a same slot type as a first transmission of the multi-PDSCH or multi-PUSCH message. For example, the network entity may schedule a first transmission (e.g., occasion) of the multi-PDSCH or multi-PUSCH message in a slot type (e.g., non-SBFD, SBFD) and may schedule subsequent transmissions (e.g., occasions) of the multi-PDSCH or multi-PUSCH message in one or more subsequent slots of the same slot type as the first transmission. In some other examples, the network entity may schedule a first transmission of a multi-PDSCH or multi-PUSCH message in a non-SBFD slot and may perform a frequency shift on an RB allocation for a subsequent transmission in an SBFD slot, shifting the RB allocation to be within subbands reserved for the type (e.g., uplink, downlink) of the transmission in the SBFD slot. In some cases, the network entity or the UE may interpret a frequency domain resource assignment (FDRA) parameter for a subsequent transmission of a multi-PUSCH or multi-PDSCH message based on whether the network entity schedules the first transmission in an SBFD slot or a non-SBFD slot. In some examples, a UE may communicate (e.g., transmit, receive) a multi-PUSCH message or multi-PDSCH message based on the set of rules for scheduling multiple transmissions of a multi-PUSCH message or multi-PDSCH message.

By communicating a multi-PUSCH message or multi-PDSCH message based on the set of rules, the UE may support efficient resource allocation. For example, the UE may transmit or receive messages using RBs in a bandwidth part that may otherwise be unused. In some examples, by increasing scheduling flexibility of slots configured for SBFD, the UE may transmit or receive messages with reduced latency associated with uplink or downlink transmissions. For example, by transmitting transmissions of a multi-PUSCH message in slots configured for SBFD using the set of rules, the UE may support reduced uplink latencies (e.g., in XR or CG applications). In some examples, the set of rules may support the UE receiving transmissions of a multi-PDSCH message in consecutive slots (e.g., regardless of an RB allocation of a first transmission of the multi-PDSCH message), which may be beneficial for communicating bursts of packets (e.g., in XR or CG applications).

Aspects of the disclosure are initially described in the context of wireless communications systems. Aspects of the disclosure are further described in the context of scheduling diagrams. Aspects of the disclosure are further illustrated by and described with reference to apparatus diagrams, system diagrams, and flowcharts that relate to multiple transmissions with subband full-duplex operation.

FIG. 1 illustrates an example of a wireless communications system 100 that supports multiple transmissions with subband full-duplex operation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support multiple transmissions with subband full-duplex operation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or RBs (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions.

For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some wireless communications systems (e.g., XR/Cloud Gaming services), applications may consume data in larger packet data unit (PDU) sets rather than IP packets. PDU sets may include multiple IP packets. Applications may consume a burst of data, which may include one or more PDUs. In some examples, the one or more PDUs may combine to make up a video frame, or individual slices of a video frame. In some examples, a network entity 105 may utilize multi-PUSCH or multi-PDSCH scheduling, which may accommodate for bursts of IP packets or PDU sets of IP packets.

In some cases, a network entity 105 and a UE 115 may support the communication of multi-PUSCH messages or multi-PDSCH messages, which may allow the network entity 105 to schedule, via a single control message, multiple PUSCH transmissions or PDSCH transmissions (e.g., TBs), or repetitions of a same PUSCH transmission or PDSCH transmission (e.g., repetitions of a same TB), or a combination thereof. The multiple transmissions (e.g., TBs, repetitions of a same TB) of a multi-PUSCH message or multi-PDSCH message may occur in consecutive slots or may occur in one or more slots indicated via RRC signaling. In some cases, the PUSCH and PDSCH transmissions may be controlled RRC information element (IEs) including "k2-r16"/"extendedK2" of "pusch-TimeDomainAllocation-ListForMultiPUSCH-r16" or "k0-r16"/"k0-v1710" of "pdsch-TimeDomainAllocationListForMultiPDSCH-r16."

In some examples, the network entity 105 may schedule a multi-PUSCH message or multi-PDSCH message in accordance with TDD with a slot pattern of three downlink slots (D), a special slot(S), and an uplink slot (U), in that order (e.g., a DDDSU slot pattern). The network entity 105 may schedule a first transmission of the multi-PDSCH message in the first downlink slot and may schedule second, third, and fourth transmissions (e.g., repetitions, occasions) of the multi-PDSCH message in the second downlink slot, the third downlink slot, and the special slot, respectively, of the DDDSU slot pattern. In other examples, the network entity may schedule transmissions (e.g., repetitions, occasions) of a multi-PUSCH transmission in slots reserved for uplink, skipping the slots reserved for downlink and skipping the special slots in the DDDSU slot pattern.

In some examples, the network entity 105 may indicate a frequency domain resource allocation, indicated via a FDRA parameter of a downlink control information (DCI) signal, and may apply the frequency domain resource allocation to all multi-PUSCH or multi-PDSCH transmissions (including repetitions) within the multi-PDSCH message or the multi-PUSCH message scheduled by the DCI. For example, the network entity 105 may determine that the same bandwidth is available in all slots, and the network entity 105 may schedule transmissions or repetitions of a multi-PUSCH message or a multi-PDSCH message based on the determination. In an example, a DCI (e.g., DCI 1_1) may schedule a multi-PDSCH message that includes four PDSCH transmissions, each with two repetitions, and may use the same frequency domain resource allocation for each of the four PDSCH transmissions and their respective repetitions. In other examples, a DCI (e.g., DCI 0_1) may schedule a multi-PUSCH message that includes two PUSCH transmissions, each with two repetitions, using the same frequency domain resource allocation for each of the two PUSCH transmissions and their respective repetitions.

In some wireless communications systems (e.g., wireless communications system 100), a network entity 105 may schedule transmissions (e.g., at a UE 115) in accordance with a SBFD operation. The SBFD operation may include downlink and uplink subband non-overlapping full-duplex at the network entity side within a TDD band. That is, the SBFD operation may modify a TDD band to support full-duplex enhancement at the network entity 105, where the TDD band includes slots where some subbands in the slot are reserved for downlink transmissions and other non-overlapping subbands are reserved for uplink transmissions. The UE 115 may operate in half-duplex in accordance with the SBFD operation, and the network entity 105 may schedule transmissions (e.g., in full-duplex mode) without restriction on frequency ranges.

In some examples of SBFD operation, some subbands in some D and S slots may be reserved for uplink transmission. A network entity 105 that schedules in accordance with an SBFD operation may be beneficial in XR or CG services where uplink transmissions may occur in any slot (e.g., D slot, S slot, U slot). The SBFD operation may support reduced uplink latencies, more sleeping opportunities at the UE 115 (e.g., a low-power UE), or both. In some examples, a DDDSU slot pattern in TDD may be modified to implement an SBFD operation. For example, the first and third slots of the DDDSU slot pattern may be configured with SBFD (e.g., SBFD slots), and the second, fourth, and fifth slots of the slot pattern may be unchanged (e.g., non-SBFD slots).

In some examples, a UE 115 may receive (e.g., from a network entity 105) an indication that a set of occasions for a message occurs over multiple symbols. The multiple symbols may include a set of full-duplex symbols and a set of half-duplex symbols. In some cases, the UE 115 may select one or more resources for communicating the message via a first occasion of the set of occasions in accordance with a set of rules and based on the first occasion being included in a first slot type or a second slot type. The first slot type may correspond to one or more half-duplex symbols of the set of half-duplex symbols and the second slot type may correspond to one or more full-duplex symbols of the set of full-duplex symbols. The UE may communicate the message using the one or more selected resources.

Figure 2:
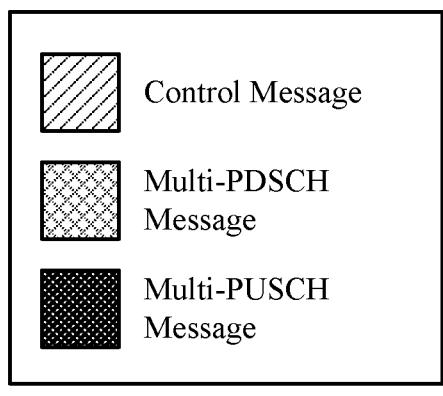
FIG. 2 illustrates an example of a wireless communications system 200 that supports multiple transmissions with subband full-duplex operation in accordance with one or more aspects of the present disclosure.
Figure 2:
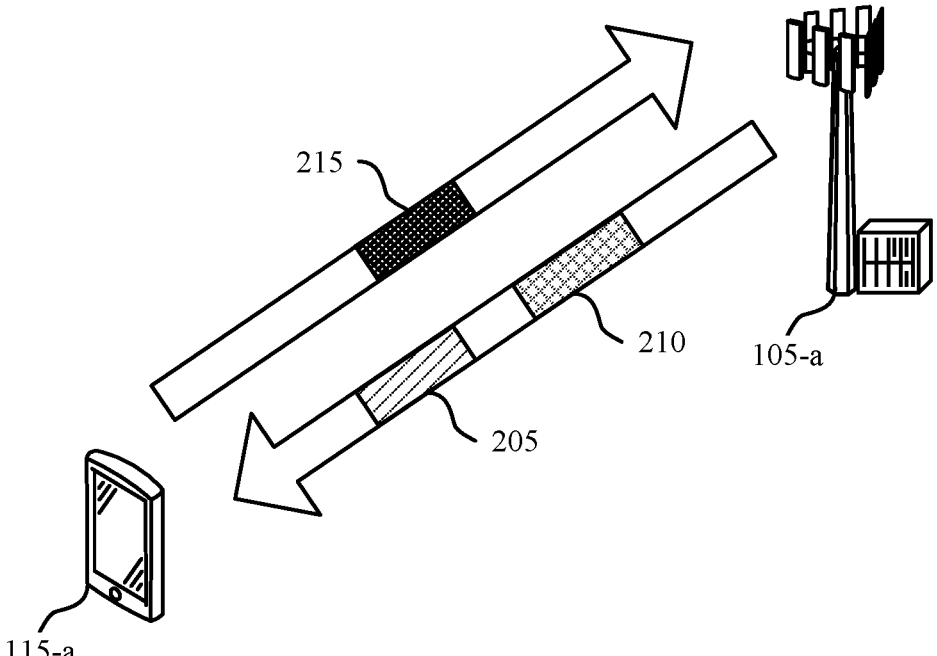

FIG. 2 illustrates an example of a wireless communications system 200 that supports multiple transmissions with subband full-duplex operation in accordance with one or more aspects of the present disclosure. The wireless communications system 200 may implement or may be implemented by aspects of the wireless communications system 100. For example, the wireless communications system 200 may include a UE 115-a and a network entity 105-a, which may be examples of corresponding devices described with reference to FIG. 1.

The network entity 105-a may transmit a control message 205 (e.g., a DCI message), which may schedule a multi-PDSCH message 210 or a multi-PUSCH message 215. In some examples, the network entity 105-a may schedule multiple transmissions (e.g., repetitions, occasions) of the multi-PDSCH message 210 or the multi-PUSCH message 215, and the network entity 105-a may schedule the multiple transmissions with the same frequency domain resource allocation. However, in some cases, the network entity 105-a may operate in an SBFD mode. In the SBFD mode, applying the same frequency domain resource allocation to all transmissions and repetitions of the multi-PDSCH message 210 or the multi-PUSCH message 215 may limit the resource allocations that are available to the network entity 105-a for scheduling the multi-PDSCH message 210 or the multi-PUSCH message 215.

That is, the network entity 105-a may be unable to allocate RBs to the multi-PDSCH message 210 or to the multi-PUSCH message 215 because the RBs may be unavailable for that type (e.g., uplink, downlink) of transmission in the SBFD slots. In accordance with the SBFD mode, the network entity 105-a may configure some slots (e.g., 1st and 3rd slots of a DDDSU slot pattern) for SBFD. SBFD slots may be referred to herein as D or S slots with one or more subbands reserved (e.g., available) for uplink transmissions. Non-SBFD slots may be referred to herein as U slots and D or S slots with no subbands reserved for transmissions in a different transmission direction. In an SBFD mode, the network entity 105-a may be unable to allocate, to the multi-PDSCH message 210, the RBs that are in the subbands reserved for uplink in SBFD slots.

In some examples, the network entity 105-a may determine that subbands in non-SBFD slots (e.g., 2nd and 4th slots of a DDDSU slot pattern) are available for scheduling transmissions of the multi-PDSCH message 210. However, with multi-PDSCH allocation or repetition, the network entity 105-a may be unable to allocate, in the non-SBFD slot, the RBs that are within the subbands reserved for uplink in the SBFD slots (e.g., while maintaining that the same frequency domain resource allocation is applied to all transmissions of the multi-PDSCH message 210). In other examples, the network entity 105-a may be unable to allocate, to the multi-PUSCH message 215, the RBs that are not available to uplink in SBFD slots. For example, the network entity 105-a may determine that subbands in U slots (e.g., 5th slot of a DDDSU slot pattern) are available for scheduling transmissions of the multi-PUSCH message 215. However, with multi-PUSCH allocation or repetition, the network entity 105-*a* may be unable to allocate, in the U slots, the RBs that are outside of the subbands reserved for uplink in the SBFD slots (e.g., while maintaining that the same frequency domain resource allocation is applied to all transmissions of the multi-PUSCH message 215).

In accordance with the examples described with reference to FIGS. 3-9, the network entity 105-*a* may modify scheduling of the multiple transmissions of the multi-PDSCH message 210 or the multi-PUSCH message 215 to support greater scheduling flexibility of transmissions or repetitions in non-SBFD slots. For example, the UE 115-*a* may receive an indication that a set of occasions (e.g., transmissions, repetitions) for a message (e.g., the multi-PDSCH message 210, the multi-PUSCH message 215) occurs over multiple symbols (e.g., slots). The multiple symbols may include a set of full-duplex symbols (e.g., SBFD symbols or slots) and a set of half-duplex symbols (e.g., non-SBFD symbols or slots).

The UE 115-*a* may select one or more resources (e.g., time-frequency resources) for communicating (e.g., transmitting, receiving) the message via a first occasion of the set of occasions in accordance with a set of rules. In some cases, the network entity 105-*a* may select the resources based on the first occasion being included in a first slot type (e.g., non-SBFD slot) or a second slot type (e.g., SBFD slot). The first slot type may correspond to one or more half-duplex symbols of the set of half-duplex symbols and the second slot type may correspond to one or more full-duplex symbols of the set of full-duplex symbols. The UE 115-*a* may communicate (e.g., transmit, receive) the message using the one or more selected resources.

In some examples, the network entity 105-*a* may schedule the multiple transmissions (e.g., occasions) of the multi-PDSCH message 210 or the multi-PUSCH message 215 in the same slot type (e.g., SBFD slot, non-SBFD slot) as the first transmission, skipping over slots of a different type. For example, the network entity 105-*a* may transmit the control message 205 (e.g., via DCI, a medium access control layer control element (MAC-CE), RRC), and the control message 205 may indicate that the multiple transmissions of the multi-PDSCH message 210 or the multi-PUSCH message 215 are scheduled in the same slot type as the first transmission of the multi-PDSCH message 210 or the multi-PUSCH message 215. In other examples, the network entity may indicate (e.g., via the control message 205) a frequency shift for transmissions of the message that occur in SBFD slots, where the first transmission of the message occurs in a non-SBFD slot within subbands that may be reserved for uplink in SBFD slots. In some cases, the UE 115-*a* may apply an FDRA (e.g., apply an interpretation of the FDRA) indicated in the control message 205 to a transmission of the multi-PDSCH message 210 or the multi-PUSCH message 215 based on whether the transmission is scheduled in a non-SBFD slot or an SBFD slot.

In some examples, the network entity 105-*a* may include an additional FDRA field in a DCI (e.g., the control message 205) that schedules transmissions (e.g., occasions) for the multi-PDSCH message 210 or the multi-PUSCH message 215. For example, instead of using a first FDRA field for both non-SBFD and SBFD slots, a second FDRA field may be introduced. For example, the UE 115-*a* may receive, from the network entity 105-*a*, a control signal including a first FDRA parameter indicating a first RB allocation for communicating a message via the first slot type and a second FDRA parameter indicating a second RB allocation for communicating the message via the second slot type. In some cases, adding a second FDRA field to the DCI may increase the size of the DCI. The network entity 105-*a* may configure or indicate the second FDRA field so that it is consistent with the first FDRA field. For example, in cases where repetitions of the same TB may be transmitted in non-SBFD slots and in SBFD slots, the network entity 105-*a* or the UE 115-*a* may apply either of the first FDRA field or the second FDRA field without inconsistency (e.g., with respect to format, size, applicability, etc.). In some examples, the network entity 105-*a* may indicate the second FDRA field (e.g., in the control message 205), which may apply to transmissions in SBFD slots, and the network entity 105-*a* may indicate the first FDRA field, which may apply to transmissions in non-SBFD slots.

In some cases, the control message 205 may indicate the set of rules to be applied for allocating (e.g., selecting) resources to the multi-PDSCH message 210 or the multi-PUSCH message based on the network entity 105-*a* operating in accordance with an SBFD mode. The network entity 105-*a* may indicate the set of rules via cell-specific signaling (e.g., SIB), semi-statically via UE-specific signaling (e.g., RRC configuration, reconfiguration), dynamically via L2 signaling (e.g., MAC-CE) or L1 signaling (e.g., DCI), or any combination thereof.

In some examples, communications between the UE 115-*a* and the network entity 105-*a* via SBFD slots may experience cross-link interference. That is, transmission of a signal in a carrier may interfere with the reception of another signal in an adjacent carrier. For example, the network entity 105-*a* may transmit a PDSCH message (e.g., the multi-PDSCH message 210) to the UE 115-*a* which may interfere with a PUSCH message that the network entity 105-*a* receives from another UE. In other examples, the UE 115-*a* may be close in proximity to a second UE, and a PUSCH message that the second UE transmits may interfere with a PDSCH message (e.g., the multi-PDSCH message 210) that the UE 115-*a* receives from the network entity 105-*a*.

In some examples, the UE 115-*a* or the network entity 105-*a* may reduce cross link interferences experienced at the UE 115-*a* by applying a more robust modulation and coding scheme (MCS) to transmissions (e.g., occasions) of downlink messages (e.g., the multi-PDSCH message 210) in SBFD slots than to those in non-SBFD slots. The second FDRA field as described herein may support the applicability of different MCSs to repetitions (e.g., occasions) of the multi-PDSCH message 210 in SBFD and non-SBFD slots, since repetitions of the same TB may have the same TB size. In some cases, the network entity 105-*a* may signal a second MCS that may apply to transmissions of the multi-PDSCH message 210 (e.g., based on which slot the UE 115-*a* receives the first transmission of the multi-PDSCH message 210).

For example, the UE 115-*a* may receive the first transmission of the multi-PDSCH message 210 in a non-SBFD slot. The UE 115-*a* may apply a first MCS to transmissions (e.g., occasions, repetitions) of the multi-PDSCH message that occur in non-SBFD slots and may apply the indicated second MCS to transmissions of the multi-PDSCH message 210 that occur in SBFD slots. In other examples, the UE 115-*a* may receive the first transmission of the multi-PDSCH message 210 in an SBFD slot. The UE 115-*a* may apply a first MCS to transmissions of the multi-PDSCH message that occur in SBFD slots and may apply the indicated second MCS to transmissions of the multi-PDSCH message 210 that occur in non-SBFD slots.

The network entity 105-*a* may indicate (e.g., signal) the second MCS as an absolute value or as a relative value (e.g., difference or delta) with reference to the first MCS. The network entity 105-*a* may signal the second MCS via RRC signaling, MAC-CE, DCI, or any combination thereof. In some cases, the network entity 105-*a* may include a new field in a DCI (e.g., second MCS) that may indicate the absolute value of the second MCS, the relative value of the second MCS with reference to the first MCS, or an index to a table of values that has been pre-configured (e.g., via MAC-CE or RRC) indicating the second MCS.

Figure 3A:
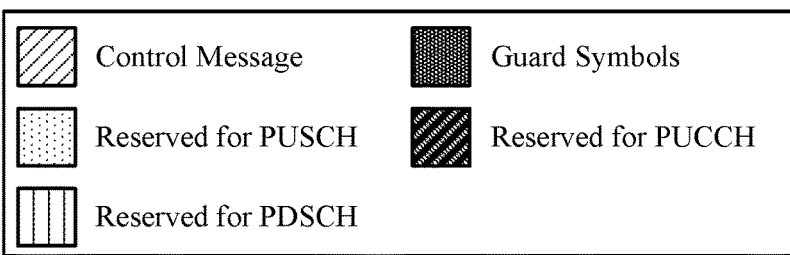
FIGS. 3A through 9 illustrate examples of scheduling diagrams that support multiple transmissions with subband full-duplex operation in accordance with one or more aspects of the present disclosure.
Figure 3A:
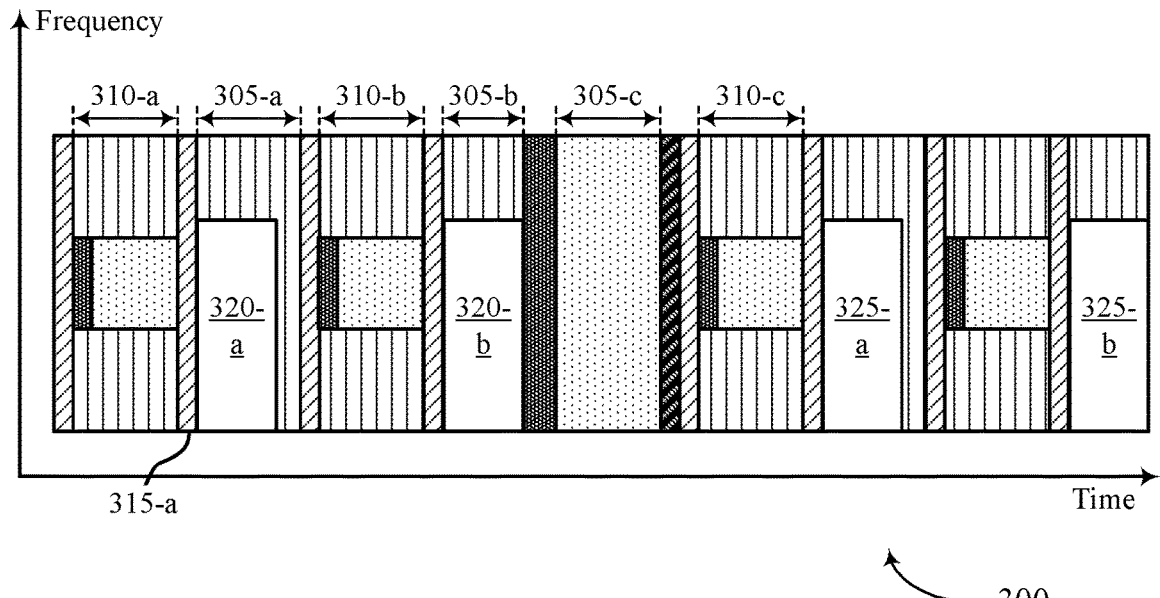
Figure 3B:
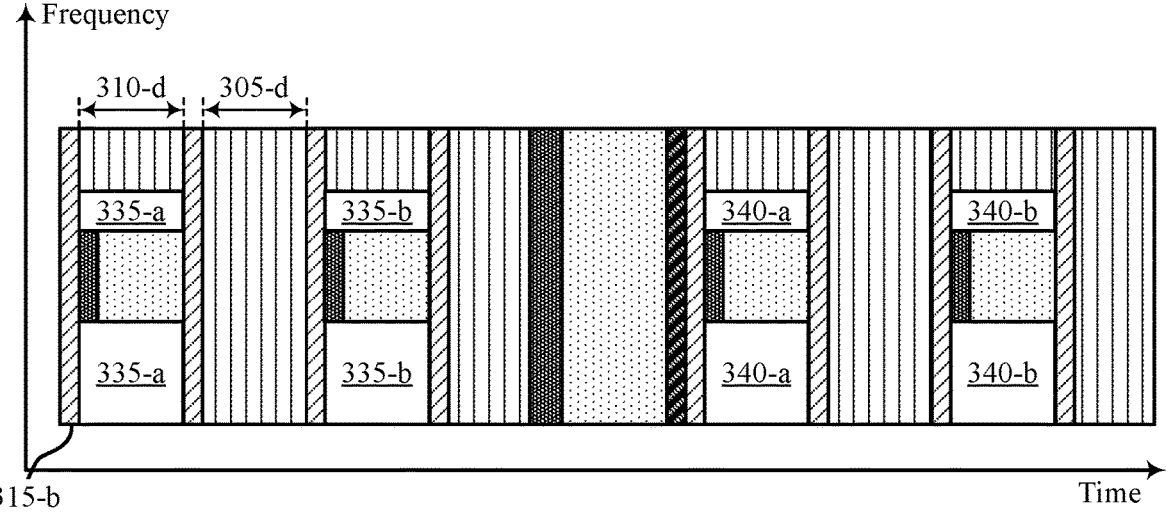

FIGS. 3A and 3B illustrate examples of scheduling diagrams 300 and 330 that supports multiple transmissions with subband full-duplex operation in accordance with one or more aspects of the present disclosure. The scheduling diagrams 300 and 330 may implement or may be implemented by aspects of the wireless communications systems 100 and 200. For example, the scheduling diagrams 300 and 330 may include examples of messages transmitted between a UE 115 and a network entity 105, such as transmissions 320, 325, 335, and 340, which may be examples of transmissions of a multi-PDSCH message 210 as described with reference to FIG. 2. Although not depicted herein, it is to be understood that the scheduling diagrams 300 and 330 may support transmissions of a multi-PUSCH message.

A network entity 105 may schedule transmissions of downlink (e.g., PDSCH) or uplink (e.g., PUSCH) messages in accordance with TDD. In some examples, the network entity 105 may use a DDDSU pattern and may operate in accordance with a SBFD mode, as described with reference to FIG. 2. For example, the 1st and 3rd slots of the DDDSU slot pattern may be an SBFD slot 310-*a* and an SBFD slot 310-*b*. The SBFD slot 310-*a* and the SBFD slot 310-*b* may be of a second type of slot and may correspond to one or more full-duplex symbols. The 2nd and 4th slots of the DDDSU slot pattern may be a non-SBFD slot 305-*a* and a non-SBFD slot 305-*b*. The non-SBFD slot 305-*a* and the non-SBFD slot 305-*b* may be of a first slot type and may correspond to one or more half-duplex symbols. The fifth slot (e.g., the U slot) of the DDDSU slot pattern may be a non-SBFD slot 305-*c*, which may be of a first slot type and may correspond to one or more half-duplex symbols.

In some examples, the DDDSU slot pattern may include, at the start of each slot in the pattern, a time duration reserved for control messages (e.g., DCI), which may precede a time duration reserved for downlink in the D and S slots or may precede a time duration reserved for uplink in the U slot. The 4th slot (e.g., the S slot) of the DDDSU slot pattern may include a duration reserved for downlink (e.g., PDSCH) followed by a duration reserved for guard symbols. The fifth slot (e.g., the U slot) may include a time duration reserved for uplink (e.g., PDSCH) followed by a time duration reserved for uplink control messages (e.g., PUCCH). The SBFD slot 310-*a* and the SBFD slot 310-*b* (e.g., 1st and 3rd slots) may include, within the subbands (e.g., RBs, symbols) reserved for uplink, a time duration reserved for guard symbols, which may precede the time duration in the SBFD slot 310-*a* and the SBFD slot 310-*b* reserved for uplink (e.g., PUSCH).

A network entity 105 may apply slot restriction to transmissions (e.g., transmission 320-*a*, transmission 320-*b*, transmission 320-*c*, transmission 320-*d*) of a multi-PDSCH message or a multi-PUSCH message. In some examples, the network entity 105 may restrict the additional PDSCH transmissions or repetitions of a multi-PDSCH message to the same slot type as the one while the first PDSCH transmission was scheduled at or was transmitted on. Thus, the network entity 105 may schedule multiple PDSCH transmissions, or repetitions of a same TB, on the same slot type (e.g., non-SBFD, SBFD).

In FIG. 3A, the network entity 105 may transmit a control message 315-*a* (e.g., DCI) which may schedule a multi-PDSCH message that includes a PDSCH transmission 320 and a PDSCH transmission 325. As depicted in this example, the PDSCH transmission 320 may include two repetitions, which may include the transmission 320-*a* and the transmission 320-*b*. The PDSCH transmission 325 may also include two repetitions, which may include the transmission 325-*a* and the transmission 325-*b*. In some examples, a UE 115 may receive an indication (e.g., via the control message 315-*a*) that a set of occasions (e.g., transmissions, repetitions) for a message (e.g., the multi-PDSCH message) occurs over multiple symbols. The control message 315-*a* may schedule a first transmission 320-*a* (e.g., occasion, repetition) of the multi-PDSCH message in a non-SBFD slot 305-*a*. The control message 315-*a* may schedule a subsequent transmission 320-*b* (e.g., occasion, repetition) of the multi-PDSCH message in a subsequent non-SBFD slot 305-*b* (e.g., skipping the SBFD slot 310-*a*). The control message 315-*a* may also schedule the PDSCH transmission 325 of the multi-PDSCH message, scheduling the transmission 325-*a* and the transmission 325-*b* in non-SBFD slots 305.

In some examples, a UE 115 may communicate (e.g., receive), via a first occasion, a first repetition (e.g., the transmission 320-*a*) of the message (e.g., the multi-PDSCH message) over a first half-duplex symbol of the first slot type (e.g., the non-SBFD slot 305-*a*). The UE 115 may communicate (e.g., receive), via a second occasion of the set of occasions, a second repetition (e.g., the transmission 320-*b*) of the message over a second half-duplex symbol of the first slot type (e.g., the non-SBFD slot 305-*b*) in accordance with a set of rules. The set of rules may indicate that multiple transmissions (e.g., the transmissions 320 and 325) of the message are to be scheduled on a same type of slot.

In FIG. 3B, the network entity 105 may transmit a control message 315-*b* (e.g., DCI) which may schedule a multi-PDSCH message that includes a PDSCH transmission 335 and a PDSCH transmission 340. The PDSCH transmission 335 may include two repetitions, which may include the transmission 335-*a* and the transmission 335-*b*. The PDSCH transmission 340 may also include two repetitions, which may include the transmission 340-*a* and the transmission 340-*b*. The control message 315-*b* may schedule a first transmission 335-*a* of the multi-PDSCH message in an SBFD slot 310-*d*. The control message 315-*b* may schedule a subsequent transmission 335-*b* (e.g., occasion, repetition) of the multi-PDSCH message in a subsequent SBFD slot, skipping a non-SBFD slot 305-*d*. The control message 315-*b* may also schedule the PDSCH transmission 340 of the multi-PDSCH message, scheduling the transmission 340-*a* and the transmission 340-*b* in SBFD slots 310.

In some examples, a UE 115 may communicate (e.g., receive), via a first occasion, a first repetition (e.g., the transmission 335-*a*) of the message (e.g., the multi-PDSCH message) over a first full-duplex symbol of the first slot type (e.g., the SBFD slot 310-*a*). The UE 115 may communicate (e.g., receive), via a second occasion of the set of occasions, a second repetition (e.g., the transmission 335-*b*) of the message over a second half-duplex symbol of the first slot type (e.g., the SBFD slot 310-*b*) in accordance with a set of rules. The set of rules may indicate that multiple transmissions (e.g., the transmissions 335 and 340) of the message are to be scheduled on a same type of slot.

In other examples, the network entity 105 may apply slot restriction to transmissions of a multi-PUSCH message. That is, the network entity 105 may schedule multiple PUSCH transmissions, or repetitions of a same TB, on the same slot type (e.g., non-SBFD, SBFD). For example, the network entity 105 may schedule (e.g., via a DCI) a first transmission of the multi-PUSCH message in the non-SBFD slot 305-c and may schedule subsequent transmissions (e.g., occasions, repetitions) of the multi-PUSCH message in subsequent non-SBFD slots 305, skipping SBFD slots 310. Alternatively, the network entity 105 may schedule the first transmission of the multi-PUSCH message in the SBFD slot 310-b and may schedule a subsequent transmission (e.g., occasion, repetition) of the multi-PUSCH message in a subsequent SBFD slot 310-c, skipping the non-SBFD slot 305-c.

Figure 4:
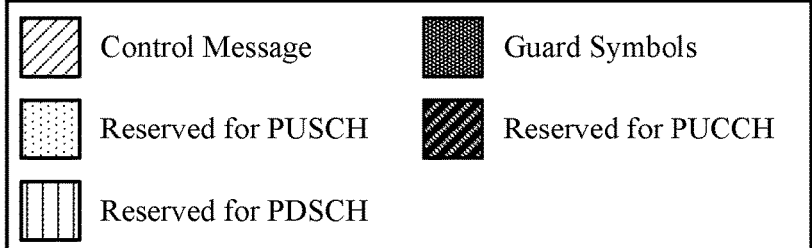
Figure 4:
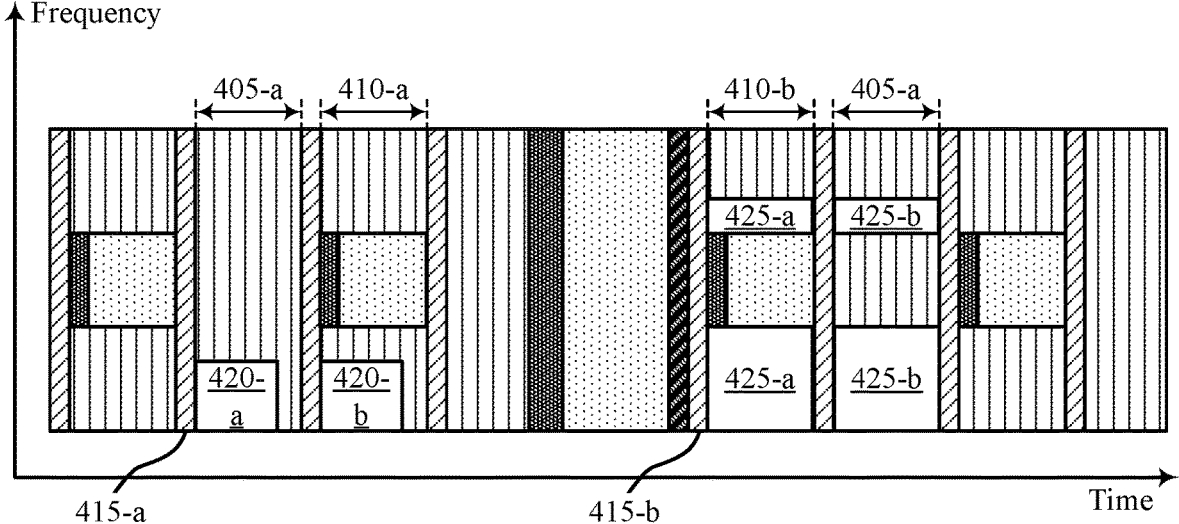

FIG. 4 illustrates an example of a scheduling diagram 400 that supports multiple transmissions with subband full-duplex operation in accordance with one or more aspects of the present disclosure. The scheduling diagram 400 may implement or may be implemented by aspects of the wireless communications systems 100 and 200. For example, the scheduling diagram 400 may include examples of messages transmitted between a UE 115 and a network entity 105, such as transmissions 420 and 425, which may be examples of transmissions in a multi-PDSCH message 210 as described with reference to FIG. 2.

A network entity 105 may schedule a multi-PDSCH message or multi-PUSCH message in accordance with slot restriction as described with reference to FIGS. 3A and 3B. However, in some examples, slot restriction may not apply if RBs that the network entity 105 allocates to transmissions of a multi-PDSCH message or multi-PUSCH message (e.g., in non-SBFD slots 405) are within the subbands reserved for that type (e.g., uplink, downlink) of transmission in SBFD slots 410. Accordingly, the network entity 105 may use one or more rules for applying the slot restriction as described herein.

In some examples, as described in greater detail with reference to FIGS. 3A and 3B, transmissions (e.g., occasions, TBs, repetitions of a same TB) of the multi-PDSCH message or the multi-PUSCH message are restricted to a same slot type (e.g., SBFD, non-SBFD) based on the slot type of the first scheduled transmission in the multi-PDSCH message or multi-PUSCH message. In other examples, if the first transmission of the multi-PDSCH message or multi-PUSCH message took place in an SBFD slot 410, the slot restriction may not apply. For example, the network entity 105 may schedule (e.g., via a control message 415-b) a first transmission 425-a of the multi-PDSCH message in an SBFD slot 410-b and may schedule a subsequent transmission 425-b of the multi-PDSCH message in a consecutive slot, which may be a non-SBFD slot 405-a (e.g., thereby ignoring the slot restriction).

In some examples, if the first transmission took place in a non-SBFD slot 405, the restriction may apply if one or more allocated RBs are outside the subbands allocated to the type of transmission (e.g., downlink, uplink) in SBFD slots 410. For example, the network entity 105 may schedule (e.g., via a control message 415-a) a first transmission 420-a of the multi-PDSCH message in a non-SBFD slot 405-a within subbands allocated to downlink (e.g., PDSCH) in SBFD slots 410. Thus, the slot restriction may not apply. That is, the network entity 105 may schedule a subsequent transmission 420-b of the multi-PDSCH message in a consecutive slot, which may be an SBFD slot 410-a (e.g., thereby ignoring the slot restriction).

In some examples, a UE 115 may receive, via the first occasion (e.g., the transmission 420-a), the message (e.g., the multi-PDSCH message) using a set of RBs corresponding to at least one subband of a first full-duplex symbol (e.g., SBFD slot 410-a). The set of RBs (e.g., in the SBFD slot 410-a) may have a transmission direction (e.g., downlink, uplink) that is configured same as the message. However, in other examples, the network entity 105 may schedule a first transmission of the multi-PDSCH message in a non-SBFD slot outside the subbands allocated to downlink in SBFD slots 410 (e.g., within subbands allocated to uplink in SBFD slots 410). In such examples, the slot restriction may apply, and the network entity 105 may schedule subsequent transmissions of the multi-PDSCH message in non-SBFD slots 405, skipping SBFD slots 410.

In some cases, the network entity 105 or the UE 115 may apply the slot restriction to transmissions (e.g., transmissions 420-a and 420-b) of the multi-PDSCH message or the multi-PUSCH message implicitly in accordance with the one or more rules as described herein. In other cases, the network entity 105 may indicate (e.g., signal) the slot restriction via DCI, MAC-CE, RRC, or any combination thereof. For example, the network entity 105 may transmit an indication of slot restriction to the UE 115. Accordingly, the network entity 105 or the UE 115 may apply the slot restriction to any multi-PDSCH message or multi-PUSCH message (e.g., regardless of RB allocation or a slot type of a first transmission of the message).

Figure 5:
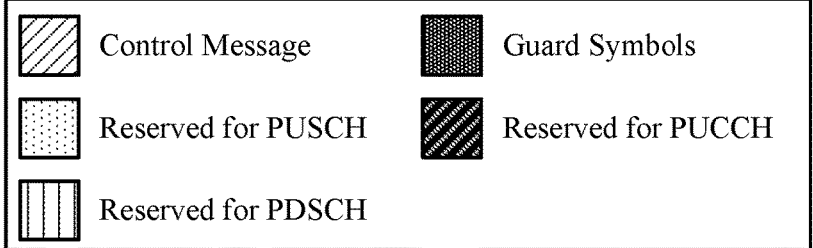
Figure 5:
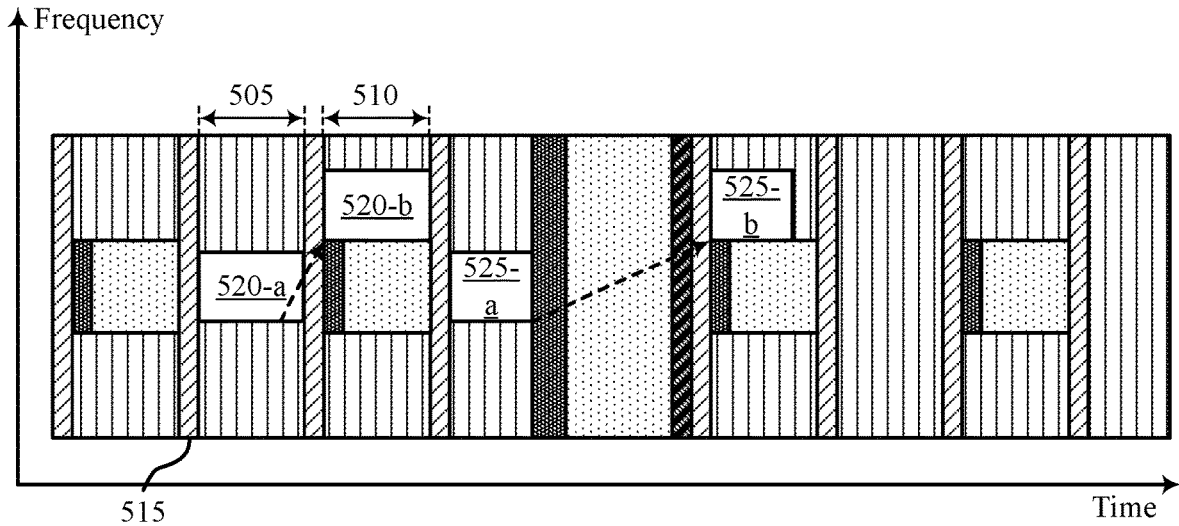

FIG. 5 illustrates an example of a scheduling diagram 500 that supports multiple transmissions with subband full-duplex operation in accordance with one or more aspects of the present disclosure. The scheduling diagram 500 may implement or may be implemented by aspects of the wireless communications systems 100 and 200. For example, the scheduling diagram 500 may include examples of messages transmitted between a UE 115 and a network entity 105, such as transmissions 520 and 525, which may be examples of transmissions in a multi-PDSCH message 210 as described with reference to FIG. 2.

In some examples, a network entity 105 may schedule a first transmission of a multi-PDSCH message or multi-PUSCH message in a non-SBFD slot (e.g., a non-SBFD slot 505). In accordance with an SBFD mode, as described with reference to FIG. 2, the number or quantity of allocated RBs (e.g., allocated for the first transmission) may be less than or equal to the size of the subbands allocated to the type of transmission (e.g., downlink, uplink) in one or more SBFD slots (e.g., an SBFD slot 510). However, some of the allocated RBs may be outside the subbands allocated to the type of transmission in the SBFD slots (e.g., and a slot restriction as described with reference to FIGS. 3A, 3B, and 4 may apply).

In such examples, the network entity 105 may apply a shift (e.g., a frequency shift) of the RB allocation, which may lift (e.g., overcome) the slot restriction. That is, based on shifting the RB allocation of the subsequent transmissions in SBFD slots, the slot restriction may not apply, and the network entity 105 may schedule the subsequent transmissions of the multi-PDSCH message or multi-PUSCH message in consecutive slots, which may include SBFD slots. For example, if a first transmission (e.g., a transmission 520-a) of the multi-PDSCH message or multi-PUSCH message takes place in a non-SBFD slot, the network entity 105 may signal in a DCI (e.g., a control message 515) the frequency shift that is applied to the RB allocation in subsequent transmissions (e.g., transmissions 520-*b* and 520-*d*) of the multi-PDSCH or multi-PUSCH message in SBFD slots.

In some examples, a UE 115 may communicate (e.g., transmit, receive), via a first occasion, a first repetition (e.g., the transmission 520-*a*) over a first half-duplex symbol of the first slot type (e.g., the non-SBFD slot 505). The UE 115 may apply, in accordance with a set of rules, a frequency shift to allocate a set of RBs corresponding to at least one subband of a first full-duplex symbol of the second slot type (e.g., the SBFD slot 510) to a second repetition of the message (e.g., the transmission 520-*b*). The set of RBs may have a transmission direction (e.g., uplink, downlink) that is configured same as the message.

In some examples, the RB shift may be slot dependent. For example, the RB shift may apply to the transmission 520-*b* and the 525-*b*, which occur in SBFD slots, and may not apply to the transmission 525-*a*, which occurs in a non-SBFD slot. In some examples, the UE 115 may compute the RB shift implicitly. For example, the UE 115 may compute the RB shift as the first RB within one or more subbands allocated to downlink in SBFD slots.

In some examples, the network entity 105 may indicate the frequency shift to a UE 115 that receives the multi-PDSCH message or transmits the multi-PUSCH message. The indicated frequency shift may indicate a distance (e.g., in the frequency domain) from the first RB in the non-SBFD slot 505 to the first RB in the SBFD slot 510. The network entity 105 may indicate the frequency shift (e.g., the distance in the frequency domain) as a quantity of RBs or a quantity of subbands. In other examples, the network entity 105 may configure candidate values of the frequency shift via RRC, and the control message 515 (e.g., DCI) may signal the value to be used.

Figure 6:
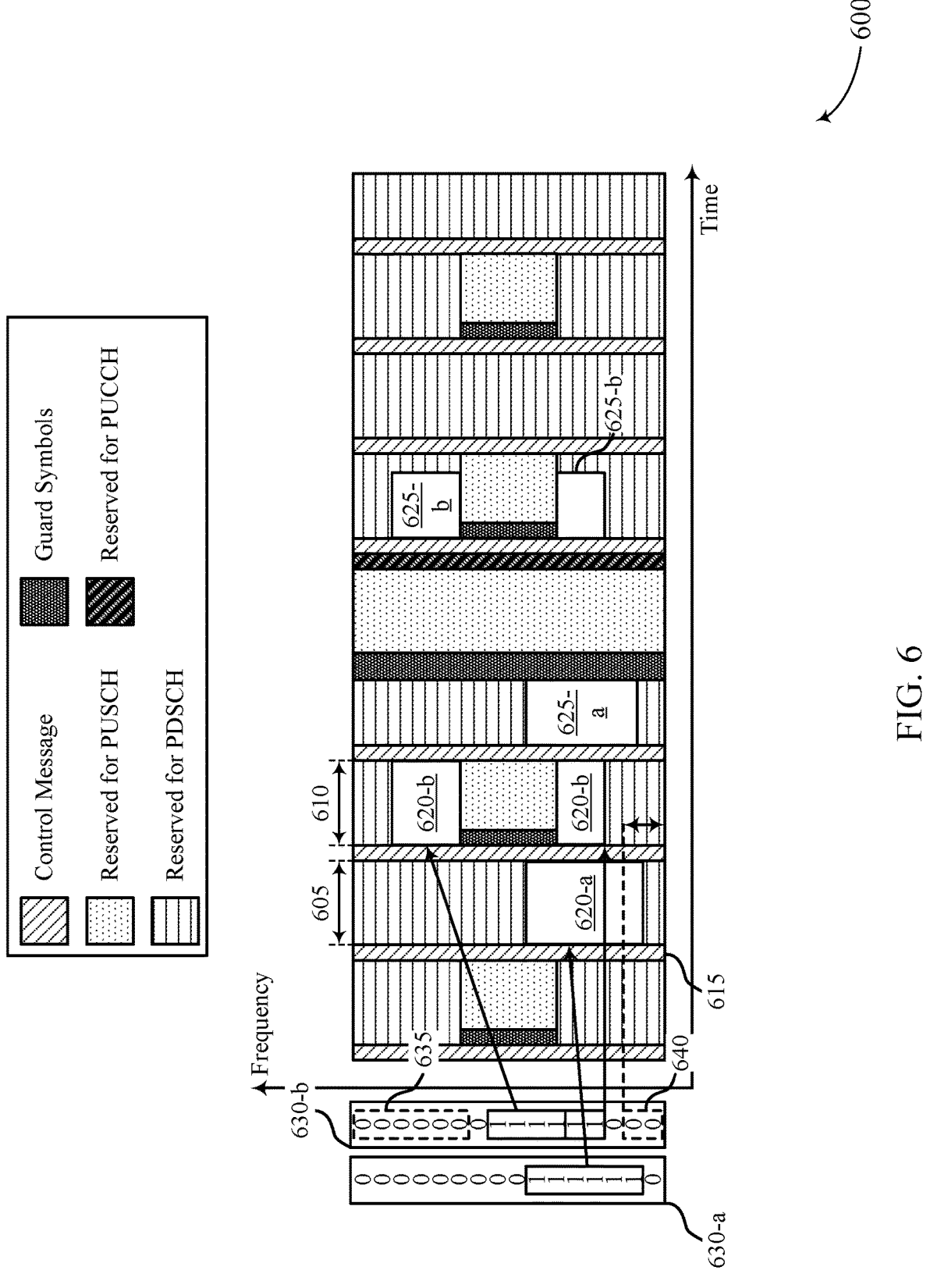

FIG. 6 illustrates an example of a scheduling diagram 600 that supports multiple transmissions with subband full-duplex operation in accordance with one or more aspects of the present disclosure. The scheduling diagram 600 may implement or may be implemented by aspects of the wireless communications systems 100 and 200. For example, the scheduling diagram 600 may include examples of messages transmitted between a UE 115 and a network entity 105, such as transmissions 620 and 625, which may be examples of transmissions in a multi-PDSCH message 210 as described with reference to FIG. 2.

In accordance with an SBFD mode as described herein, a quantity of RBs available to PDSCH and available to PUSCH in SBFD slots may be smaller than a quantity of RBs available to PDSCH and available to PUSCH in non-SBFD slots. For example, $N_{BW}$ may be the number or quantity of RBs in a bandwidth part (BWP), and $N_{SBFD}$ may be the number or quantity of RBs across all subbands reserved for SBFD. In a non-SBFD slot (e.g., a non-SBFD slot 605), the quantity of RBs available for PDSCH may be $N_{BW}$, and the quantity of RBs available for PUSCH may also be $N_{BW}$. However, in an SBFD slot (e.g., an SBFD slot 610), the quantity of RBs available for PDSCH may be $N_{BW}$–$N_{SBFD}$, and the quantity of RBs available for PUSCH may be $N_{SBFD}$.

A FDRA parameter of a DCI (e.g., a control message 615) may signal an RB allocation (e.g., for a multi-PDSCH message or a multi-PUSCH message) as either a bitmap of resource block groups (RBGs) (e.g., resource allocation type 0) or a set of contiguous virtual RBs (e.g., resource allocation type 1). That is, a UE 115 may receive, from a network entity 105, a control signal including a FDRA parameter indicating an RB allocation for the message (e.g., the multi-PDSCH or multi-PUSCH message). In some examples, the FDRA parameter may be set from the number or quantity of RBs or RBGs in the BWP. However, in accordance with an SBFD mode as described herein, the FDRA parameter may be modified to be set from the number or quantity of RBs or RBGs available to the type of transmission (e.g., uplink, downlink) in the slot where the transmission (e.g., of the multi-PDSCH message or the multi-PUSCH message) occurs.

In some examples (e.g., RAT 0), a network entity 105 may indicate the FDRA as a bitmap (e.g., to schedule the UE for transmissions). The bitmap may indicate the RBGs that are allocated to the scheduled UE 115, where an RBG may include a set of consecutive virtual resource blocks. Each bit in the bitmap may correspond to an RBG. If the bit is set to 1, the RBG may be allocated to the UE 115. For example, the FDRA may include 8 RBGs, where each RB includes 4 RBs (e.g., 32 RBs total). The FDRA may include the bitmap with the 0th, 1st, 3rd, 6th, and 7th bits set to 1, which may indicate that RBGs 0, 1, 3, 6 and 7 are allocated to the UE 115. In some examples, the network entity 105 may indicate a first bitmap 630-*a*, which may correspond to non-SBFD slots (e.g., a non-SBFD slot 605), and a second bitmap 630-*b*, which may correspond to SBFD slots (e.g., a SBFD slot 610).

In some examples, an FDRA parameter (e.g., the bitmap 630-*a*) may be set from all RBs or RBGs of the BWP in non-SBFD slots. Thus, in SBFD slots, a reinterpreted FDRA parameter (e.g., the bitmap 630-*b*) may be punctured to address the RB or RBGs available to the type of transmission (e.g., uplink or downlink) associated with the FDRA in SBFD slots. For example, in the non-SBFD slot 605, the bitmap 630-*a* and the interpretation of the bitmap 630-*a* may be unchanged, and the UE 115 or the network entity 105 may use the bitmap 630-*a* to schedule the transmission 620-*a* and the transmission 625-*a* of a multi-PDSCH message.

However, in an SBFD slot 610, a quantity N may be the quantity of bits of the bitmap 630-*b*, and a quantity P may be a quantity of first bits (e.g., starting from the 0th bit) of the FDRA (e.g., the bitmap 630-*a*) that correspond to the number or quantity of RBs or RBGs available to the type of transmission (e.g., uplink, downlink) in the SBFD slot 610. The remaining bits (e.g., bits 635, . . . N-P last bits) of the bitmap 630-*b* following the quantity of bits P may not correspond to RBs or RBGs available to the type of transmission. Thus, the bits 635 of the bitmap 630-*b* may be ignored or punctured. The P first bits of the bitmap 630-*b* may be interpreted, where the first RB may be the lowest RB available to the type of transmission in the SBFD slot 610. Accordingly, the UE 115 or the network entity 105 may use the bitmap 630-*b* to schedule the transmission 620-*b* and the transmission 625-*b* of the multi-PDSCH message in SBFD slots.

In some examples, the UE 115 or the network entity 105 may reinterpret the FDRA for SBFD slots, and the RBG allocation may start at the same RBG (e.g., relative to the first RB or subband of the BWP) as in non-SBFD slots (e.g., without FDRA re-interpretation). That is, the first non-zero bit may be the same in both the interpretation of the FDRA in the non-SBFD slot and the interpretation of the FDRA in the SBFD slot. In some examples, the network entity 105 may change the start of the RBG allocation, which may support increased scheduling flexibility. For example, the network entity 105 may signal a shift (e.g., left shift, right shift) that is applied to the bitmap 630-*a* (e.g., indicated by the FDRA). The network entity 105 may shift the FDRA bitmap 630-*a* to the right or to the left by the value of the shift. The network entity 105 may signal the shift in the control message 615 (e.g., DCI) either as a value or as an index to a table configured by RRC.

In some examples, the network entity 105 may signal (e.g., via the control message 615) a right shift to be applied to the PDSCH transmissions 620-*b* and 625-*b* of a multi-PDSCH message in SBFD slots. The bitmap 630-*a* may be shifted to the right by the value of the shift. For example, bits 640 may be appended at the start of the reinterpreted bitmap 630-*b*. Bits 635 may be punctured so that the reinterpreted bitmap 630-*b* addresses (e.g., indicates) RBGs of the sub-bands reserved to PDSCH in the SBFD slot 610. In other examples, the network entity 105 may signal a left shift to be applied to PUSCH transmissions of a multi-PUSCH message in SBFD slots. The bitmap may be shifted to the left by the value of the shift. In some cases, bits may be appended to address RBGs in the subbands reserved to PUSCH in the SBFD slot 610.

Figure 7:

FIG. 7 illustrates an example of a scheduling diagram 700 that supports multiple transmissions with subband full-duplex operation in accordance with one or more aspects of the present disclosure. The scheduling diagram 700 may implement or may be implemented by aspects of the wireless communications systems 100 and 200. For example, the scheduling diagram 700 may include examples of messages transmitted between a UE 115 and a network entity 105, such as transmissions 720 and 725, which may be examples of transmissions in a multi-PDSCH message 210 as described with reference to FIG. 2.

In some examples, a network entity 105 may transmit a control message (e.g., a control message 715, a DCI) that schedules a multi-PDSCH message or a multi-PUSCH message at a UE. The control message may include an FDRA parameter indicated as a bitmap (e.g., corresponding to a first transmission of the multi-PDSCH or multi-PUSCH message). In some examples, the FDRA parameter (e.g., a bitmap 730-*a*) may be set from the RB or RBGs available to the type of transmission (e.g., uplink or downlink) associated with the FDRA in SBFD slots (e.g., an SBFD slot 710).

Thus, in non-SBFD slots, the FDRA parameter (e.g., the bitmap 730-*a*) may be extended to address all RBs or RBGs of the BWP in non-SBFD slots (e.g., a non-SBFD slot 705). For example, in the SBFD slot 710, the bitmap 730-*a* and the interpretation of the bitmap 730-*a* may be unchanged, and the UE 115 or the network entity 105 may use the bitmap 730-*a* to schedule the transmission 720-*a* and the transmission 725-*a* of a multi-PDSCH message. The bitmap 730-*a* may include one bit for each RBG available in the subbands reserved for the type of transmission (e.g., uplink, downlink) in the SBFD slot 710.

However, in a non-SBFD slot 705, a quantity N may be the quantity of bits to cover all RBs/RBGs of the BWP and a quantity P may be the quantity of bits of the FDRA (e.g., the bitmap 730-*a*). The P bits of the FDRA may be applied to the first RBs or RBGs of the BWP in a reinterpreted bitmap 730-*b* (e.g., the P first bits of the bitmap 730-*b* starting from the 0th bit). The network entity 105 or the UE 115 may append N-P bits to the FDRA, which may be the bits 735-*a*, to cover the remaining RBs or RBGs of the BWP (e.g., so that all RBs or RBGs of the bandwidth are covered by the bitmap 730-*b*). The network entity 105 or the UE 115 may interpret the extended FDRA (e.g., the bitmap 730-*b*), where the first RB is the lowest RB in the BWP. Accordingly, the UE 115 or the network entity 105 may use the bitmap 730-*b* to schedule the transmission 720-*b* and the transmission 725-*b* of the multi-PDSCH message in non-SBFD slots.

In some examples, the network entity 105 may change the start of the RBG allocation, which may support increased scheduling flexibility. For example, the network entity 105 may signal a shift (e.g., left shift, right shift) that is applied to the bitmap 730-*a* (e.g., indicated by the FDRA). The network entity 105 may shift the FDRA bitmap 730-*a* to the right or to the left by the value of the shift. The network entity may signal the shift in the control message 715 (e.g., DCI) either as a value or as an index to a table configured by RRC.

In some examples, the network entity 105 may signal (e.g., via the control message 715) a right shift to be applied to the PDSCH transmissions 720-*b* and 725-*b* of a multi-PDSCH message in non-SBFD slots. The bitmap 730-*a* may be shifted to the right by the value of the shift. For example, bits 735-*b* may be appended at the start of the reinterpreted bitmap 730-*b*. The bits 735-*a* may be appended so that the reinterpreted bitmap 730-*b* addresses RBGs (e.g., all RBGs) of the BWP. In other examples, the network entity 105 may signal a right shift to be applied to PUSCH transmissions of a multi-PUSCH message in non-SBFD slots. The bitmap may be shifted to the right by the value of the shift. In some cases, bits may be appended to address RBGs (e.g., all RBGs) of the BWP.

Figure 8:
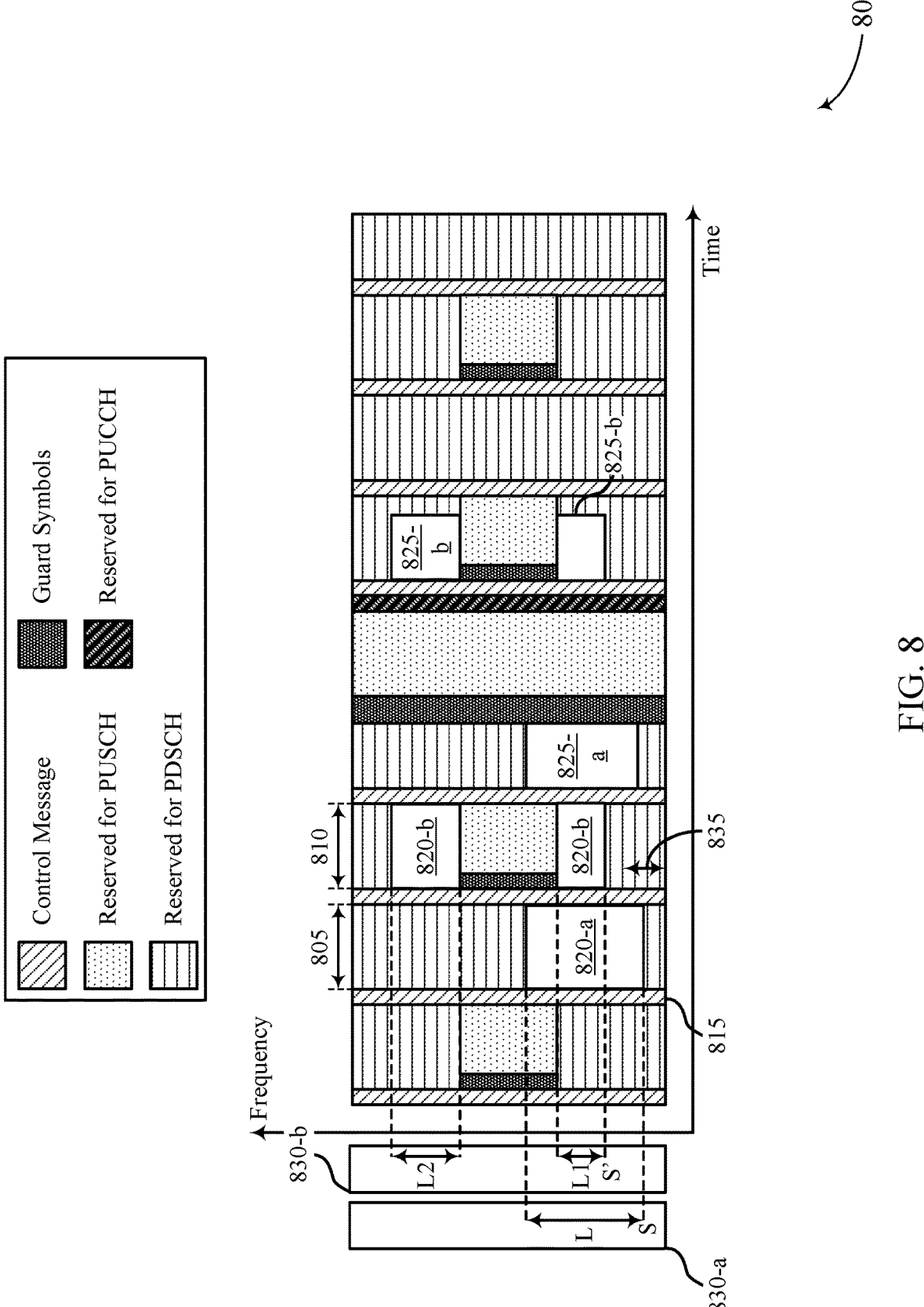

FIG. 8 illustrates an example of a scheduling diagram 800 that supports multiple transmissions with subband full-duplex operation in accordance with one or more aspects of the present disclosure. The scheduling diagram 800 may implement or may be implemented by aspects of the wireless communications systems 100 and 200. For example, the scheduling diagram 800 may include examples of messages transmitted between a UE 115 and a network entity 105, such as transmissions 820 and 825, which may be examples of transmissions in a multi-PDSCH message 210 as described with reference to FIG. 2.

In some examples (e.g., RAT 1), a network entity 105 may indicate (e.g., via a control message 815) an FDRA to a UE 115 as a resource indication value (RIV) (e.g., to schedule the UE for transmissions). The RIV may be defined by $$RIV = N_{BWP}^{Size}(L_{RBS} - 1) + RB_{start} \text{ if } (L_{RBS} - 1)$$

being less than or equal to $$[N_{BWP}^{Size}/2],$$

and the RIV may be defined by $$RIV = N_{BWP}^{Size}(N_{BWP}^{Size} - L_{RBS} + 1) + (N_{BWP}^{Size} - 1 - RB_{start})$$

otherwise, where $L_{RBS}$ may be greater than or equal to 1 and may not exceed $$N_{BWP}^{Size} - RB_{start}.$$

$RB_{start}$ may be the first RB of the allocation, $L_{RBS}$ may be a quantity of RBs in the allocation, and $$N_{BWP}^{Size}$$

may be a quantity of RBs in the BWP. The network entity 105 or the UE 115 may apply reinterpretations to the FDRA indicated as a RIV to PDSCH transmissions (e.g., of a multi-PDSCH message) with non-interleaved virtual resource block (VRB)-to-PRB mappings.

In some examples, the network entity 105 may transmit a control message (e.g., the control message 815, a DCI) that schedules a multi-PDSCH message or a multi-PUSCH message at a UE. The control message may include an FDRA parameter indicated as a RIV (e.g., corresponding to a first transmission of the multi-PDSCH or multi-PUSCH message). In some examples, the FDRA parameter (e.g., a RIV 830-$a$) may be set from all RBs or RBGs of the BWP in non-SBFD slots (e.g., a non-SBFD slot 805).

Thus, in SBFD slots, the FDRA parameter (e.g., the RIV 830-$a$) may be reinterpreted to address the RBs or RBGs available to the type of transmission (e.g., uplink, downlink) in the SBFD slot 810. For example, in the non-SBFD slot 805, the RIV 830-$a$ and the interpretation of the RIV 830-$a$ may be unchanged, and the UE 115 or the network entity 105 may use the RIV 830-$a$ to schedule the transmission 820-$a$ and the transmission 825-$a$ of a multi-PDSCH message.

However, in an SBFD slot 810, RB$_{start}$ (S') of a reinterpreted RIV 830-$b$ may be relative to the first RB of the subbands reserved to PDSCH in non-SBFD slots plus a frequency shift value 835 that is signaled by the control message 815 (e.g., DCI). L$_{RBs}$1 (e.g., L1) and L$_{RBs}$2 (e.g., L2) may be determined from the RIV 830-$b$. For example, L$_{RBs}$1 may be equal to the lesser of L$_{RBs}$ and a quantity of RBs from the first RB to the last RB of the last subband reserved for PDSCH in the SBFD slot 810. L$_{RBs}$2 may be equal to L$_{RBs}$−L$_{RBs}$1. Accordingly, the UE 115 or the network entity 105 may use the reinterpreted RIV 830-$b$ to schedule the transmissions 820-$b$ and 825-$b$ of the multi-PDSCH message in SBFD slots.

In some other examples, the network entity 105 may transmit a control message indicating a FDRA parameter as a RIV to schedule a multi-PUSCH message, including transmissions in SBFD slots and non-SBFD slots. In the non-SBFD slot 805, a RIV and the interpretation of the RIV may be unchanged, and the UE 115 or the network entity 105 may use the RIV to schedule multiple transmissions of the multi-PUSCH message. However, in SBFD slots, RB$_{start}$ (S') of the RIV may be relative to the first RB of the subbands reserved to PUSCH in non-SBFD slots plus a frequency shift value that is signaled by the control message (e.g., DCI). L$_{RBs}$ of the RIV may be the same (e.g., may be interpreted the same) as for a RIV that corresponds to transmissions of the multi-PUSCH message in non-SBFD slots.

Figure 9:
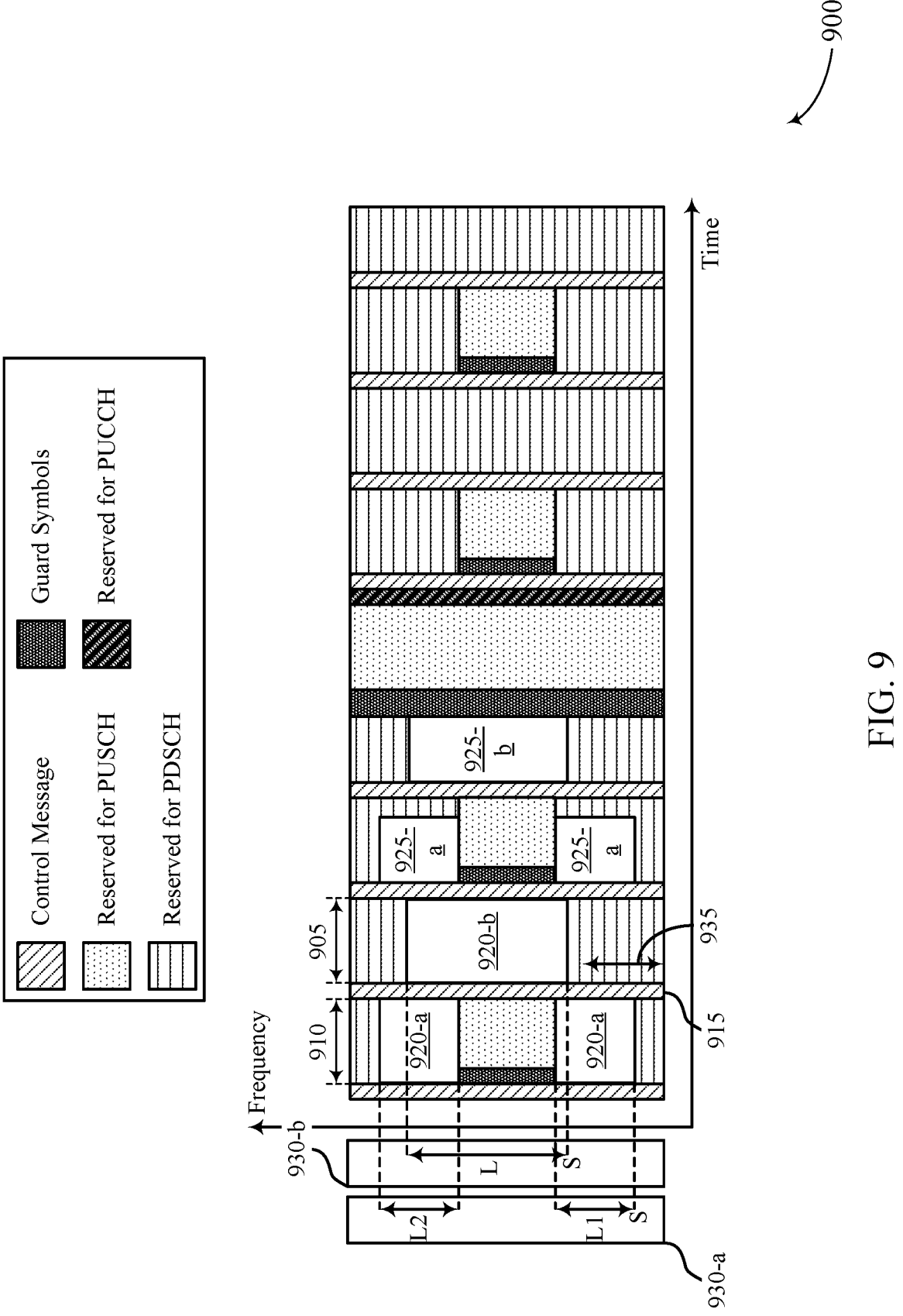

FIG. 9 illustrates an example of a scheduling diagram 900 that supports multiple transmissions with subband full-duplex operation in accordance with one or more aspects of the present disclosure. For example, the scheduling diagram 900 may include examples of messages transmitted between a UE 115 and a network entity 105, such as transmissions 920 and 925, which may be examples of transmissions in a multi-PDSCH message 210 as described with reference to FIG. 2.

In some examples, the network entity 105 may transmit a control message (e.g., the control message 915, a DCI) that schedules a multi-PDSCH message or a multi-PUSCH message at a UE. The control message may include an FDRA parameter indicated as a RIV (e.g., corresponding to a first transmission of the multi-PDSCH or multi-PUSCH message). In some examples, the FDRA parameter (e.g., a RIV 930-$a$) may be set from the RBs or RBGs available to the type of transmission (e.g., uplink, downlink) in the SBFD slot 910.

Thus, in non-SBFD slots, the FDRA parameter (e.g., the RIV 930-$a$) may be reinterpreted to address all RB/RBGs of the BWP in the non-SBFD slot 905. For example, in the SBFD slot 910, RBstart (S') of the RIV 930-$a$ may be relative to the first RB of the subbands reserved for the type (e.g., downlink, uplink) of the transmission. L$_{RBs}$ in the RIV 930-$a$ may be equal to L$_{RBs}$1+L$_{RBs}$2. The UE 115 or the network entity 105 may use the RIV 930-$a$ to schedule the transmission 920-$a$ and the transmission 925-$a$ of a multi-PDSCH message.

However, in an SBFD slot 910, RBstart (S') of a reinterpreted RIV 930-$b$ may be relative to the first RB of the BWP plus a frequency shift value 935 that is signaled by the control message 915 (e.g., DCI). L$_{RBs}$ in the RIV 930-$b$ may be determined from the sum L$_{RBs}$1+L$_{RBs}$2, where L$_{RBs}$1 and L$_{RBs}$2 are indicated by the RIV 930-$a$ and are reinterpreted in the RIV 930-$b$ relative to the first RB of the BWP plus the frequency shift. Accordingly, the UE 115 or the network entity 105 may use the reinterpreted RIV 930-$b$ to schedule the transmissions 920-$b$ and 925-$b$ of the multi-PDSCH message in non-SBFD slots.

Figure 10:
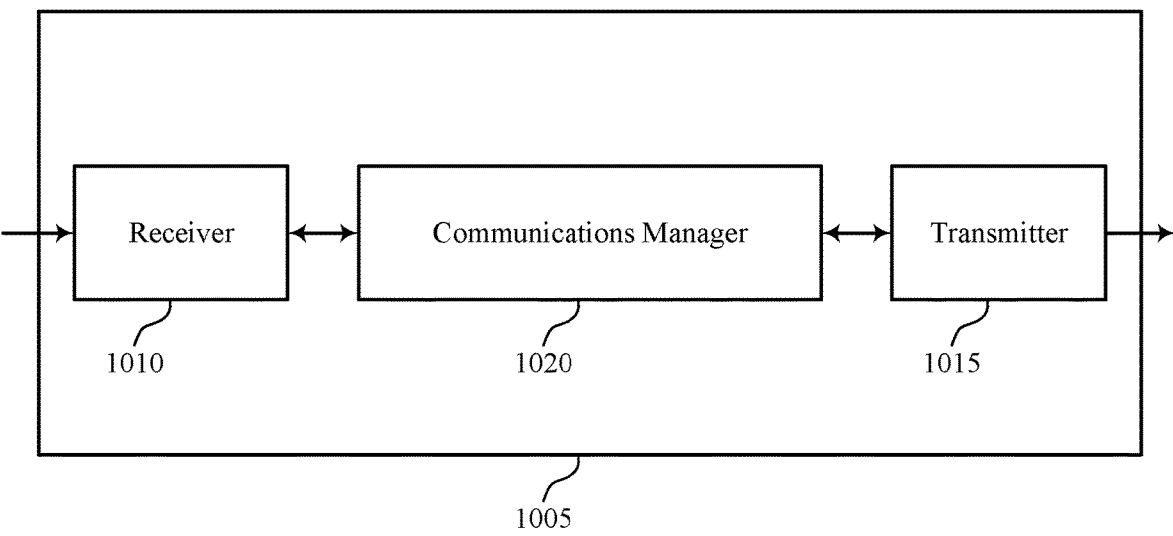
FIGS. 10 and 11 illustrate block diagrams of devices that support multiple transmissions with subband full-duplex operation in accordance with one or more aspects of the present disclosure.

FIG. 10 illustrates a block diagram 1000 of a device 1005 that supports multiple transmissions with subband full-duplex operation in accordance with one or more aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (for example, control channels, data channels, information channels related to multiple transmissions with subband full-duplex operation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (for example, control channels, data channels, information channels related to multiple transmissions with subband full-duplex operation). In some implementations, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of multiple transmissions with subband full-duplex operation as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a UE in accordance with examples as disclosed herein. For example, the communications manager 1020 may be configured as or otherwise support a means for receiving an indication that a set of occasions for a message occurs over a set of multiple symbols, where the set of multiple symbols includes a set of full-duplex symbols and a set of half-duplex symbols. The communications manager 1020 may be configured as or otherwise support a means for selecting one or more resources for communicating the message via a first occasion of the set of occasions in accordance with a set of rules and based on the first occasion being included in a first slot type or a second slot type, the first slot type corresponding to one or more half-duplex symbols of the set of half-duplex symbols and the second slot type corresponding to one or more full-duplex symbols of the set of full-duplex symbols. The communications manager 1020 may be configured as or otherwise support a means for communicating the message using the one or more selected resources.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced power consumption at a UE. For example, the device 1005 may support increased opportunities for sleep (e.g., a low-power mode) at the UE by supporting SBFD slots which allow the UE to transmit uplink messages without delays (e.g., in time), or without waiting to transmit in a non-SBFD (e.g., half-duplex) slot. In some examples, the device 1005 may support efficient utilization of communication resources by allocating a greater quantity of subbands (e.g., RBs) in a bandwidth part for transmission of messages.

Figure 11:
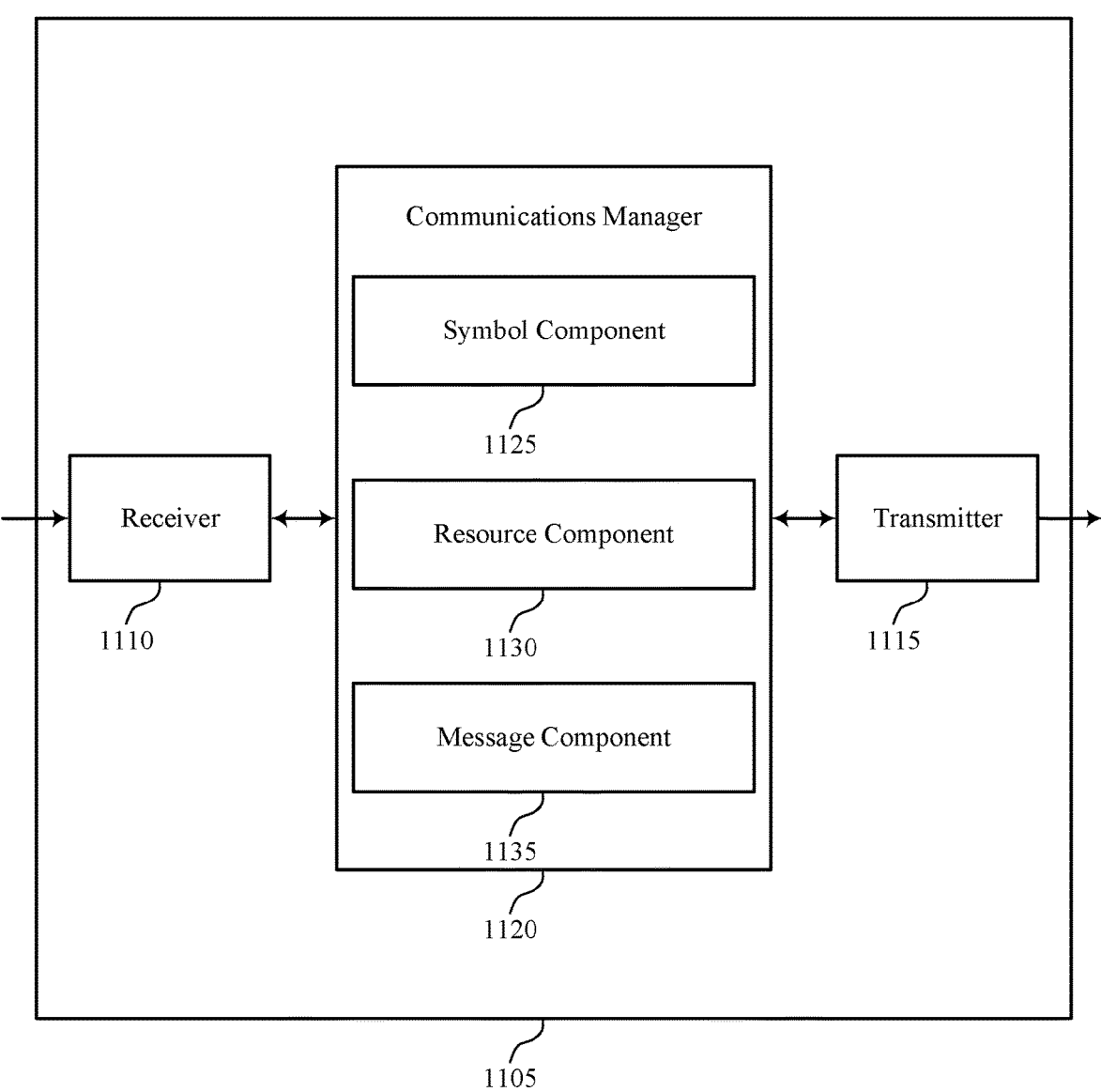

FIG. 11 illustrates a block diagram 1100 of a device 1105 that supports multiple transmissions with subband full-duplex operation in accordance with one or more aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (for example, control channels, data channels, information channels related to multiple transmissions with subband full-duplex operation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (for example, control channels, data channels, information channels related to multiple transmissions with subband full-duplex operation). In some implementations, the transmitter 1115 may be co-located with a receiver 1110 in a transceiver module. The transmitter 1115 may utilize a single antenna or a set of multiple antennas.

The device 1105, or various components thereof, may be an example of means for performing various aspects of multiple transmissions with subband full-duplex operation as described herein. For example, the communications manager 1120 may include a symbol component 1125, a resource component 1130, a message component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a UE in accordance with examples as disclosed herein. The symbol component 1125 may be configured as or otherwise support a means for receiving an indication that a set of occasions for a message occurs over a set of multiple symbols, where the set of multiple symbols includes a set of full-duplex symbols and a set of half-duplex symbols. The resource component 1130 may be configured as or otherwise support a means for selecting one or more resources for communicating the message via a first occasion of the set of occasions in accordance with a set of rules and based on the first occasion being included in a first slot type or a second slot type, the first slot type corresponding to one or more half-duplex symbols of the set of half-duplex symbols and the second slot type corresponding to one or more full-duplex symbols of the set of full-duplex symbols. The message component 1135 may be configured as or otherwise support a means for communicating the message using the one or more selected resources.

Figure 12:
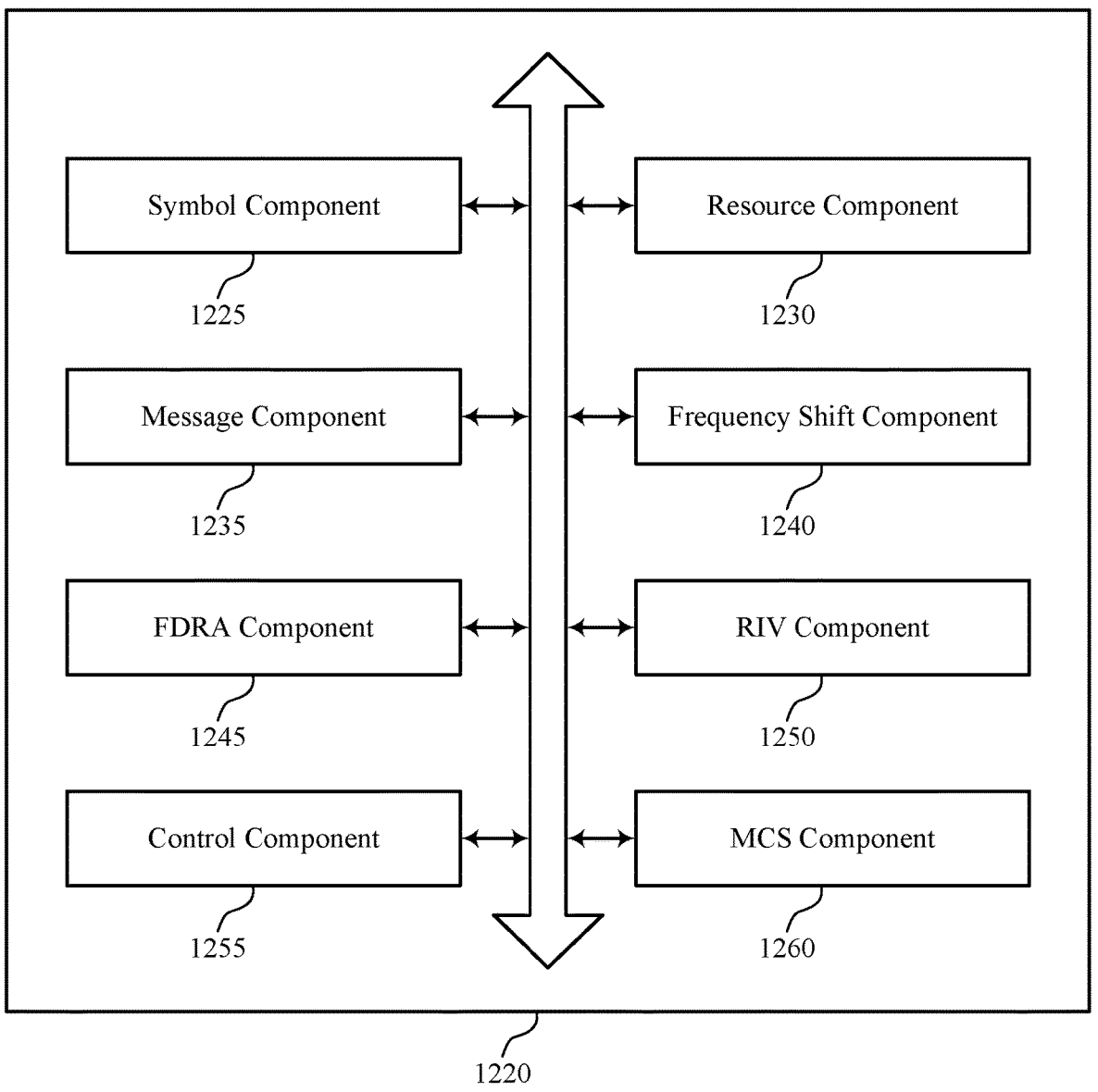
FIG. 12 illustrates a block diagram of a communications manager that supports multiple transmissions with subband full-duplex operation in accordance with one or more aspects of the present disclosure.

FIG. 12 illustrates a block diagram 1200 of a communications manager 1220 that supports multiple transmissions with subband full-duplex operation in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of multiple transmissions with subband full-duplex operation as described herein. For example, the communications manager 1220 may include a symbol component 1225, a resource component 1230, a message component 1235, a frequency shift component 1240, an FDRA component 1245, a RIV component 1250, a control component 1255, an MCS component 1260, or any combination thereof. Each of these components may communicate, directly or indirectly, with one another (e.g., via one or more buses).

The communications manager 1220 may support wireless communication at a UE in accordance with examples as disclosed herein. The symbol component 1225 may be configured as or otherwise support a means for receiving an indication that a set of occasions for a message occurs over a set of multiple symbols, where the set of multiple symbols includes a set of full-duplex symbols and a set of half-duplex symbols. The resource component 1230 may be configured as or otherwise support a means for selecting one or more resources for communicating the message via a first occasion of the set of occasions in accordance with a set of rules and based on the first occasion being included in a first slot type or a second slot type, the first slot type corresponding to one or more half-duplex symbols of the set of half-duplex symbols and the second slot type corresponding to one or more full-duplex symbols of the set of full-duplex symbols. The message component 1235 may be configured as or otherwise support a means for communicating the message using the one or more selected resources.

In some examples, to support communicating the message, the message component 1235 may be configured as or otherwise support a means for communicating, via the first occasion, a first repetition of the message over a first half-duplex symbol of the first slot type. In some examples, to support communicating the message, the message component 1235 may be configured as or otherwise support a means for communicating, via a second occasion of the set of occasions, a second repetition of the message over a second half-duplex symbol of the first slot type in accordance with the set of rules, where the set of rules indicate that multiple transmissions of the message are to be scheduled on same type of slot.

In some examples, to support communicating the message, the message component 1235 may be configured as or otherwise support a means for communicating, via the first occasion, a first repetition of the message over a first full-duplex symbol of the second slot type. In some examples, to support communicating the message, the message component 1235 may be configured as or otherwise support a means for communicating, via a second occasion of the set of occasions, a second repetition of the message over a second full-duplex symbol of the second slot type in accordance with the set of rules, where the set of rules indicate that multiple transmissions of the message are to be scheduled on same type of slot.

In some examples, to support communicating the message, the resource component 1230 may be configured as or otherwise support a means for communicating, via the first occasion, the message using a set of RBs corresponding to at least one subband of a first full-duplex symbol of the second slot type, where the set of RBs has a transmission direction that is configured same as the message.

In some examples, to support communicating the message, the message component 1235 may be configured as or otherwise support a means for communicating, via the first occasion, a first repetition of the message over a first half-duplex symbol of the first slot type. In some examples, to support communicating the message, the frequency shift component 1240 may be configured as or otherwise support a means for applying, in accordance with the set of rules, a frequency shift to allocate a set of RBs corresponding to at least one subband of a first full-duplex symbol of the second slot type to a second repetition of the message, where the set of RBs has a transmission direction that is configured same as the message. In some examples, to support communicating the message, the message component 1235 may be configured as or otherwise support a means for communicating, via a second occasion of the set of occasions, the second repetition of the message using the set of RBs.

In some examples, the frequency shift component 1240 may be configured as or otherwise support a means for receiving, from a network entity, a control signal indicating the frequency shift to be applied to the second repetition of the message. In some examples, the frequency shift includes an indication of a number of RBs, a number of subbands, or both.

In some examples, the frequency shift component 1240 may be configured as or otherwise support a means for receiving, from a network entity, a first control signal indicating a set of values for the frequency shift to be applied to the second repetition of the message. In some examples, the frequency shift component 1240 may be configured as or otherwise support a means for receiving, from the network entity, a second control signal selecting a value for the frequency shift from the set of values.

In some examples, the FDRA component 1245 may be configured as or otherwise support a means for receiving, from a network entity, a control signal including a FDRA parameter indicating an RB allocation for the message. In some examples, the FDRA parameter is set to a number of RBs or RB groups included in a bandwidth part for the first slot type or a number of RBs or RB groups having a transmission direction that is configured same as the message for the second slot type.

In some examples, the resource component 1230 may be configured as or otherwise support a means for selecting, in accordance with the set of rules, a subset of RBs from the RB allocation indicated in the FDRA parameter for communicating the message using the second slot type. where the FDRA parameter is set to a number of RBs or RB groups included in a bandwidth part for the first slot type.

In some examples, the resource component 1230 may be configured as or otherwise support a means for selecting, in accordance with the set of rules, a first subset of RBs from the RB allocation indicated in the FDRA parameter for communicating the message using the first slot type. In some examples, the FDRA component 1245 may be configured as or otherwise support a means for identifying a second subset of RBs appended to the RB allocation indicated in the FDRA parameter for communicating the message using the first slot type, where the FDRA parameter is set to a number of RBs or RB groups having a transmission direction that is configured same as the message for the second slot type.

In some examples, the frequency shift component 1240 may be configured as or otherwise support a means for receiving, from the network entity, an indication of a shift to be applied to the FDRA parameter, where selecting the one or more resources for communicating the message is based on the shift. In some examples, the shift includes a value, or an index to a table, or both.

In some examples, the RIV component 1250 may be configured as or otherwise support a means for receiving, from a network entity, a control signal including a resource indication value indicating at least one of a starting RB of a RB allocation for the message, a number of RBs in the RB allocation, a size of RBs in a bandwidth part, or a combination thereof, where selecting the one or more resources for communicating the message is based on receiving the control signal.

In some examples, the resource component 1230 may be configured as or otherwise support a means for selecting, in accordance with the set of rules, an updated starting RB based on a frequency shift value added to the starting RB. In some examples, the resource component 1230 may be configured as or otherwise support a means for selecting, in accordance with the set of rules, an updated number of RBs based on a minimum of the number of RBs and a second number of RBs reserved for communicating messages, where the resource indication value is set for the first slot type.

In some examples, the resource component 1230 may be configured as or otherwise support a means for selecting, in accordance with the set of rules, an updated starting RB based on a frequency shift value added to a starting RB of the bandwidth part, where the resource indication value is set for the second slot type.

In some examples, the FDRA component 1245 may be configured as or otherwise support a means for receiving, from a network entity, a control signal including a first FDRA parameter indicating a first RB allocation for communicating the message via the first slot type and a second FDRA parameter indicating a second RB allocation for communicating the message via the second slot type.

In some examples, the control component 1255 may be configured as or otherwise support a means for receiving, from a network entity, a control signal indicating the set of rules. In some examples, the MCS component 1260 may be configured as or otherwise support a means for receiving, from a network entity, a control signal indicating a first modulation and coding scheme to be applied to the first slot type and a second modulation and coding scheme to be applied to the second slot type. In some examples, the second modulation and coding scheme is indicated as an absolute value or as a value relative to the first modulation and coding scheme.

In some examples, the control signal includes at least one of a radio resource control signal, a MAC-CE, a downlink control indicator indicating the second modulation and coding scheme as at least one of an absolute value, a value relative to the first modulation and coding scheme, or an index to a table of values, or a combination thereof.

In some examples, an occasion of the set of occasions correspond to at least one of a physical downlink shared channel, a repetition of multiple physical downlink shared channels, a physical uplink shared channel, a repetition of multiple physical uplink shared channels, or a combination thereof.

Figure 13:
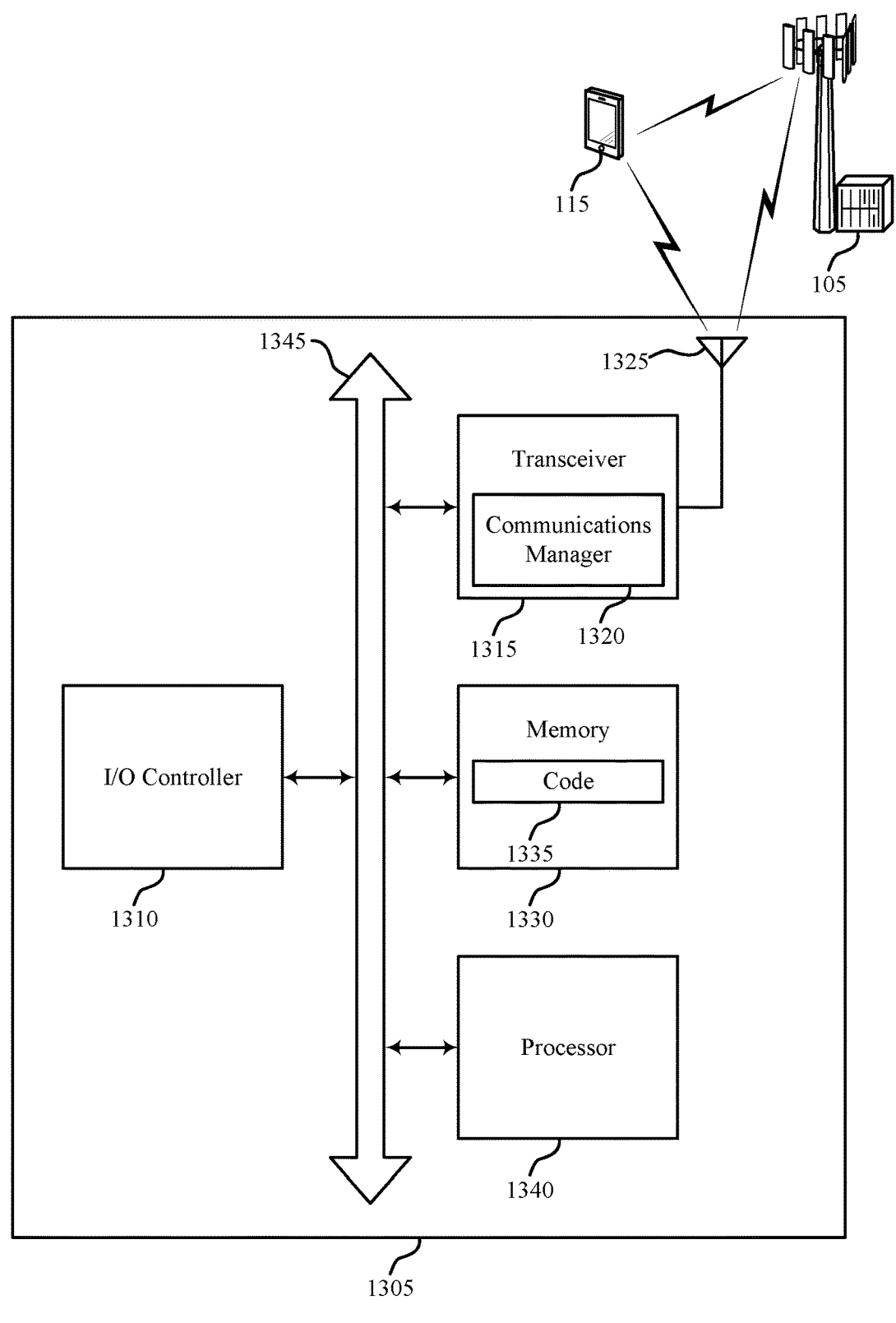
FIG. 13 illustrates a diagram of a system including a device that supports multiple transmissions with subband full-duplex operation in accordance with one or more aspects of the present disclosure.

FIG. 13 illustrates a diagram of a system 1300 including a device 1305 that supports multiple transmissions with subband full-duplex operation in accordance with one or more aspects of the present disclosure. The device 1305 may be an example of or include the components of a device 1005, a device 1105, or a UE 115 as described herein. The device 1305 may communicate (e.g., wirelessly) with one or more network entities 105, one or more UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 also may manage peripherals not integrated into the device 1305. In some implementations, the I/O controller 1310 may represent a physical connection or port to an external peripheral. In some implementations, the I/O controller 1310 may utilize an operating system such as iOS®, ANDROID®, MS-DOS®, MS-WINDOWS®, OS/2®, UNIX®, LINUX®, or another known operating system. Additionally, or alternatively, the I/O controller 1310 may represent or interact with a modem, a keyboard, a mouse, a touchscreen, or a similar device. In some implementations, the I/O controller 1310 may be implemented as part of a processor or processing system, such as the processor 1340. In some implementations, a user may interact with the device 1305 via the I/O controller 1310 or via hardware components controlled by the I/O controller 1310.

In some implementations, the device 1305 may include a single antenna 1325. However, in some other implementations, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 also may include a modem to modulate the packets, to provide the modulated packets to one or more antennas 1325 for transmission, and to demodulate packets received from the one or more antennas 1325. In some implementations, the transceiver 1315 may include one or more interfaces, such as one or more interfaces coupled with the one or more antennas 1325 that are configured to support various receiving or obtaining operations, or one or more interfaces coupled with the one or more antennas 1325 that are configured to support various transmitting or outputting operations, or a combination thereof. In some implementations, the transceiver 1315 may include or be configured for coupling with one or more processors or memory components that are operable to perform or support operations based on received or obtained information or signals, or to generate information or other signals for transmission or other outputting, or any combination thereof. In some implementations, the transceiver 1315, or the transceiver 1315 and the one or more antennas 1325, or the transceiver 1315 and the one or more antennas 1325 and one or more processors or memory components (for example, the processor 1340, or the memory 1330, or both), may be included in a chip or chip assembly that is installed in the device 1305.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some implementations, the code 1335 may not be directly executable by the processor 1340 but may cause a computer (for example, when compiled and executed) to perform functions described herein. In some implementations, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting multiple transmissions with subband full-duplex operation). For example, the device 1305 or a component of the device 1305 may include a processor 1340 and memory 1330 coupled with the processor 1340, the processor 1340 and memory 1330 configured to perform various functions described herein. The processor 1340 may be an example of a cloud-computing platform (e.g., one or more physical nodes and supporting software such as operating systems, virtual machines, or container instances) that may host the functions (e.g., by executing code 1335) to perform the functions of the device 1305. The processor 1340 may be any one or more suitable processors capable of executing scripts or instructions of one or more software programs stored in the device 1305 (such as within the memory 1330). In some implementations, the processor 1340 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1340, or the transceiver 1315, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

The communications manager 1320 may support wireless communication at a UE in accordance with examples as disclosed herein. For example, the communications manager 1320 may be configured as or otherwise support a means for receiving an indication that a set of occasions for a message occurs over a set of multiple symbols, where the set of multiple symbols includes a set of full-duplex symbols and a set of half-duplex symbols. The communications manager 1320 may be configured as or otherwise support a means for selecting one or more resources for communicating the message via a first occasion of the set of occasions in accordance with a set of rules and based on the first occasion being included in a first slot type or a second slot type, the first slot type corresponding to one or more half-duplex symbols of the set of half-duplex symbols and the second slot type corresponding to one or more full-duplex symbols of the set of full-duplex symbols. The communications manager 1320 may be configured as or otherwise support a means for communicating the message using the one or more selected resources.

By including or configuring the communications manager 1320 in accordance with examples as described herein, the device 1305 may support techniques for reduced latency associated with downlink or uplink transmissions. For example, by supporting rules for communication of multiple transmissions that span across SBFD slots and non-SBFD slots, a network entity 105 or a UE 115 may experience increased opportunities for transmission of messages or may allocate resources from a greater pool of available (e.g., candidate) RBs for scheduling transmissions, which may reduce latencies. In some examples, the device 1305 may support improved coordination between devices, for example, by supporting both uplink and downlink transmissions in SBFD slots.

In some implementations, the communications manager 1320 may be configured to perform various operations (for example, receiving, monitoring, transmitting) using or otherwise in cooperation with the transceiver 1315, the one or more antennas 1325, or any combination thereof. Although the communications manager 1320 is illustrated as a component of the transceiver 1315, in some implementations, one or more functions described with reference to the communications manager 1320 may be supported by or performed by the transceiver 1315, the processor 1340, the memory 1330, the code 1335, or any combination thereof. For example, the code 1335 may include instructions executable by the processor 1340 to cause the device 1305 to perform various aspects of multiple transmissions with subband full-duplex operation as described herein, or the processor 1340 and the memory 1330 may be otherwise configured to perform or support such operations.

Figure 14:
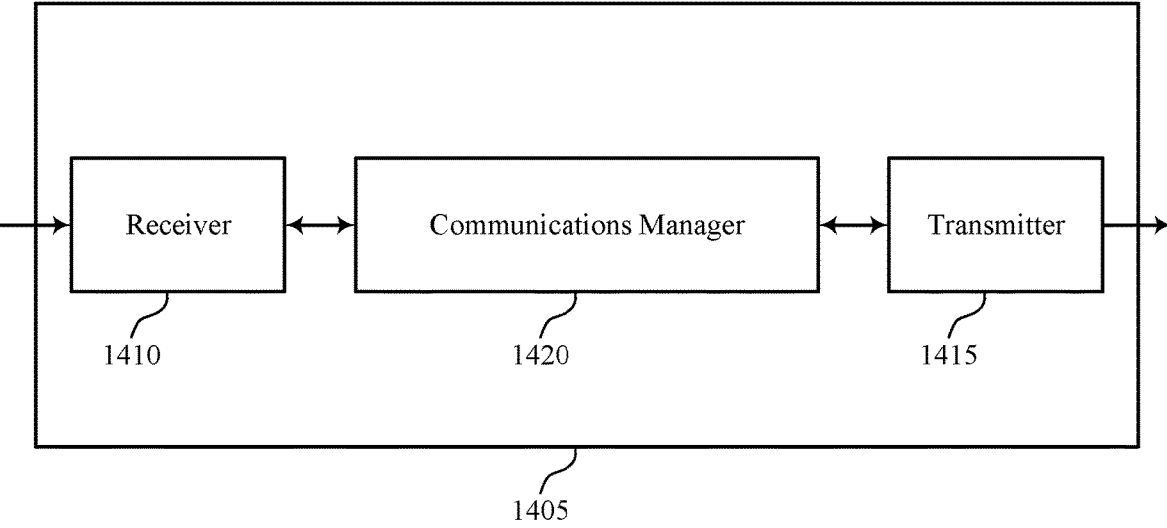
FIGS. 14 and 15 illustrate block diagrams of devices that support multiple transmissions with subband full-duplex operation in accordance with one or more aspects of the present disclosure.

FIG. 14 illustrates a block diagram 1400 of a device 1405 that supports multiple transmissions with subband full-duplex operation in accordance with one or more aspects of the present disclosure. The device 1405 may be an example of aspects of a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The communications manager 1420, the receiver 1410, the transmitter 1415, or various combinations thereof or various components thereof may be examples of means for performing various aspects of multiple transmissions with subband full-duplex operation as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1420 may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communication at a network entity in accordance with examples as disclosed herein. For example, the communications manager 1420 may be configured as or otherwise support a means for transmitting, to a UE, an indication that a set of occasions for a message occurs over a set of multiple symbols, where the set of multiple symbols includes a set of full-duplex symbols and a set of half-duplex symbols. The communications manager 1420 may be configured as or otherwise support a means for selecting one or more resources for communicating the message via a first occasion of the set of occasions in accordance with a set of rules and based on the first occasion being included in a first slot type or a second slot type, the first slot type corresponding to one or more half-duplex symbols of the set of half-duplex symbols and the second slot type corresponding to one or more full-duplex symbols of the set of full-duplex symbols. The communications manager 1420 may be configured as or otherwise support a means for communicating the message using the one or more selected resources.

By including or configuring the communications manager 1420 in accordance with examples as described herein, the device 1405 (e.g., a processor controlling or otherwise coupled with the receiver 1410, the transmitter 1415, the communications manager 1420, or a combination thereof) may support techniques for reduced power consumption at a UE. For example, the device 1405 may support increased opportunities for sleep (e.g., a low-power mode) at the UE by supporting SBFD slots which allow the UE to transmit uplink messages without delays (e.g., in time), or without waiting to transmit in a non-SBFD (e.g., half-duplex) slot. In some examples, the device 1405 may support efficient utilization of communication resources by allocating a greater quantity of subbands (e.g., RBs) in a bandwidth part for transmission of messages.

Figure 15:
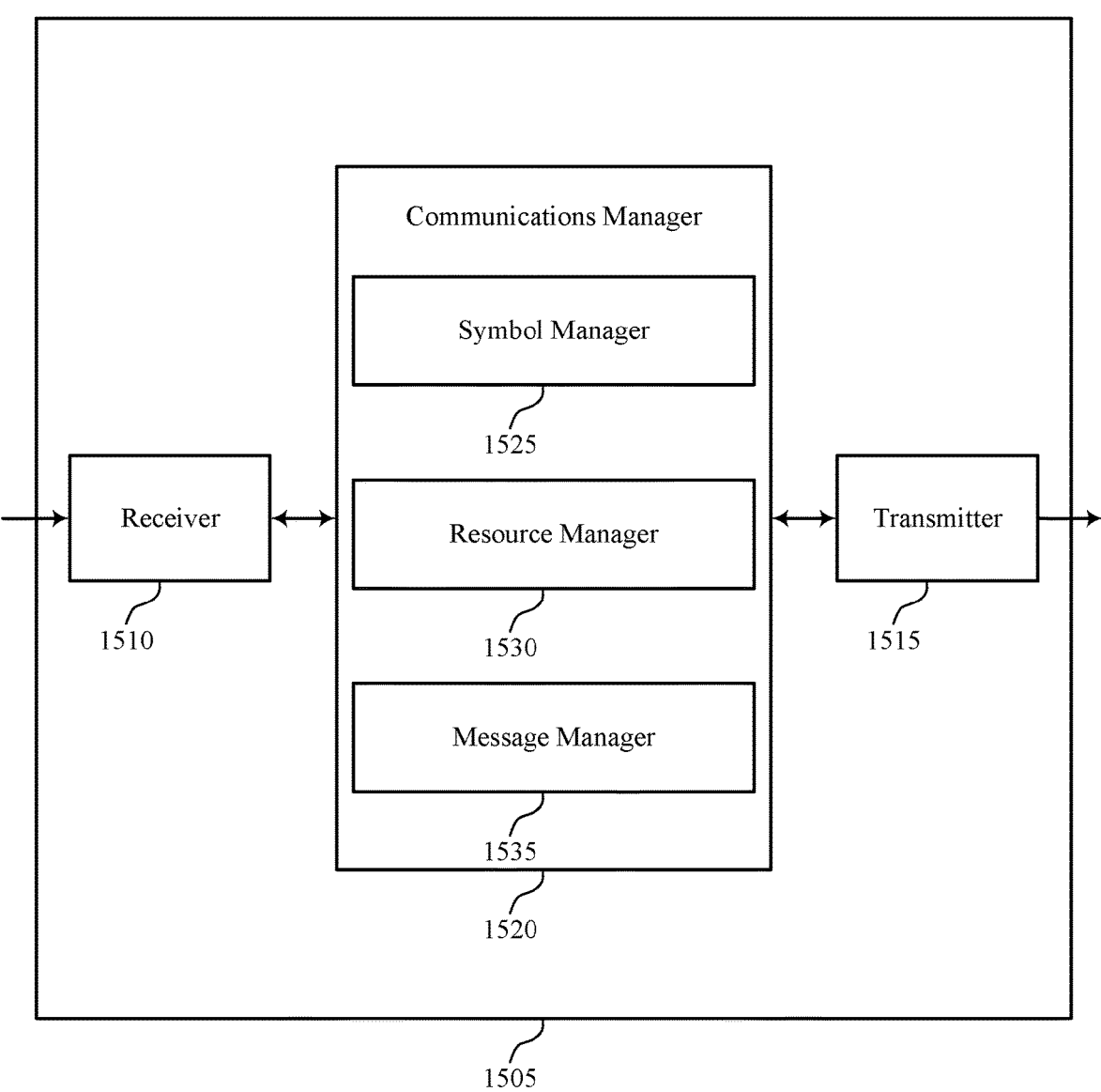

FIG. 15 illustrates a block diagram 1500 of a device 1505 that supports multiple transmissions with subband full-duplex operation in accordance with one or more aspects of the present disclosure. The device 1505 may be an example of aspects of a device 1405 or a network entity 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1505. In some examples, the receiver 1510 may support obtaining information by receiving signals via one or more antennas. Additionally, or alternatively, the receiver 1510 may support obtaining information by receiving signals via one or more wired (e.g., electrical, fiber optic) interfaces, wireless interfaces, or any combination thereof.

The transmitter 1515 may provide a means for outputting (e.g., transmitting, providing, conveying, sending) information generated by other components of the device 1505. For example, the transmitter 1515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1515 may support outputting information by transmitting signals via one or more antennas. Additionally, or alternatively, the transmitter 1515 may support outputting information by transmitting signals via one or more wired (e.g., electrical, fiber optic) interfaces, wireless interfaces, or any combination thereof. In some examples, the transmitter 1515 and the receiver 1510 may be co-located in a transceiver, which may include or be coupled with a modem.

The device 1505, or various components thereof, may be an example of means for performing various aspects of multiple transmissions with subband full-duplex operation as described herein. For example, the communications manager 1520 may include a symbol manager 1525, a resource manager 1530, a message manager 1535, or any combination thereof. The communications manager 1520 may be an example of aspects of a communications manager 1420 as described herein. In some examples, the communications manager 1520, or various components thereof, may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communication at a network entity in accordance with examples as disclosed herein. The symbol manager 1525 may be configured as or otherwise support a means for transmitting, to a UE, an indication that a set of occasions for a message occurs over a set of multiple symbols, where the set of multiple symbols includes a set of full-duplex symbols and a set of half-duplex symbols. The resource manager 1530 may be configured as or otherwise support a means for selecting one or more resources for communicating the message via a first occasion of the set of occasions in accordance with a set of rules and based on the first occasion being included in a first slot type or a second slot type, the first slot type corresponding to one or more half-duplex symbols of the set of half-duplex symbols and the second slot type corresponding to one or more full-duplex symbols of the set of full-duplex symbols. The message manager

1535 may be configured as or otherwise support a means for communicating the message using the one or more selected resources.

Figure 16:
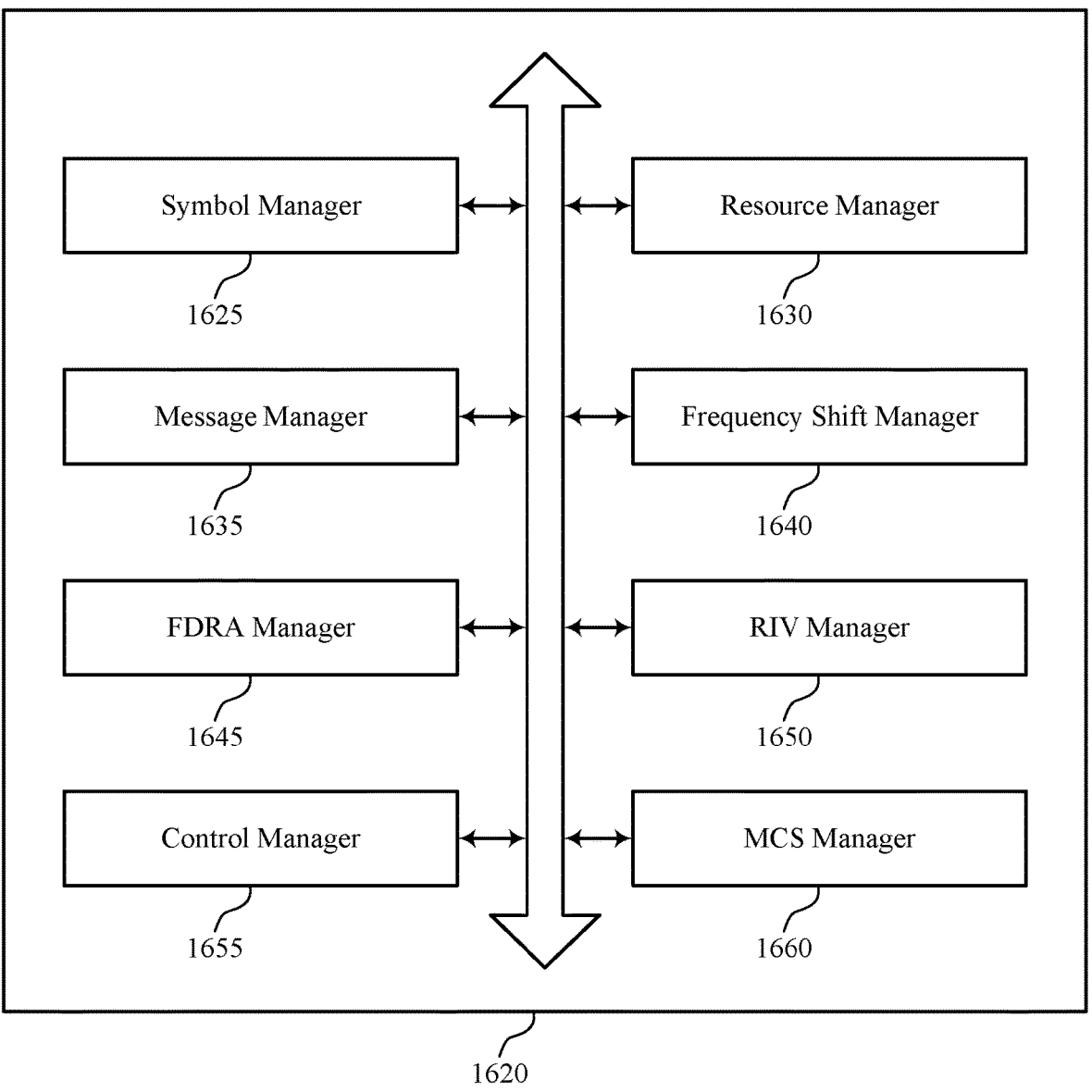
FIG. 16 illustrates a block diagram of a communications manager that supports multiple transmissions with subband full-duplex operation in accordance with one or more aspects of the present disclosure.

FIG. 16 illustrates a block diagram 1600 of a communications manager 1620 that supports multiple transmissions with subband full-duplex operation in accordance with one or more aspects of the present disclosure. The communications manager 1620 may be an example of aspects of a communications manager 1420, a communications manager 1520, or both, as described herein. The communications manager 1620, or various components thereof, may be an example of means for performing various aspects of multiple transmissions with subband full-duplex operation as described herein. For example, the communications manager 1620 may include a symbol manager 1625, a resource manager 1630, a message manager 1635, a frequency shift manager 1640, an FDRA manager 1645, a RIV manager 1650, a control manager 1655, an MCS manager 1660, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1620 may support wireless communication at a network entity in accordance with examples as disclosed herein. The symbol manager 1625 may be configured as or otherwise support a means for transmitting, to a UE, an indication that a set of occasions for a message occurs over a set of multiple symbols, where the set of multiple symbols includes a set of full-duplex symbols and a set of half-duplex symbols. The resource manager 1630 may be configured as or otherwise support a means for selecting one or more resources for communicating the message via a first occasion of the set of occasions in accordance with a set of rules and based on the first occasion being included in a first slot type or a second slot type, the first slot type corresponding to one or more half-duplex symbols of the set of half-duplex symbols and the second slot type corresponding to one or more full-duplex symbols of the set of full-duplex symbols. The message manager 1635 may be configured as or otherwise support a means for communicating the message using the one or more selected resources.

In some examples, to support communicating the message, the message manager 1635 may be configured as or otherwise support a means for communicating, via the first occasion, a first repetition of the message over a first half-duplex symbol of the first slot type. In some examples, to support communicating the message, the message manager 1635 may be configured as or otherwise support a means for communicating, via a second occasion of the set of occasions, a second repetition of the message over a second half-duplex symbol of the first slot type in accordance with the set of rules, where the set of rules indicate that multiple transmissions of the message are to be scheduled on same type of slot.

In some examples, to support communicating the message, the message manager 1635 may be configured as or otherwise support a means for communicating, via the first occasion, a first repetition of the message over a first full-duplex symbol of the second slot type. In some examples, to support communicating the message, the message manager 1635 may be configured as or otherwise support a means for communicating, via a second occasion of the set of occasions, a second repetition of the message over a second full-duplex symbol of the second slot type in accordance with the set of rules, where the set of rules indicate that multiple transmissions of the message are to be scheduled on same type of slot.

In some examples, to support communicating the message, the resource manager 1630 may be configured as or otherwise support a means for communicating, via the first occasion, the message using a set of RBs corresponding to at least one subband of a first full-duplex symbol of the second slot type, where the set of RBs has a transmission direction that is configured same as the message.

In some examples, to support communicating the message, the message manager 1635 may be configured as or otherwise support a means for communicating, via the first occasion, a first repetition of the message over a first half-duplex symbol of the first slot type. In some examples, to support communicating the message, the frequency shift manager 1640 may be configured as or otherwise support a means for applying, in accordance with the set of rules, a frequency shift to allocate a set of RBs corresponding to at least one subband of a first full-duplex symbol of the second slot type to a second repetition of the message, where the set of RBs has a transmission direction that is configured same as the message. In some examples, to support communicating the message, the message manager 1635 may be configured as or otherwise support a means for communicating, via a second occasion of the set of occasions, the second repetition of the message using the set of RBs.

In some examples, the frequency shift manager 1640 may be configured as or otherwise support a means for transmitting, to the UE, a control signal indicating the frequency shift to be applied to the second repetition of the message. In some examples, the frequency shift includes an indication of a number of RBs, a number of subbands, or both.

In some examples, the frequency shift manager 1640 may be configured as or otherwise support a means for transmitting, to the UE, a first control signal indicating a set of values for the frequency shift to be applied to the second repetition of the message. In some examples, the frequency shift manager 1640 may be configured as or otherwise support a means for transmitting, to the UE, a second control signal selecting a value for the frequency shift from the set of values.

In some examples, the FDRA manager 1645 may be configured as or otherwise support a means for transmitting, to the UE, a control signal including a FDRA parameter indicating an RB allocation for the message.

In some examples, the FDRA parameter is set to a number of RBs or RB groups included in a bandwidth part for the first slot type or a number of RBs or RB groups having a transmission direction that is configured same as the message for the second slot type.

In some examples, the resource manager 1630 may be configured as or otherwise support a means for selecting, in accordance with the set of rules, a subset of RBs from the RB allocation indicated in the FDRA parameter for communicating the message using the second slot type. where the FDRA parameter is set to a number of RBs or RB groups included in a bandwidth part for the first slot type.

In some examples, the resource manager 1630 may be configured as or otherwise support a means for selecting, in accordance with the set of rules, a first subset of RBs from the RB allocation indicated in the FDRA parameter for communicating the message using the first slot type. In some examples, the FDRA manager 1645 may be configured as or otherwise support a means for identifying a second subset of RBs appended to the RB allocation indicated in the FDRA parameter for communicating the message using the first slot type, where the FDRA parameter is set to a number of RBs or RB groups having a transmission direction that is configured same as the message for the second slot type.

In some examples, the frequency shift manager 1640 may be configured as or otherwise support a means for transmitting, to the UE, an indication of a shift to be applied to the FDRA parameter, where selecting the one or more resources for communicating the message is based on the shift. In some examples, the shift includes a value, or an index to a table, or both.

In some examples, the RIV manager 1650 may be configured as or otherwise support a means for transmitting, to the UE, a control signal including a resource indication value indicating at least one of a starting RB of a RB allocation for the message, a number of RBs in the RB allocation, a size of RBs in a bandwidth part, or a combination thereof, where selecting the one or more resources for communicating the message is based on transmitting the control signal.

In some examples, the resource manager 1630 may be configured as or otherwise support a means for selecting, in accordance with the set of rules, an updated starting RB based on a frequency shift value added to the starting RB. In some examples, the resource manager 1630 may be configured as or otherwise support a means for selecting, in accordance with the set of rules, an updated number of RBs based on a minimum of the number of RBs and a second number of RBs reserved for communicating messages, where the resource indication value is set for the first slot type.

In some examples, the resource manager 1630 may be configured as or otherwise support a means for selecting, in accordance with the set of rules, an updated starting RB based on a frequency shift value added to a starting RB of the bandwidth part, where the resource indication value is set for the second slot type.

In some examples, the FDRA manager 1645 may be configured as or otherwise support a means for transmitting, to the UE, a control signal including a first FDRA parameter indicating a first RB allocation for communicating the message via the first slot type and a second FDRA parameter indicating a second RB allocation for communicating the message via the second slot type. In some examples, the control manager 1655 may be configured as or otherwise support a means for transmitting, to the UE, a control signal indicating the set of rules.

In some examples, the MCS manager 1660 may be configured as or otherwise support a means for transmitting, to the UE, a control signal indicating a first modulation and coding scheme to be applied to the first slot type and a second modulation and coding scheme to be applied to the second slot type.

In some examples, the second modulation and coding scheme is indicated as an absolute value or as a value relative to the first modulation and coding scheme.

In some examples, the control signal includes at least one of a radio resource control signal, a MAC-CE, a downlink control indicator indicating the second modulation and coding scheme as at least one of an absolute value, a value relative to the first modulation and coding scheme, or an index to a table of values, or a combination thereof.

In some examples, an occasion of the set of occasions correspond to at least one of a physical downlink shared channel, a repetition of multiple physical downlink shared channels, a physical uplink shared channel, a repetition of multiple physical uplink shared channels, or a combination thereof.

Figure 17:
FIG. 17 illustrates a diagram of a system including a device that supports multiple transmissions with subband full-duplex operation in accordance with one or more aspects of the present disclosure.

FIG. 17 illustrates a diagram of a system 1700 including a device 1705 that supports multiple transmissions with subband full-duplex operation in accordance with one or more aspects of the present disclosure. The device 1705 may be an example of or include the components of a device 1405, a device 1505, or a network entity 105 as described herein. The device 1705 may communicate with one or more network entities 105, one or more UEs 115, or any combination thereof, which may include communications over one or more wired interfaces, over one or more wireless interfaces, or any combination thereof. The device 1705 may include components that support outputting and obtaining communications, such as a communications manager 1720, a transceiver 1710, an antenna 1715, a memory 1725, code 1730, and a processor 1735. These components may be in electronic communication or otherwise coupled (e.g., operatively, communicatively, functionally, electronically, electrically) via one or more buses (e.g., a bus 1740).

The transceiver 1710 may support bi-directional communications via wired links, wireless links, or both as described herein. In some examples, the transceiver 1710 may include a wired transceiver and may communicate bi-directionally with another wired transceiver. Additionally, or alternatively, in some examples, the transceiver 1710 may include a wireless transceiver and may communicate bi-directionally with another wireless transceiver. In some examples, the device 1705 may include one or more antennas 1715, which may be capable of transmitting or receiving wireless transmissions (e.g., concurrently). The transceiver 1710 may also include a modem to modulate signals, to provide the modulated signals for transmission (e.g., by one or more antennas 1715, by a wired transmitter), to receive modulated signals (e.g., from one or more antennas 1715, from a wired receiver), and to demodulate signals. In some implementations, the transceiver 1710 may include one or more interfaces, such as one or more interfaces coupled with the one or more antennas 1715 that are configured to support various receiving or obtaining operations, or one or more interfaces coupled with the one or more antennas 1715 that are configured to support various transmitting or outputting operations, or a combination thereof. In some implementations, the transceiver 1710 may include or be configured for coupling with one or more processors or memory components that are operable to perform or support operations based on received or obtained information or signals, or to generate information or other signals for transmission or other outputting, or any combination thereof. In some implementations, the transceiver 1710, or the transceiver 1710 and the one or more antennas 1715, or the transceiver 1710 and the one or more antennas 1715 and one or more processors or memory components (for example, the processor 1735, or the memory 1725, or both), may be included in a chip or chip assembly that is installed in the device 1705. In some examples, the transceiver may be operable to support communications via one or more communications links (e.g., a communication link 125, a backhaul communication link 120, a midhaul communication link 162, a fronthaul communication link 168).

The memory 1725 may include RAM and ROM. The memory 1725 may store computer-readable, computer-executable code 1730 including instructions that, when executed by the processor 1735, cause the device 1705 to perform various functions described herein. The code 1730 may be stored in a non-transitory computer-readable medium such as system memory or another type of memory. In some cases, the code 1730 may not be directly executable by the processor 1735 but may cause a computer (e.g., when compiled and executed) to perform functions described herein. In some cases, the memory 1725 may contain, among other things, a BIOS which may control basic hardware or software operation such as the interaction with peripheral components or devices.

The processor 1735 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1735 may be configured to operate a memory array using a memory controller. In some other cases, a memory controller may be integrated into the processor 1735. The processor 1735 may be configured to execute computer-readable instructions stored in a memory (e.g., the memory 1725) to cause the device 1705 to perform various functions (e.g., functions or tasks supporting multiple transmissions with subband full-duplex operation). For example, the device 1705 or a component of the device 1705 may include a processor 1735 and memory 1725 coupled with the processor 1735, the processor 1735 and memory 1725 configured to perform various functions described herein. The processor 1735 may be an example of a cloud-computing platform (e.g., one or more physical nodes and supporting software such as operating systems, virtual machines, or container instances) that may host the functions (e.g., by executing code 1730) to perform the functions of the device 1705. The processor 1735 may be any one or more suitable processors capable of executing scripts or instructions of one or more software programs stored in the device 1705 (such as within the memory 1725). In some implementations, the processor 1735 may be a component of a processing system. A processing system may generally refer to a system or series of machines or components that receives inputs and processes the inputs to produce a set of outputs (which may be passed to other systems or components of, for example, the device 1705). For example, a processing system of the device 1705 may refer to a system including the various other components or subcomponents of the device 1705, such as the processor 1735, or the transceiver 1710, or the communications manager 1720, or other components or combinations of components of the device 1705. The processing system of the device 1705 may interface with other components of the device 1705, and may process information received from other components (such as inputs or signals) or output information to other components. For example, a chip or modem of the device 1705 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1705 may transmit information output from the chip or modem. Additionally, or alternatively, in some implementations, the one or more interfaces may refer to an interface between the processing system of the chip or modem and a receiver, such that the device 1705 may obtain information or signal inputs, and the information may be passed to the processing system.

A person having ordinary skill in the art will readily recognize that a first interface also may obtain information or signal inputs, and a second interface also may output information or signal outputs.

In some examples, a bus 1740 may support communications of (e.g., within) a protocol layer of a protocol stack. In some examples, a bus 1740 may support communications associated with a logical channel of a protocol stack (e.g., between protocol layers of a protocol stack), which may include communications performed within a component of the device 1705, or between different components of the device 1705 that may be co-located or located in different locations (e.g., where the device 1705 may refer to a system in which one or more of the communications manager 1720, the transceiver 1710, the memory 1725, the code 1730, and the processor 1735 may be located in one of the different components or divided between different components).

In some examples, the communications manager 1720 may manage aspects of communications with a core network 130 (e.g., via one or more wired or wireless backhaul links). For example, the communications manager 1720 may manage the transfer of data communications for client devices, such as one or more UEs 115. In some examples, the communications manager 1720 may manage communications with other network entities 105, and may include a controller or scheduler for controlling communications with UEs 115 in cooperation with other network entities 105. In some examples, the communications manager 1720 may support an X2 interface within an LTE/LTE-A wireless communications network technology to provide communication between network entities 105.

The communications manager 1720 may support wireless communication at a network entity in accordance with examples as disclosed herein. For example, the communications manager 1720 may be configured as or otherwise support a means for transmitting, to a UE, an indication that a set of occasions for a message occurs over a set of multiple symbols, where the set of multiple symbols includes a set of full-duplex symbols and a set of half-duplex symbols. The communications manager 1720 may be configured as or otherwise support a means for selecting one or more resources for communicating the message via a first occasion of the set of occasions in accordance with a set of rules and based on the first occasion being included in a first slot type or a second slot type, the first slot type corresponding to one or more half-duplex symbols of the set of half-duplex symbols and the second slot type corresponding to one or more full-duplex symbols of the set of full-duplex symbols. The communications manager 1720 may be configured as or otherwise support a means for communicating the message using the one or more selected resources.

By including or configuring the communications manager 1720 in accordance with examples as described herein, the device 1705 may support techniques for reduced latency associated with downlink or uplink transmissions. For example, by supporting rules for communication of multiple transmissions that span across SBFD slots and non-SBFD slots, a network entity or a UE may experience increased opportunities for transmission of messages or may allocate resources from a greater pool of available (e.g., candidate) RBs for scheduling transmissions, which may reduce latencies. In some examples, the device 1305 may support improved coordination between devices, for example, by supporting both uplink and downlink transmissions in SBFD slots.

In some examples, the communications manager 1720 may be configured to perform various operations (e.g., receiving, obtaining, monitoring, outputting, transmitting) using or otherwise in cooperation with the transceiver 1710, the one or more antennas 1715 (e.g., where applicable), or any combination thereof. Although the communications manager 1720 is illustrated as a separate component, in some examples, one or more functions described with reference to the communications manager 1720 may be supported by or performed by the transceiver 1710, the processor 1735, the memory 1725, the code 1730, or any combination thereof. For example, the code 1730 may include instructions executable by the processor 1735 to cause the device 1705 to perform various aspects of multiple transmissions with subband full-duplex operation as described herein, or the processor 1735 and the memory 1725 may be otherwise configured to perform or support such operations.

FIG. 18 illustrates a flowchart showing a method 1800 that supports multiple transmissions with subband full-duplex operation in accordance with one or more aspects of the present disclosure. The operations of the method 1800 may be implemented by a UE or its components as described herein. For example, the operations of the method 1800 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1805, the method may include receiving an indication that a set of occasions for a message occurs over a plurality of symbols, wherein the plurality of symbols comprises a set of full-duplex symbols and a set of half-duplex symbols. The operations of 1805 may be performed in accordance with examples as disclosed herein. In some examples, aspects of the operations of 1805 may be performed by a symbol component 1225 as described with reference to FIG. 12.

At 1810, the method may include selecting one or more resources for communicating the message via a first occasion of the set of occasions in accordance with a set of rules and based at least in part on the first occasion being included in a first slot type or a second slot type, the first slot type corresponding to one or more half-duplex symbols of the set of half-duplex symbols and the second slot type corresponding to one or more full-duplex symbols of the set of full-duplex symbols. The operations of 1810 may be performed in accordance with examples as disclosed herein. In some examples, aspects of the operations of 1810 may be performed by a resource component 1230 as described with reference to FIG. 12.

At 1815, the method may include communicating the message using the one or more selected resources. The operations of 1815 may be performed in accordance with examples as disclosed herein. In some examples, aspects of the operations of 1815 may be performed by a message component 1235 as described with reference to FIG. 12.

FIG. 19 illustrates a flowchart showing a method 1900 that supports multiple transmissions with subband full-duplex operation in accordance with one or more aspects of the present disclosure. The operations of the method 1900 may be implemented by a UE or its components as described herein. For example, the operations of the method 1900 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1905, the method may include receiving an indication that a set of occasions for a message occurs over a plurality of symbols, wherein the plurality of symbols comprises a set of full-duplex symbols and a set of half-duplex symbols. The operations of 1905 may be performed in accordance with examples as disclosed herein. In some examples, aspects of the operations of 1905 may be performed by a symbol component 1225 as described with reference to FIG. 12.

At 1910, the method may include selecting one or more resources for communicating the message via a first occasion of the set of occasions in accordance with a set of rules and based at least in part on the first occasion being included in a first slot type or a second slot type, the first slot type corresponding to one or more half-duplex symbols of the set of half-duplex symbols and the second slot type corresponding to one or more full-duplex symbols of the set of full-duplex symbols. The operations of 1910 may be performed in accordance with examples as disclosed herein. In some examples, aspects of the operations of 1910 may be performed by a resource component 1230 as described with reference to FIG. 12.

At 1915, the method may include communicating the message using the one or more selected resources. The operations of 1915 may be performed in accordance with examples as disclosed herein. In some examples, aspects of the operations of 1915 may be performed by a message component 1235 as described with reference to FIG. 12.

At 1920, the method may include communicating, via the first occasion, a first repetition of the message over a first half-duplex symbol of the first slot type. The operations of 1920 may be performed in accordance with examples as disclosed herein. In some examples, aspects of the operations of 1920 may be performed by a message component 1235 as described with reference to FIG. 12.

At 1925, the method may include communicating, via a second occasion of the set of occasions, a second repetition of the message over a second half-duplex symbol of the first slot type in accordance with the set of rules, wherein the set of rules indicate that multiple transmissions of the message are to be scheduled on same type of slot. The operations of 1925 may be performed in accordance with examples as disclosed herein. In some examples, aspects of the operations of 1925 may be performed by a message component 1235 as described with reference to FIG. 12.

FIG. 20 illustrates a flowchart showing a method 2000 that supports multiple transmissions with subband full-duplex operation in accordance with one or more aspects of the present disclosure. The operations of the method 2000 may be implemented by a UE or its components as described herein. For example, the operations of the method 2000 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 2005, the method may include receiving an indication that a set of occasions for a message occurs over a plurality of symbols, wherein the plurality of symbols comprises a set of full-duplex symbols and a set of half-duplex symbols. The operations of 2005 may be performed in accordance with examples as disclosed herein. In some examples, aspects of the operations of 2005 may be performed by a symbol component 1225 as described with reference to FIG. 12.

At 2010, the method may include selecting one or more resources for communicating the message via a first occasion of the set of occasions in accordance with a set of rules and based at least in part on the first occasion being included in a first slot type or a second slot type, the first slot type corresponding to one or more half-duplex symbols of the set of half-duplex symbols and the second slot type corresponding to one or more full-duplex symbols of the set of full-duplex symbols. The operations of 2010 may be performed in accordance with examples as disclosed herein. In some examples, aspects of the operations of 2010 may be performed by a resource component 1230 as described with reference to FIG. 12.

At 2015, the method may include communicating the message using the one or more selected resources. The operations of 2015 may be performed in accordance with examples as disclosed herein. In some examples, aspects of the operations of 2015 may be performed by a message component 1235 as described with reference to FIG. 12.

At 2020, the method may include communicating, via the first occasion, a first repetition of the message over a first full-duplex symbol of the second slot type. The operations of 2020 may be performed in accordance with examples as disclosed herein. In some examples, aspects of the operations of 2020 may be performed by a message component 1235 as described with reference to FIG. 12.

At 2025, the method may include communicating, via a second occasion of the set of occasions, a second repetition of the message over a second full-duplex symbol of the second slot type in accordance with the set of rules, wherein the set of rules indicate that multiple transmissions of the message are to be scheduled on same type of slot. The operations of 2025 may be performed in accordance with examples as disclosed herein. In some examples, aspects of the operations of 2025 may be performed by a message component 1235 as described with reference to FIG. 12.

FIG. 21 illustrates a flowchart showing a method 2100 that supports multiple transmissions with subband full-duplex operation in accordance with one or more aspects of the present disclosure. The operations of the method 2100 may be implemented by a UE or its components as described herein. For example, the operations of the method 2100 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 2105, the method may include receiving an indication that a set of occasions for a message occurs over a plurality of symbols, wherein the plurality of symbols comprises a set of full-duplex symbols and a set of half-duplex symbols. The operations of 2105 may be performed in accordance with examples as disclosed herein. In some examples, aspects of the operations of 2105 may be performed by a symbol component 1225 as described with reference to FIG. 12.

At 2110, the method may include selecting one or more resources for communicating the message via a first occasion of the set of occasions in accordance with a set of rules and based at least in part on the first occasion being included in a first slot type or a second slot type, the first slot type corresponding to one or more half-duplex symbols of the set of half-duplex symbols and the second slot type corresponding to one or more full-duplex symbols of the set of full-duplex symbols. The operations of 2110 may be performed in accordance with examples as disclosed herein. In some examples, aspects of the operations of 2110 may be performed by a resource component 1230 as described with reference to FIG. 12.

At 2115, the method may include communicating the message using the one or more selected resources. The operations of 2115 may be performed in accordance with examples as disclosed herein. In some examples, aspects of the operations of 2115 may be performed by a message component 1235 as described with reference to FIG. 12.

At 2120, the method may include communicating, via the first occasion, a first repetition of the message over a first half-duplex symbol of the first slot type. The operations of 2120 may be performed in accordance with examples as disclosed herein. In some examples, aspects of the operations of 2120 may be performed by a message component 1235 as described with reference to FIG. 12.

At 2125, the method may include applying, in accordance with the set of rules, a frequency shift to allocate a set of RBs corresponding to at least one subband of a first full-duplex symbol of the second slot type to a second repetition of the message, wherein the set of RBs has a transmission direction that is configured same as the message. The operations of 2125 may be performed in accordance with examples as disclosed herein. In some examples, aspects of the operations of 2125 may be performed by a frequency shift component 1240 as described with reference to FIG. 12.

At 2130, the method may include communicating, via a second occasion of the set of occasions, the second repetition of the message using the set of RBs. The operations of 2130 may be performed in accordance with examples as disclosed herein. In some examples, aspects of the operations of 2130 may be performed by a message component 1235 as described with reference to FIG. 12.

FIG. 22 illustrates a flowchart showing a method 2200 that supports multiple transmissions with subband full-duplex operation in accordance with one or more aspects of the present disclosure. The operations of the method 2200 may be implemented by a network entity or its components as described herein. For example, the operations of the method 2200 may be performed by a network entity as described with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2205, the method may include transmitting, to a UE, an indication that a set of occasions for a message occurs over a plurality of symbols, wherein the plurality of symbols comprises a set of full-duplex symbols and a set of half-duplex symbols. The operations of 2205 may be performed in accordance with examples as disclosed herein. In some examples, aspects of the operations of 2205 may be performed by a symbol manager 1625 as described with reference to FIG. 16.

At 2210, the method may include selecting one or more resources for communicating the message via a first occasion of the set of occasions in accordance with a set of rules and based at least in part on the first occasion being included in a first slot type or a second slot type, the first slot type corresponding to one or more half-duplex symbols of the set of half-duplex symbols and the second slot type corresponding to one or more full-duplex symbols of the set of full-duplex symbols. The operations of 2210 may be performed in accordance with examples as disclosed herein. In some examples, aspects of the operations of 2210 may be performed by a resource manager 1630 as described with reference to FIG. 16.

At 2215, the method may include communicating the message using the one or more selected resources. The operations of 2215 may be performed in accordance with examples as disclosed herein. In some examples, aspects of the operations of 2215 may be performed by a message manager 1635 as described with reference to FIG. 16.

FIG. 23 illustrates a flowchart showing a method 2300 that supports multiple transmissions with subband full-duplex operation in accordance with one or more aspects of the present disclosure. The operations of the method 2300 may be implemented by a network entity or its components as described herein. For example, the operations of the method 2300 may be performed by a network entity as described with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2305, the method may include transmitting, to a UE, an indication that a set of occasions for a message occurs over a plurality of symbols, wherein the plurality of symbols comprises a set of full-duplex symbols and a set of half-duplex symbols. The operations of 2305 may be performed in accordance with examples as disclosed herein. In some examples, aspects of the operations of 2305 may be performed by a symbol manager 1625 as described with reference to FIG. 16.

At 2310, the method may include selecting one or more resources for communicating the message via a first occasion of the set of occasions in accordance with a set of rules and based at least in part on the first occasion being included in a first slot type or a second slot type, the first slot type corresponding to one or more half-duplex symbols of the set of half-duplex symbols and the second slot type corresponding to one or more full-duplex symbols of the set of full-duplex symbols. The operations of 2310 may be performed in accordance with examples as disclosed herein. In some examples, aspects of the operations of 2310 may be performed by a resource manager 1630 as described with reference to FIG. 16.

At 2315, the method may include communicating the message using the one or more selected resources. The operations of 2315 may be performed in accordance with examples as disclosed herein. In some examples, aspects of the operations of 2315 may be performed by a message manager 1635 as described with reference to FIG. 16.

At 2320, the method may include communicating, via the first occasion, a first repetition of the message over a first half-duplex symbol of the first slot type. The operations of 2320 may be performed in accordance with examples as disclosed herein. In some examples, aspects of the operations of 2320 may be performed by a message manager 1635 as described with reference to FIG. 16.

At 2325, the method may include communicating, via a second occasion of the set of occasions, a second repetition of the message over a second half-duplex symbol of the first slot type in accordance with the set of rules, wherein the set of rules indicate that multiple transmissions of the message are to be scheduled on same type of slot. The operations of 2325 may be performed in accordance with examples as disclosed herein. In some examples, aspects of the operations of 2325 may be performed by a message manager 1635 as described with reference to FIG. 16.

FIG. 24 illustrates a flowchart showing a method 2400 that supports multiple transmissions with subband full-duplex operation in accordance with one or more aspects of the present disclosure. The operations of the method 2400 may be implemented by a network entity or its components as described herein. For example, the operations of the method 2400 may be performed by a network entity as described with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2405, the method may include transmitting, to a UE, an indication that a set of occasions for a message occurs over a plurality of symbols, wherein the plurality of symbols comprises a set of full-duplex symbols and a set of half-duplex symbols. The operations of 2405 may be performed in accordance with examples as disclosed herein. In some examples, aspects of the operations of 2405 may be performed by a symbol manager 1625 as described with reference to FIG. 16.

At 2410, the method may include selecting one or more resources for communicating the message via a first occasion of the set of occasions in accordance with a set of rules and based at least in part on the first occasion being included in a first slot type or a second slot type, the first slot type corresponding to one or more half-duplex symbols of the set of half-duplex symbols and the second slot type corresponding to one or more full-duplex symbols of the set of full-duplex symbols. The operations of 2410 may be performed in accordance with examples as disclosed herein. In some examples, aspects of the operations of 2410 may be performed by a resource manager 1630 as described with reference to FIG. 16.

At 2415, the method may include communicating the message using the one or more selected resources. The operations of 2415 may be performed in accordance with examples as disclosed herein. In some examples, aspects of the operations of 2415 may be performed by a message manager 1635 as described with reference to FIG. 16.

At 2420, the method may include communicating, via the first occasion, a first repetition of the message over a first full-duplex symbol of the second slot type. The operations of 2420 may be performed in accordance with examples as disclosed herein. In some examples, aspects of the operations of 2420 may be performed by a message manager 1635 as described with reference to FIG. 16.

At 2425, the method may include communicating, via a second occasion of the set of occasions, a second repetition of the message over a second full-duplex symbol of the second slot type in accordance with the set of rules, wherein the set of rules indicate that multiple transmissions of the message are to be scheduled on same type of slot. The operations of 2425 may be performed in accordance with examples as disclosed herein. In some examples, aspects of the operations of 2425 may be performed by a message manager 1635 as described with reference to FIG. 16.

The following provides an overview of aspects of the present disclosure:

Aspect 1: A method for wireless communication at a UE, comprising: receiving an indication that a set of occasions for a message occurs over a plurality of symbols, wherein the plurality of symbols comprises a set of full-duplex symbols and a set of half-duplex symbols; selecting one or more resources for communicating the message via a first occasion of the set of occasions in accordance with a set of rules and based at least in part on the first occasion being included in a first slot type or a second slot type, the first slot type corresponding to one or more half-duplex symbols of the set of half-duplex symbols and the second slot type corresponding to one or more full-duplex symbols of the set of full-duplex symbols; and communicating the message using the one or more selected resources.

Aspect 2: The method of aspect 1, wherein communicating the message comprises: communicating, via the first occasion, a first repetition of the message over a first half-duplex symbol of the first slot type; and communicating, via a second occasion of the set of occasions, a second repetition of the message over a second half-duplex symbol of the first slot type in accordance with the set of rules, wherein the set of rules indicate that multiple transmissions of the message are to be scheduled on same type of slot.

Aspect 3: The method of any of aspects 1 through 2, wherein communicating the message comprises: communicating, via the first occasion, a first repetition of the message over a first full-duplex symbol of the second slot type; and communicating, via a second occasion of the set of occasions, a second repetition of the message over a second full-duplex symbol of the second slot type in accordance with the set of rules, wherein the set of rules indicate that multiple transmissions of the message are to be scheduled on same type of slot.

Aspect 4: The method of any of aspects 1 through 3, wherein communicating the message comprises: communicating, via the first occasion, the message using a set of resource blocks (RBs) corresponding to at least one subband of a first full-duplex symbol of the second slot type, wherein the set of RBs has a transmission direction that is configured same as the message.

Aspect 5: The method of any of aspects 1 through 4, wherein communicating the message comprises: communicating, via the first occasion, a first repetition of the message over a first half-duplex symbol of the first slot type; applying, in accordance with the set of rules, a frequency shift to allocate a set of RBs corresponding to at least one subband of a first full-duplex symbol of the second slot type to a second repetition of the message, wherein the set of RBs has a transmission direction that is configured same as the message; and communicating, via a second occasion of the set of occasions, the second repetition of the message using the set of RBs.

Aspect 6: The method of aspect 5, further comprising: receiving, from a network entity, a control signal indicating the frequency shift to be applied to the second repetition of the message.

Aspect 7: The method of aspect 6, wherein the frequency shift comprises an indication of a number of RBs, a number of subbands, or both.

Aspect 8: The method of any of aspects 5 through 7, further comprising: receiving, from a network entity, a first control signal indicating a set of values for the frequency shift to be applied to the second repetition of the message; and receiving, from the network entity, a second control signal selecting a value for the frequency shift from the set of values.

Aspect 9: The method of any of aspects 1 through 8, further comprising: receiving, from a network entity, a control signal comprising a FDRA parameter indicating a RB allocation for the message.

Aspect 10: The method of aspect 9, wherein the FDRA parameter is set to a number of RBs or RB groups included in a bandwidth part for the first slot type or a number of RBs or RB groups having a transmission direction that is configured same as the message for the second slot type.

Aspect 11: The method of any of aspects 9 through 10, further comprising: selecting, in accordance with the set of rules, a subset of RBs from the RB allocation indicated in the FDRA parameter for communicating the message using the second slot type. wherein the FDRA parameter is set to a number of RBs or RB groups included in a bandwidth part for the first slot type.

Aspect 12: The method of any of aspects 9 through 11, further comprising: selecting, in accordance with the set of rules, a first subset of RBs from the RB allocation indicated in the FDRA parameter for communicating the message using the first slot type; and identifying a second subset of RBs appended to the RB allocation indicated in the FDRA parameter for communicating the message using the first slot type, wherein the FDRA parameter is set to a number of RBs or RB groups having a transmission direction that is configured same as the message for the second slot type.

Aspect 13: The method of any of aspects 9 through 12, further comprising: receiving, from the network entity, an indication of a shift to be applied to the FDRA parameter, wherein selecting the one or more resources for communicating the message is based at least in part on the shift.

Aspect 14: The method of aspect 13, wherein the shift comprises a value, or an index to a table, or both.

Aspect 15: The method of any of aspects 1 through 14, further comprising: receiving, from a network entity, a control signal comprising a resource indication value (RIV) indicating at least one of a starting RB of a RB allocation for the message, a number of RBs in the RB allocation, a size of RBs in a bandwidth part, or a combination thereof, wherein selecting the one or more resources for communicating the message is based at least in part on receiving the control signal.

Aspect 16: The method of aspect 15, further comprising: selecting, in accordance with the set of rules, an updated starting RB based at least in part on a frequency shift value added to the starting RB; and selecting, in accordance with the set of rules, an updated number of RBs based at least in part on a minimum of the number of RBs and a second number of RBs reserved for communicating message, wherein the RIV is set for the first slot type.

Aspect 17: The method of any of aspects 15 through 16, further comprising: selecting, in accordance with the set of rules, an updated starting RB based at least in part on a frequency shift value added to a starting RB of the bandwidth part, wherein the RIV is set for the second slot type.

Aspect 18: The method of any of aspects 1 through 17, further comprising: receiving, from a network entity, a control signal comprising a first FDRA parameter indicating a first RB allocation for communicating the message via the first slot type and a second FDRA parameter indicating a second RB allocation for communicating the message via the second slot type.

Aspect 19: The method of any of aspects 1 through 18, further comprising: receiving, from a network entity, a control signal indicating the set of rules.

Aspect 20: The method of any of aspects 1 through 19, further comprising: receiving, from a network entity, a control signal indicating a first modulation and coding scheme to be applied to the first slot type and a second modulation and coding scheme to be applied to the second slot type.

Aspect 21: The method of aspect 20, wherein the second modulation and coding scheme is indicated as an absolute value or as a value relative to the first modulation and coding scheme.

Aspect 22: The method of any of aspects 20 through 21, wherein the control signal comprises at least one of a radio resource control signal, a MAC-CE, a downlink control indicator indicating the second modulation and coding scheme as at least one of an absolute value, a value relative to the first modulation and coding scheme, or an index to a table of values, or a combination thereof.

Aspect 23: The method of any of aspects 1 through 22, wherein an occasion of the set of occasions correspond to at least one of a physical downlink shared channel (PDSCH), a repetition of multiple PDSCHs, a physical uplink shared channel (PUSCH), a repetition of multiple PUSCHs, or a combination thereof.

Aspect 24: A method for wireless communication at a network entity, comprising: transmitting, to a UE, an indication that a set of occasions for a message occurs over a plurality of symbols, wherein the plurality of symbols comprises a set of full-duplex symbols and a set of half-duplex symbols; selecting one or more resources for communicating the message via a first occasion of the set of occasions in accordance with a set of rules and based at least in part on the first occasion being included in a first slot type or a second slot type, the first slot type corresponding to one or more half-duplex symbols of the set of half-duplex symbols and the second slot type corresponding to one or more full-duplex symbols of the set of full-duplex symbols; and communicating the message using the one or more selected resources.

Aspect 25: The method of aspect 24, wherein communicating the message comprises: communicating, via the first occasion, a first repetition of the message over a first half-duplex symbol of the first slot type; and communicating, via a second occasion of the set of occasions, a second repetition of the message over a second half-duplex symbol of the first slot type in accordance with the set of rules, wherein the set of rules indicate that multiple transmissions of the message are to be scheduled on same type of slot.

Aspect 26: The method of any of aspects 24 through 25, wherein communicating the message comprises: communicating, via the first occasion, a first repetition of the message over a first full-duplex symbol of the second slot type; and communicating, via a second occasion of the set of occasions, a second repetition of the message over a second full-duplex symbol of the second slot type in accordance with the set of rules, wherein the set of rules indicate that multiple transmissions of the message are to be scheduled on same type of slot.

Aspect 27: The method of any of aspects 24 through 26, wherein communicating the message comprises: communicating, via the first occasion, the message using a set of RBs corresponding to at least one subband of a first full-duplex symbol of the second slot type, wherein the set of RBs has a transmission direction that is configured same as the message.

Aspect 28: The method of any of aspects 24 through 27, wherein communicating the message comprises: communicating, via the first occasion, a first repetition of the message over a first half-duplex symbol of the first slot type; applying, in accordance with the set of rules, a frequency shift to allocate a set of RBs corresponding to at least one subband of a first full-duplex symbol of the second slot type to a second repetition of the message, wherein the set of RBs has a transmission direction that is configured same as the message; and communicating, via a second occasion of the set of occasions, the second repetition of the message using the set of RBs.

Aspect 29: The method of aspect 28, further comprising: transmitting, to the UE, a control signal indicating the frequency shift to be applied to the second repetition of the message.

Aspect 30: The method of aspect 29, wherein the frequency shift comprises an indication of a number of RBs, a number of subbands, or both.

Aspect 31: The method of any of aspects 28 through 30, further comprising: transmitting, to the UE, a first control signal indicating a set of values for the frequency shift to be applied to the second repetition of the message; and transmitting, to the UE, a second control signal selecting a value for the frequency shift from the set of values.

Aspect 32: The method of any of aspects 24 through 31, further comprising: transmitting, to the UE, a control signal comprising an FDRA parameter indicating a RB allocation for the message.

Aspect 33: The method of aspect 32, wherein the FDRA parameter is set to a number of RBs or RB groups included in a bandwidth part for the first slot type or a number of RBs or RB groups having a transmission direction that is configured same as the message for the second slot type.

Aspect 34: The method of any of aspects 32 through 33, further comprising: selecting, in accordance with the set of rules, a subset of RBs from the RB allocation indicated in the FDRA parameter for communicating the message using the second slot type. wherein the FDRA parameter is set to a number of RBs or RB groups included in a bandwidth part for the first slot type.

Aspect 35: The method of any of aspects 32 through 34, further comprising: selecting, in accordance with the set of rules, a first subset of RBs from the RB allocation indicated in the FDRA parameter for communicating the message using the first slot type; and identifying a second subset of RBs appended to the RB allocation indicated in the FDRA parameter for communicating the message using the first slot type, wherein the FDRA parameter is set to a number of RBs or RB groups having a transmission direction that is configured same as the message for the second slot type.

Aspect 36: The method of any of aspects 32 through 35, further comprising: transmitting, to the UE, an indication of a shift to be applied to the FDRA parameter, wherein selecting the one or more resources for communicating the message is based at least in part on the shift.

Aspect 37: The method of aspect 36, wherein the shift comprises a value, or an index to a table, or both.

Aspect 38: The method of any of aspects 24 through 37, further comprising: transmitting, to the UE, a control signal comprising a RIV indicating at least one of a starting RB of a RB allocation for the message, a number of RBs in the RB allocation, a size of RBs in a bandwidth part, or a combination thereof, wherein selecting the one or more resources for communicating the message is based at least in part on transmitting the control signal.

Aspect 39: The method of aspect 38, further comprising: selecting, in accordance with the set of rules, an updated starting RB based at least in part on a frequency shift value added to the starting RB; and selecting, in accordance with the set of rules, an updated number of RBs based at least in part on a minimum of the number of RBs and a second number of RBs reserved for communicating message, wherein the RIV is set for the first slot type.

Aspect 40: The method of any of aspects 38 through 39, further comprising: selecting, in accordance with the set of rules, an updated starting RB based at least in part on a frequency shift value added to a starting RB of the bandwidth part, wherein the RIV is set for the second slot type.

Aspect 41: The method of any of aspects 24 through 40, further comprising: transmitting, to the UE, a control signal comprising a first FDRA parameter indicating a first RB allocation for communicating the message via the first slot type and a second FDRA parameter indicating a second RB allocation for communicating the message via the second slot type.

Aspect 42: The method of any of aspects 24 through 41, further comprising: transmitting, to the UE, a control signal indicating the set of rules.

Aspect 43: The method of any of aspects 24 through 42, further comprising: transmitting, to the UE, a control signal indicating a first modulation and coding scheme to be applied to the first slot type and a second modulation and coding scheme to be applied to the second slot type.

Aspect 44: The method of aspect 43, wherein the second modulation and coding scheme is indicated as an absolute value or as a value relative to the first modulation and coding scheme.

Aspect 45: The method of any of aspects 43 through 44, wherein the control signal comprises at least one of a radio resource control signal, a MAC-CE, a downlink control indicator indicating the second modulation and coding scheme as at least one of an absolute value, a value relative to the first modulation and coding scheme, or an index to a table of values, or a combination thereof.

Aspect 46: The method of any of aspects 43 through 45, wherein an occasion of the set of occasions correspond to at least one of a PDSCH, a repetition of multiple PDSCHs, a PUSCH, a repetition of multiple PUSCHs, or a combination thereof.

Aspect 47: An apparatus for wireless communication at a UE, comprising a processor; and a memory coupled with the processor, wherein the memory comprises instructions executable by the processor to cause the apparatus to perform a method of any of aspects 1 through 23.

Aspect 48: An apparatus for wireless communication at a UE, comprising at least one means for performing a method of any of aspects 1 through 23.

Aspect 49: A non-transitory computer-readable medium storing code for wireless communication at a UE, the code comprising instructions executable by a processor to perform a method of any of aspects 1 through 23.

Aspect 50: An apparatus for wireless communication at a network entity, comprising a processor; and a memory coupled with the processor, wherein the memory comprises instructions executable by the processor to cause the apparatus to perform a method of any of aspects 24 through 46.

Aspect 51: An apparatus for wireless communication at a network entity, comprising at least one means for performing a method of any of aspects 24 through 46.

Aspect 52: A non-transitory computer-readable medium storing code for wireless communication at a network entity, the code comprising instructions executable by a processor to perform a method of any of aspects 24 through 46.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers.

Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
   one or more memories storing processor-executable code; and
   one or more processors coupled with the one or more memories and individually or collectively operable to execute the code to cause the UE to:
      receive an indication that a set of occasions for a message occurs over a plurality of symbols, wherein the plurality of symbols comprises a set of full-duplex symbols and a set of half-duplex symbols;
      select one or more resources for communicating the message via a first occasion of the set of occasions in accordance with a set of rules and based at least in part on the first occasion being included in a first slot type or a second slot type, the first slot type corresponding to one or more half-duplex symbols of the set of half-duplex symbols and the second slot type corresponding to one or more full-duplex symbols of the set of full-duplex symbols; and
      communicate the message using the one or more selected resources.

2. The UE of claim 1, wherein, to communicate the message, the one or more processors are individually or collectively operable to execute the code to cause the UE to:
   communicate, via the first occasion, a first repetition of the message over a first half-duplex symbol of the first slot type; and
   communicate, via a second occasion of the set of occasions, a second repetition of the message over a second half-duplex symbol of the first slot type in accordance with the set of rules, wherein the set of rules indicate that multiple transmissions of the message are to be scheduled on same type of slot.

3. The UE of claim 1, wherein, to communicate the message, the one or more processors are individually or collectively operable to execute the code to cause the UE to:
   communicate, via the first occasion, a first repetition of the message over a first full-duplex symbol of the second slot type; and
   communicate, via a second occasion of the set of occasions, a second repetition of the message over a second full-duplex symbol of the second slot type in accordance with the set of rules, wherein the set of rules indicate that multiple transmissions of the message are to be scheduled on same type of slot.

4. The UE of claim 1, wherein, to communicate the message, the one or more processors are individually or collectively operable to execute the code to cause the UE to:

communicate, via the first occasion, the message using a set of resource blocks corresponding to at least one subband of a first full-duplex symbol of the second slot type, wherein the set of resource blocks has a transmission direction that is configured same as the message.

5. The UE of claim 1, wherein, to communicate the message, the one or more processors are individually or collectively operable to execute the code to cause the UE to:
   communicate, via the first occasion, a first repetition of the message over a first half-duplex symbol of the first slot type;
   apply, in accordance with the set of rules, a frequency shift to allocate a set of resource blocks corresponding to at least one subband of a first full-duplex symbol of the second slot type to a second repetition of the message, wherein the set of resource blocks has a transmission direction that is configured same as the message; and
   communicate, via a second occasion of the set of occasions, the second repetition of the message using the set of resource blocks.

6. The UE of claim 5, wherein the one or more processors are individually or collectively further operable to execute the code to cause the UE to:
   receive, from a network entity, a control signal indicating the frequency shift to be applied to the second repetition of the message.

7. The UE of claim 6, wherein the frequency shift comprises an indication of a number of resource blocks, a number of subbands, or both.

8. The UE of claim 5, wherein the one or more processors are individually or collectively further operable to execute the code to cause the UE to:
   receive, from a network entity, a first control signal indicating a set of values for the frequency shift to be applied to the second repetition of the message; and
   receive, from the network entity, a second control signal selecting a value for the frequency shift from the set of values.

9. The UE of claim 1, wherein the one or more processors are individually or collectively further operable to execute the code to cause the UE to:
   receive, from a network entity, a control signal comprising a frequency domain resource assignment parameter indicating a resource block allocation for the message.

10. The UE of claim 9, wherein the frequency domain resource assignment parameter is set to a number of resource blocks or resource block groups included in a bandwidth part for the first slot type or a number of resource blocks or resource block groups having a transmission direction that is configured same as the message for the second slot type.

11. The UE of claim 9, wherein the one or more processors are individually or collectively further operable to execute the code to cause the UE to:
   select, in accordance with the set of rules, a subset of resource blocks from the resource block allocation indicated in the frequency domain resource assignment parameter for communicating the message using the second slot type, wherein the frequency domain resource assignment parameter is set to a number of resource blocks or resource block groups included in a bandwidth part for the first slot type.

12. The UE of claim 9, wherein the one or more processors are individually or collectively further operable to execute the code to cause the UE to:

select, in accordance with the set of rules, a first subset of resource blocks from the resource block allocation indicated in the frequency domain resource assignment parameter for communicating the message using the first slot type; and identify a second subset of resource blocks appended to the resource block allocation indicated in the frequency domain resource assignment parameter for communicating the message using the first slot type, wherein the frequency domain resource assignment parameter is set to a number of resource blocks or resource block groups having a transmission direction that is configured same as the message for the second slot type.

13. The UE of claim 9, wherein the one or more processors are individually or collectively further operable to execute the code to cause the UE to:

receive, from the network entity, an indication of a shift to be applied to the frequency domain resource assignment parameter, wherein selecting the one or more resources for communicating the message is based at least in part on the shift.

14. The UE of claim 13, wherein the shift comprises a value, or an index to a table, or both.

15. The UE of claim 1, wherein the one or more processors are individually or collectively further operable to execute the code to cause the UE to:

receive, from a network entity, a control signal comprising a resource indication value indicating at least one of a starting resource block of a resource block allocation for the message, a number of resource blocks in the resource block allocation, a size of resource blocks in a bandwidth part, or a combination thereof, wherein selecting the one or more resources for communicating the message is based at least in part on receiving the control signal.

16. The UE of claim 15, wherein the one or more processors are individually or collectively further operable to execute the code to cause the UE to:

select, in accordance with the set of rules, an updated starting resource block based at least in part on a frequency shift value added to the starting resource block; and select, in accordance with the set of rules, an updated number of resource blocks based at least in part on a minimum of the number of resource blocks and a second number of resource blocks reserved for communicating messages, wherein the resource indication value is set for the first slot type.

17. The UE of claim 15, wherein the one or more processors are individually or collectively further operable to execute the code to cause the UE to:

select, in accordance with the set of rules, an updated starting resource block based at least in part on a frequency shift value added to a starting resource block of the bandwidth part, wherein the resource indication value is set for the second slot type.

18. The UE of claim 1, wherein the one or more processors are individually or collectively further operable to execute the code to cause the UE to:

receive, from a network entity, a control signal comprising a first frequency domain resource assignment parameter indicating a first resource block allocation for communicating the message via the first slot type and a second frequency domain resource assignment parameter indicating a second resource block allocation for communicating the message via the second slot type.

19. The UE of claim 1, wherein the one or more processors are individually or collectively further operable to execute the code to cause the UE to:

receive, from a network entity, a control signal indicating the set of rules.

20. The UE of claim 1, wherein the one or more processors are individually or collectively further operable to execute the code to cause the UE to:

receive, from a network entity, a control signal indicating a first modulation and coding scheme to be applied to the first slot type and a second modulation and coding scheme to be applied to the second slot type.

21. The UE of claim 20, wherein the second modulation and coding scheme is indicated as an absolute value or as a value relative to the first modulation and coding scheme.

22. The UE of claim 20, wherein the control signal comprises at least one of a radio resource control signal, a medium access control layer control element (MAC-CE), a downlink control indicator indicating the second modulation and coding scheme as at least one of an absolute value, a value relative to the first modulation and coding scheme, or an index to a table of values, or a combination thereof.

23. The UE of claim 1, wherein an occasion of the set of occasions correspond to at least one of a physical downlink shared channel, a repetition of multiple physical downlink shared channels, a physical uplink shared channel, a repetition of multiple physical uplink shared channels, or a combination thereof.

24. A network entity for wireless communication, comprising:

one or more memories storing processor-executable code; and one or more processors coupled with the one or more memories and individually or collectively operable to execute the code to cause the network entity to:

transmit, to a user equipment (UE), an indication that a set of occasions for a message occurs over a plurality of symbols, wherein the plurality of symbols comprises a set of full-duplex symbols and a set of half-duplex symbols;

select one or more resources for communicating the message via a first occasion of the set of occasions in accordance with a set of rules and based at least in part on the first occasion being included in a first slot type or a second slot type, the first slot type corresponding to one or more half-duplex symbols of the set of half-duplex symbols and the second slot type corresponding to one or more full-duplex symbols of the set of full-duplex symbols; and communicate the message using the one or more selected resources.

25. The network entity of claim 24, wherein, to communicate the message, the one or more processors are individually or collectively operable to execute the code to cause the network entity to:

communicate, via the first occasion, a first repetition of the message over a first half-duplex symbol of the first slot type; and communicate, via a second occasion of the set of occasions, a second repetition of the message over a second half-duplex symbol of the first slot type in accordance with the set of rules, wherein the set of rules indicate that multiple transmissions of the message are to be scheduled on same type of slot.

26. The network entity of claim 24, wherein, to communicate the message, the one or more processors are individually or collectively operable to execute the code to cause the network entity to:

communicate, via the first occasion, a first repetition of the message over a first full-duplex symbol of the second slot type; and communicate, via a second occasion of the set of occasions, a second repetition of the message over a second full-duplex symbol of the second slot type in accordance with the set of rules, wherein the set of rules indicate that multiple transmissions of the message are to be scheduled on same type of slot.

27. The network entity of claim 24, wherein, to communicate the message, the one or more processors are individually or collectively operable to execute the code to cause the network entity to:

communicate, via the first occasion, the message using a set of resource blocks corresponding to at least one subband of a first full-duplex symbol of the second slot type, wherein the set of resource blocks has a transmission direction that is configured same as the message.

28. The network entity of claim 24, wherein, to communicate the message, the one or more processors are individually or collectively operable to execute the code to cause the network entity to:

communicate, via the first occasion, a first repetition of the message over a first half-duplex symbol of the first slot type;

apply, in accordance with the set of rules, a frequency shift to allocate a set of resource blocks corresponding to at least one subband of a first full-duplex symbol of the second slot type to a second repetition of the message, wherein the set of resource blocks has a transmission direction that is configured same as the message; and communicate, via a second occasion of the set of occasions, the second repetition of the message using the set of resource blocks.

29. A method for wireless communication at a user equipment (UE), comprising:

receiving an indication that a set of occasions for a message occurs over a plurality of symbols, wherein the plurality of symbols comprises a set of full-duplex symbols and a set of half-duplex symbols;

selecting one or more resources for communicating the message via a first occasion of the set of occasions in accordance with a set of rules and based at least in part on the first occasion being included in a first slot type or a second slot type, the first slot type corresponding to one or more half-duplex symbols of the set of half-duplex symbols and the second slot type corresponding to one or more full-duplex symbols of the set of full-duplex symbols; and communicating the message using the one or more selected resources.

30. A method for wireless communication at a network entity, comprising:

transmitting, to a user equipment (UE), an indication that a set of occasions for a message occurs over a plurality of symbols, wherein the plurality of symbols comprises a set of full-duplex symbols and a set of half-duplex symbols;

selecting one or more resources for communicating the message via a first occasion of the set of occasions in accordance with a set of rules and based at least in part on the first occasion being included in a first slot type or a second slot type, the first slot type corresponding to one or more half-duplex symbols of the set of half-duplex symbols and the second slot type corresponding to one or more full-duplex symbols of the set of full-duplex symbols; and communicating the message using the one or more selected resources.

\* \* \* \* \*